United States Patent
Driskell (12)

(10) Patent No.: US 6,239,803 B1
(45) Date of Patent: May 29, 2001

(54) METHOD TO ACHIEVE LEAST EFFORT SELECTION FROM AN ITEM LIST OF ARBITRARY LENGTH

(76) Inventor: Stanley W. Driskell, 4830 Washtenaw Ave., No. C2, Ann Arbor, MI (US) 48108

( * ) Notice: Subject to any disclaimer, the term of this patent is extended or adjusted under 35 U.S.C. 154(b) by 0 days.

(21) Appl. No.: 09/291,564

(22) Filed: Apr. 14, 1999

(51) Int. Cl.⁷ ...................................................... G06F 3/00
(52) U.S. Cl. ............................................................ 345/352
(58) Field of Search .................................. 345/326, 333, 345/334, 339, 341, 352, 353, 354, 357; 707/1, 3, 6

(56) References Cited

U.S. PATENT DOCUMENTS

| | | | |
|---|---|---|---|
| 5,596,699 | 1/1997 | Driskell | 345/352 |
| 5,689,667 | * 11/1997 | Kurtenbach | 345/352 |
| 5,701,424 | * 12/1997 | Atkinson | 345/353 |
| 5,706,448 | * 1/1998 | Blades | 345/326 |
| 5,721,853 | * 2/1998 | Smith | 345/353 |
| 5,798,760 | * 8/1998 | Vayda et al. | 345/352 |
| 5,805,167 | * 9/1998 | Van Cruyningen | 345/353 |
| 5,880,723 | 3/1999 | Driskell | 345/333 |
| 5,933,138 | * 8/1999 | Driskell | 345/333 |

OTHER PUBLICATIONS

Keuffel, W., The Metrics Minefield, Mar. 1994, pp. 19–25.
Hopkins, D., The Design and Implementation of Pie Menus, Dec. 1991, pp. 16–24.
Hopkins, D., Directional Selection is Easy as Pie Menus!, 1987, p. 103.
Hix, D. and Hartson, H. R., Developing User Interfaces, 1993, pp. 62–71.
Mills, F. and Prime, M. "Are All Menus the Same?–13 An Empirical Study", Human–Computer Interaction, Interact '90, Aug. 27–31, 1990, pp. 423–427.
Callahan, J., Hopkins, D., Weiser, M., and Schneiderman, B., An Empirical Comparison of Pie vx. Linear Menus, Chicago 1988 Conference Proceedings, pp. 95–100.
Rollo, C., Pie Menus for Windows; circular menus give a new look to old Windows, Dr. Dobb's Journal, Nov. 1992, v11 n11 p. 30(8).

* cited by examiner

Primary Examiner—Crescelle N. dela Torre
(74) Attorney, Agent, or Firm—Harness, Dickey & Pierce

(57) ABSTRACT

The invention determines the number of items in a list from which at least one item is to be selected. Using the number of items in the list the invention determines the most appropriate number of items to display per page. Then it selects from eight possible central area configurations the one that permits the user to display any desired page with the fewest average number of mouse or keystrokes. The radial selection capability then permits selection of any desired item on the displayed page using either a single short mouse traverse and click or a fewest number of keystrokes on the cursor control keypad. For sufficiently long item lists the system generates a display containing two identical scrollbars; one immediately above and one immediately below the central area. This permits scrollbar usage with a traverse averaging approximately one-third the height of the display.

26 Claims, 50 Drawing Sheets

```
WITH rDefault
// Defaults for rSessionParms
   iMaxNonUserRegions= 14;
   iMaxUserRegions   = 18;
   rTimeOut       = 0.05; // Seconds
   iMinCursorMove= 2 pixels
   bJumpCursor    = TRUE;
   bInitialPage   = TRUE; //T=Page#1 ;F=Median
   sReturnStyle   = "Implicit";// or "Explicit"

// Defaults for rRegionParms (units: point
   clrInactiveRegionFill= "MidGray";
   clrNotSelectedFill="LightGray";
   clrSelectedFill   = "DarkGray";
   clrHostingFill    = "DarkBlue";
   iLabelHeight   = 10;// 0 when no labels
   iIconHeight    = 0;//16 when icon present
   iRegionGap_Y   = 3;
   iEdgeGap_X     = 8;
   iIntraGap_X    = 8;
   iRegionLineWidth= 2;
   iDefaultBase_X = 24;

// Defaults for rCentralParms
   clrNormalCenterFill = "LightBlue";
   clrEnabledFont  = "Black";
   clrDisabledFont= "MidGray";
   iLabelHeight    = 8;
   iIconHeight     = 16;
   iLineWidth      = 2;
   iLowDisplace    = 2;
   iShortRadius    = 18; // 2...3 seg display
   iLongRadius     = 36; // 4...9 seg display
   iPerCentRadius  = 50;
   iScrollBarWidth= 24;
   iThumbHeight    = 22;
   iSideDrift_X    = 72;
END WITH;
```

— 3A01      — 3A00 rSessionParms

| pnAC |
| --- |
| pInitialnIL |
| sListType |
| bMultiSelect |
| bIconsPresent |
| bItemListEdit |
| iMaxNonUserRegions |
| iMaxUserRegions |
| rTimeOut |
| iMinCursorMove |
| cStartCursor |
| bJumpCursor |
| bInitialPage |
| bInstantReturn | rRegionParms_K

| iMaxRegions |
| --- |
| iHalfRegions |
| iNumCycles |
| clrInactiveRegionFlll |
| clrNotSelectedFill |
| clrSelectedFill |
| clrHostingFill |
| iLabelHeight |
| iIconHeight |
| iRegionGap_Y |
| iEdgeGap_X |
| iIntraGap_X |
| iRegionLineWidth |
| iRegionHeight |
| iHalfDisplayHeight |
| iLabelDisplace_Y |
| iIconDisplace_Y |
| rAngle |
| rBaseAngle |
| iBase_Y |
| iBase_X |
| iDefaultBase_X |
| iLeftHorizRegion |
| iRightHorizRegion |
| aQRegion[1...4] |

— 3A02 rCentralParms_N

| iNumSegs |
| --- |
| clrNormalCenterFill |
| clrEnabledFont |
| clrDisabledFont |
| iHalfReturnWidth |
| iExitWidth |
| iUndoWidth |
| iLabelHeight |
| iIconHeight |
| iLineWidth |
| iLowDisplace |
| iHighLabelDisplace |
| iHighIconDispalce |
| iRadius |
| iPerCentRadius |
| iHalfScrollBarWidth |
| iThumbHeight |
| iSideDrift_X |
| cBRReturn_X |
| cBRReturn_Y |
| cBRBUApex_X |
| cBRBUApex_Y |
| cTLBUApex_X |
| cTLBUApex_Y |

— 3A04

— 3A03 arApexParms_N

| cApex1$_1$ | cApex2$_1$ |
| --- | --- |
| : | : |
| cApex1$_{iMaxRegions}$ | cApex2$_{iMaxRegions}$ |

— 3A10 aSelectedTags

| iTag$_c$ |
| --- |
| : |
| iTag$_g$ |

FIGURE 3A1

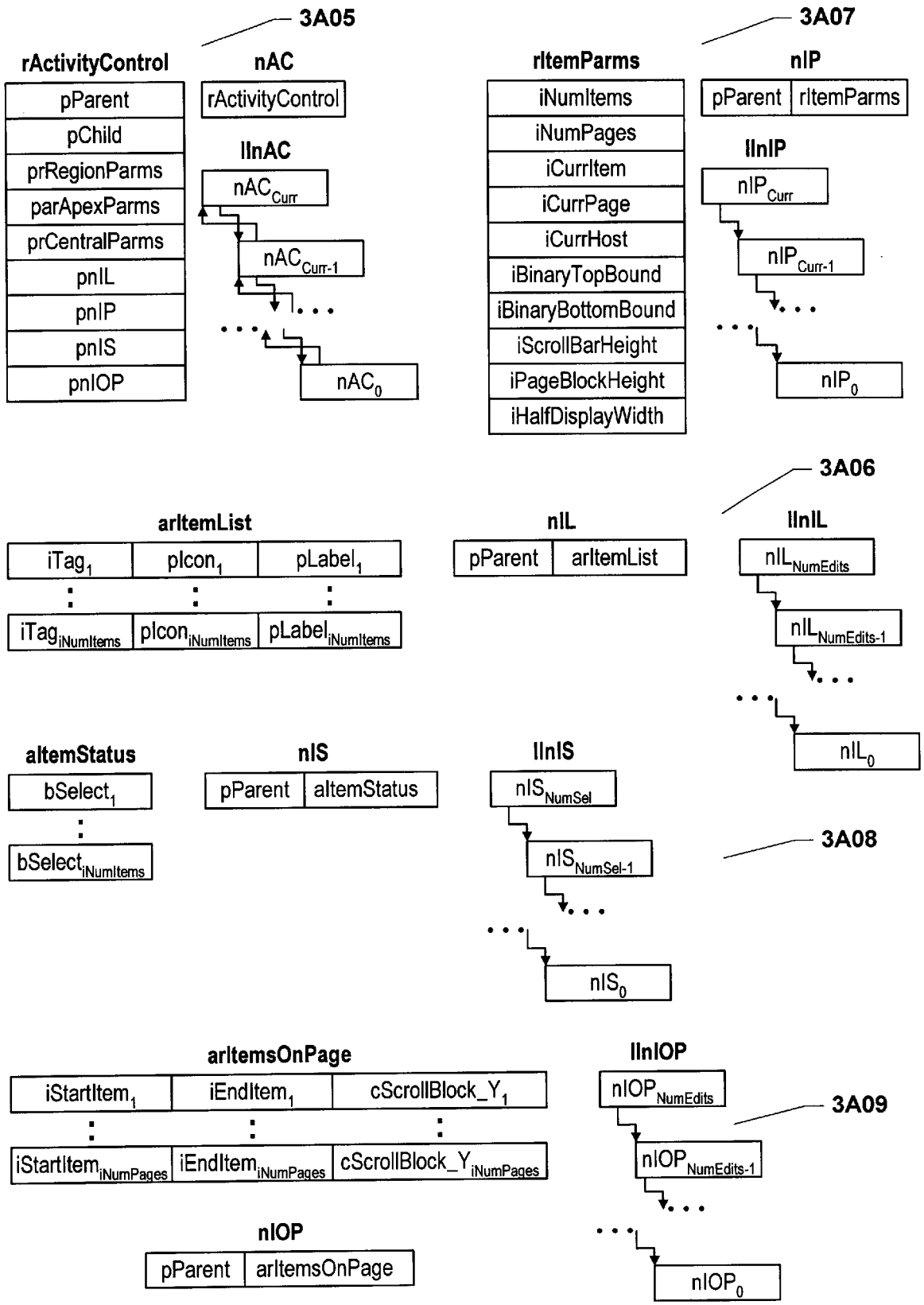
FIGURE 3A2

DEFINITION OF VARIABLES

// rSessionParms: ARRAY OF OF VARIABLES VALID FOR A CURRENTLY ACTIVE DISPLAY: — 3A01
//   pnAC            Pointer to array of pointers to data structures controlling user interaction with the current item box.
//   pInitialnIL        Pointer to location of ItemList generated at activation of item display.
//   sListType        ="List" denotes List Box; ="Combo" denotes ComboBox.
//   bMultiSelect      TRUE=multiple selections are permitted; FALSE=Ssingle selection only is permitted.
//   bIconsPresent     TRUE=icon identification used; FALSE=no icons for identification.
//   bItemListEdit     TRUE= item list has been edited; FALSE = item list has not been edited.
//   iMaxNonUserRegions  Maximum number of Regions permitted in any list display located in a non-user area.
//   iMaxUserRegions  Maximum number of Regions permitted in any list display located in a user area.
//   rTimeOut         Duration between "time-outs" used to check for cursor movement.
//   iMinCursorMove   The least Y-direction distance the cursor can move during a thumb drag without testing for new page.
//   cStartCursor      Coordinates of cursor at most recent click in user area prior to Item Box activation.
//   bJumpCursor     TRUE= jump cursor to cStartStart coordinates at display termination; FALSE= no cursor jump.
//   bInitialPage       TRUE= display page #1 at initial display; FALSE= display median page at initial display.
//   bInstantReturn    TRUE= destroy display immediately upon item selection; FALSE= destroy display only upon explicit
//                       "Exit " or "Return" click (or stroke of key equivalents) or traversal outside Item display window.

// rRegionParms: RECORD OF CONSTANTS DEFINING REGIONS OF DISPLAY: — 3A02
//   iMaxRegions      Number of Regions comprising current display.
//   iHalfRegions      References bottom Region of left side of display. =iMaxRegions/2.
//   iNumCycles       Number of Regions in a Quadrant. Horizontal Regions are excluded.
//   clrInActiveRegionFill Background color for Regions that do not contain Item identification.
//   clrNotSelectedFill  Background color for Regions displaying item identification that have not been selected.
//   clrSelectedFill     Background color for Regions displaying item identification that have been selected.
//   clrHostingFill      Background color for display shape currently hosting cursor.
//   iLabelHeight      Height of Item label.
//   iIconHeight        Height of icon.
//   iRegionGap_Y    Distance between Region line and bottom of icon or label - whichever is least.
//   iEdgeGap_X       Distance between left edge of the display and left edge of left-most element of the display's left column.
//   iIntraGap_X       When label and icon present, horizontal distance between right edge of icon and left edge of label.
//   iRegionLineWidth  Thickness of line delimiting regions.
///   iRegionHeight    Vertical distance between Region lines in the rectangular portion of a Region.
//   iHalfDisplayHeight Distance between the origin and the top of the Item display.
//   iLabelDisplace_Y  Vertical distance between the bottom region line and top of said region's Item label.
//   iIconDisplace_Y   Vertical distance between the bottom region line and top of said region's icon.
//   rAngle            Angle subtended by each Region at center of display. rAngle = 360/iNumRegions.
//   rBaseAngle        Reference angle: = 0 if no horizontal Regions present; = rAngle/2 if horizontal Regions are present.
//   iBase_Y           Y_axis reference: = 0 when no horizontal Region; = iHalfRegionHeight when horiz Region present.
//   iBase_X           When more than four Regions are displayed: = Apex2.X for Region containing rBaseAngle.
//                       When two or four Regions are displayed a default is assigned: = rRadius + iDefaultBase_X.
//   iDefaultBase_X   Externally assigned base displacement with 2 & 4 region displays.
//   iLeftHorizRegion  If present, Region number of the left horizontal region.
//   iRightHorizRegion If present, Region number of the right horizontal region.
//   aQRegion[1...4]   Region number starting quadrant: =Region number nearest X-axis of Region wholly within quadrant.

// arApexParms: ARRAY OF COORDINATES OF INNER ANGLES OF EACH DISPLAY REGION: — 3A03
//   $cApex\_1_K$        Inner apex of kth Region closest to X-axis ( lower apex for horizontal Regions).
//   $cApex\_2_K$        Inner apex of kth Region farthest from X-axis ( upper apex for horizontal Regions)

FIGURE 3B1

DEFINITION OF VARIABLES (continued)

3A04

// rCentralParms: RECORD OF CONSTANTS DEFINING THE CENTRAL AREA OF A DISPLAY:
//   iNumSegs           Number of function-areas comprising Central Area.
//   clrNormalCenterFill Default background color for function sub-areas of central area.
//   clrEnabledFont      Font color when a function sub-area is available for selection.
//   clrDisabledFont     Font color when a function sub-area is not available for selection.
//   iHalfReturnWidth   One-half the length of the word "Return"
//   iExitWidth           Length of the word "Exit"
//   iUndoWidth          Length of the word "Undo"
//   iLabelHeight         Height of text of the Central Area.
//   iIconHeight          Height of square icon in the Central Area.
//   iLineWidth           Thickness of line delimiting shapes within the Central Area.
//   iLowDisplace         Displacement from X or Y reference lines to edge of Central Area icon or label.
//   iHighLabelDisplace Distance from the bottom bounding horizontal line to top of label.
//   iHighIconDisplace  Distance from the bottom bounding horizontal line to top of icon.
//   iRadius              Radius of arc portions of the Central Area.
//   iPerCentRadius     Percent of length of vertical radius where horizontal lines of the Central Area are positioned.
//   iHalfScrollBarWidth = 0.5*iScrollBarWidth.
//   iThumbHeight        Height of square thumb object.
//   iSideDrift_X         Maximum permitted lateral "drift" of cursor from Y-axis before thumb drag is terminated.
//   cBRReturnX&Y      Right end coordinates of line under "Return" Reflected values define "Undo" & "Exit" positioning
//   cBRBUApex_X&Y   Bottom-right coordinates of "BU" area when eight segments present:
//                             X-value = 1/3 distance from origin and cBRBUApex8_X,   Y-value = cBRClose4_Y.
//   cTLBUApex_X&Y   Top-Left coordinates of "BU"area. = (iRadius+iHalfScrollBarWidth)/6.

3A05

// rActivityControl: ARRAY OF POINTERS TO DATA STRUCTURES CONTROLLING ITEM BOX MANAGEMENT:
//   pParent             Pointer to parent of current rActivityControl node.
//   pChild              Pointer to child of current rActivityControl node.
//   prRegionParms     Pointer to the "rRegionParms_K" data structure appropriate for current display size.
//   prApexParms        Pointer to the "rApexParms_K" data structure supporting "rRegionParms_K".
//   prCentralParms     Pointer to the "rCentralParms_N" data structure appropriate for current central area.
//   pnIL                Pointer to the node containing the currently employed "arItemList".
//   pnIP                Pointer to the node containing the currently employed "arItemParms".
//   pnIS                Pointer to the node containing the currently employed "arItemStatus".
//   pnIOP              Pointer to the node containing the currently employed "arItemOnPage".

3A06

// arItemList: ARRAY OF RECORDS OF PARAMETERS OBTAINED FROM THE APPLICATION SOFTWARE
//   iTag$_K$              Integer value passed to application software if kth item is selected.
//   pIcon$_K$            If present, pointer to the kth item icon.
//   sLabel$_K$           If present, pointer to the kth item label.

FIGURE 3B2

DEFINITION OF VARIABLES (continued) — 3A07

```
// rItemParms: RECORD OF VARIABLES THAT MAY BE CHANGED DURING USER ACTIVITY ON THE DISPLAY.
//   iNumItems         Total number of items in current arItemList.
//   iNumPages         Total number of pages required to display items of current arItemList.
//   iCurrItem         Row number of most recently selected Item.
//   iCurrPage         Page number of the current page being displayed.
//   iCurrHost         Identification number of the "SHAPE" which the cursor is located.
//                       1) == 0 when cursor is outside Item display window.
//                       2) Regions are shapes assigned consecutive integer identifiers. Values start with 1 and increase
//                          from top-to-bottom, left column first, then right column to the value iMaxRegions.
//                       3) Central Function Areas and scroll control shapes are assigned negative integer values, thus:
//                          Return = -1, Undo = -2, Exit = -3, Up = -4, Down = -5, Top = -6, Bottom = -7, FU = -8,
//                          FD = -9, Top Scroll Bar = -10, Bottom Scroll Bar = -11, TopThumb = -12, Bottom Thumb = -13
//   iBinaryTopBound   Page number beginning range of current binary search. = 1 at initial page display.
//   iBinaryBottomBound Page number terminating range of current binary search. = iMaxPage at initial page display.
//   ScrollBarHeight   Vertical height of the scroll bars.
//   iPageBlockHeight  Each scroll Bar partitioned to provide one "block" per page. Block height= iScrollBarHeight/iNumItems.
//   HalfDisplayWidth  Distance from origin to side of Spider display. =iBase_X + longest Item label.
```

— 3A08

```
// aItemStatus: ARRAY OF LENGTH iNumItems SET TO "TRUE" IF THE Kth ITEM IS SELECTED; "FALSE" OTHERWISE:
```

— 3A09

```
// arItemsOnPage: ARRAY OF RECORDS IDENTIFYING ITEMS OF A PAGE & LOCATION OF ITS PAGE BLOCK:
//   iStartItem_K      Row of arItemList starting page "k"
//   iEndItem_K        Row of arItemList ending page "k"
//   cScrollBlock_Y_K  Y-coordinate (relative to bottom of scroll bar) to bottom of page block denoting page number "K".
```

— 3A10

```
// aSelectedTags: ARRAY CONTAINING iTag VALUES OF SELECTED ITEMS SELECTED FROM ITEM LIST
```

FIGURE 3B3

System State 0: After activation of item box for 35 item list.

System State 1: After performance of page change activity on 35 item list.

System State 2: After performance of selection activity on 35 item list.

System State 3: After adding 1 item to a multiple selection list of 35 items

System State 4: After adding 1 item to a multiple selection list of 36 items

```
┌─────────────────────────────────────────────────────────────────────┐
│ PROCEDURE GenerateCentralAreaParms(iCurrNumSegs, rCentralParms);   │──── 6D00
└─────────────────────────────────────────────────────────────────────┘
                                  ↓
┌─────────────────────────────────────────────────────────────────────┐
│ // Pre-load rCentralParms                                           │
│ WITH rCentralParms                                                  │
│   iNumSegs              = iCurrNumSegs;                             │
│   clrNormalCenterFill=iDefault.clrNormalCenterFill;                 │
│   clrEnabledFont        = iDefault.clrEnabledFont;                  │
│   clrDisabledFont       = iDefault.clrDisabledFont;                 │
│   iHalfReturnWidth      = LENGTH("Return")/2;                       │
│   iExitWidth            = LENGTH("Exit");                           │
│   iUndoWidth            = LENGTH("Undo");                           │
│   iLabelHeight          = iDefault.iLabelHeight;                    │
│   iIconHeight           = iDefault.iIconHeight;                     │
│   iLineWidth            = iDefault.LineWidth;                       │
│   iLowDisplace          = iDefault.iLowDisplace;                    │──── 6D02
│   iHighLabelDisplace= iLabelHeight+ iLowDisplace;                   │
│   iHighIconDisplace = iIconHeight + iLowDisplace;                   │
│   iRadius              = 0;                                         │
│   iPerCentRadius       = iDefault.iPerCentRadius;                   │
│   iScrollBarHeight = 0;                                             │
│   iHalfScrollBarWidth=0;                                            │
│   iThumbHeight         = 0;                                         │
│   iSideDrift_X         = 0;                                         │
│   cBRReturn            =(0,0);                                      │
│   cBRFUApex            =(0,0);                                      │
│   cTLFUApex            =(0,0);                                      │
│ END WIDTH;                                                          │
└─────────────────────────────────────────────────────────────────────┘
                                  ↓
┌─────────────────────────────────────────────────────────────────────┐
│ // Assign parameters specific to number of central area segments    │
│   CASE (iCurrNumSegs)                                               │
│     2...3:   iRadius      = iDefault.iShortRadius;                  │
│              cBRReturn.Y = 0;                                       │
│              cBRReturn.X = iRadius;                                 │
│                                                                     │
│     4...7:   iRadius      = iDefault.iLongRadius;                   │
│              cBRReturn.Y = iDefault.iPercentRadius * iRadius;       │
│              cBRReturn.X = iRadius*SQRT(1-SQUARE(iPercentRadius))   │
│                                                                     │
│     8...9:   iRadius      = iDefault.iLongRadius                    │
│              iHalfScrollBarWidth= iDefault.iScrollBarWidth/2;       │──── 6D04
│              iThumbHeight= iDefault.iThumbHeight;                   │
│              iSideDrift_X= iDefault.iSideDrift_X;                   │
│              cBRReturn.Y = iPercentRadius*iRadius;                  │
│              cBRReturn.X = iRadius*SQRT(1-SQUARE(iPercentRadius))+  │
│                            iHalfScrollBarWidth;                     │
│              cBRFUApex.Y = 0;                                       │
│              cBRFUApex.X = iRadius + iHalfScrollBarWidth;           │
│              cTLFUApex.Y = cBRReturn.Y;                             │
│              cTLFUApex.X = 0.3333*cBRFUApex.X;                      │
│   END CASE;                                                         │
│ END WITH;                                                           │
└─────────────────────────────────────────────────────────────────────┘
                                  ↓
                              ( RETURN )

FIGURE 6D
```

```
┌──────────────────────────────────────────────────────────────────┐
│  PROCEDURE AllocateInitialMemory(rSessionParms);                 │──── 7B00
└──────────────────────────────────────────────────────────────────┘
                              ↓
┌──────────────────────────────────────────────────────────────────┐
│ // Acquire parameters of rItems list from system                 │
│   pItems      = GET_POINTER_TO_ITEM_LIST();                      │──── 7B02
│   iNumItems   = GET_NUMBER_OF_ITEMS(*pItems);                    │
│   bMultiSelect= GET_SELECTION_TYPE(*pItems);                     │
│   sListType   = GET_LIST_TYPE(*pItems);                          │
└──────────────────────────────────────────────────────────────────┘
                              ↓
┌──────────────────────────────────────────────────────────────────┐
│ // Load constants of current activation to rSessionParms.        │
│   rSessionParms.sListType     = rDefault.sListType;              │
│   rSessionParms.bMultiSelect  = rDefault.bMultiSelect;           │
│   rSessionParms.bItemListEdit = FALSE;                           │
│   rSessionParms.MinCursorMove = rDefault.rMinCursorMove;         │
│   IF((sListType == "List") AND (bMultiSelect == FALSE) AND       │──── 7B04
│      (rDefault.sReturnStyle =="Implicit"))                       │
│     rSessionParms.bInstantReturn = TRUE;                         │
│   ELSE                                                           │
│     rSessionParms.bInstantReturn = FALSE;                        │
│   ENDIF;                                                         │
└──────────────────────────────────────────────────────────────────┘
                              ↓
┌──────────────────────────────────────────────────────────────────┐
│ // Allocate initial rActivityControl memory & commence loading.  │
│   pnAC = GET_MEMORY(nAC[9]);                                     │
│   rSessionParms.pnAC= pnAC;                                      │──── 7B06
│   *pnAC.pChild  = null;                                          │
│   *pnAC.pParent = null;                                          │
└──────────────────────────────────────────────────────────────────┘
                              ↓
┌──────────────────────────────────────────────────────────────────┐
│ // Allocate initial arItemList memory & load initial values.     │
│   pnIL = GET_MEMORY(nIL[(3*iNumItems)+1]);                       │
│   rSessionParms.pInitialnIL = pnIL;                              │
│   *pnAC.pnIL    = pnIL                                           │──── 7B08
│   *pnIL.pParent = null;                                          │
│   CONVERT *pItems TO arItemList FORMAT                           │
│     and LOAD_TO *pnIL.arItemList;                                │
└──────────────────────────────────────────────────────────────────┘
                              ↓
┌──────────────────────────────────────────────────────────────────┐
│ // Allocate initial rItemParm memory & load initial values.      │
│   pnIP = GET_MEMORY(nIP[11]);                                    │
│   *pnAC.pnIP    = pnIP;                                          │──── 7B10
│   *pnIP.pParent = null;                                          │
│   *pnIP.rItemParms = (0,...,0);                                  │
│   *pnIP.rItemParms.iNumItems = iNumItems;                        │
└──────────────────────────────────────────────────────────────────┘
                              ↓
┌──────────────────────────────────────────────────────────────────┐
│ // Allocate initial rItemStatus memory & load initial values.    │
│   pnIS = GET_MEMORY(nIS[iNumItems+1]);                           │
│   *pnAC.pnIS    = pnIS;                                          │──── 7B12
│   *pnIS.pParent = null;                                          │
│   *pnIS.aItemStatus.bSelect[1, ..., iNumItems]= (FALSE, ..., FALSE);│
└──────────────────────────────────────────────────────────────────┘
                              ↓
┌──────────────────────────────────────────────────────────────────┐
│ // Allocate initial rItemsOnPage memory & load initial values.   │
│   IF(CURSOR_IN_USER_AREA(LOCATION = rSessionParms.cStartCursor)) │
│      iMaxShellSize = rSessionParms.iMaxUserRegions;              │
│   ELSE                                                           │
│      iMaxShellSize = rSessionParms.iMaxNonUserRegions;           │──── 7B14
│   END IF;                                                        │
│   iNumPages = INTEGER(ROUNDUP(REAL(iNumItems)/REAL(iMaxShellSize)));│
│   *pnIP.rItemParms.iNumPages = iNumPages;                        │
│   pnIOP= GET_MEMORY(nIOP[(3*iNumPages)+1]);                      │
│   *pnAC.pnIOP  = pnIOP;                                          │
│   *pnIOP.Parent= null;                                           │
└──────────────────────────────────────────────────────────────────┘
                              ↓
                         ( RETURN )
```

FIGURE 7B

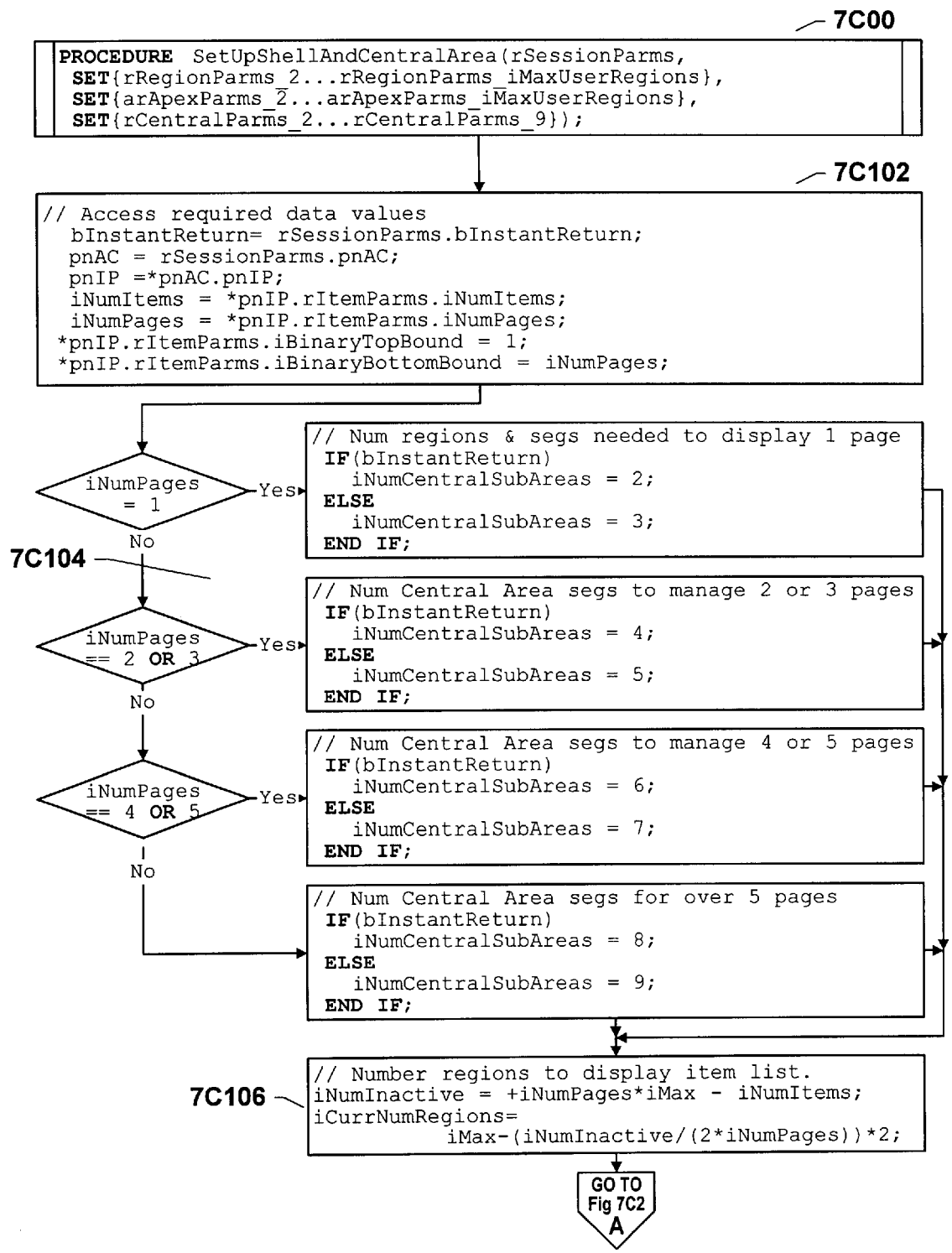
FIGURE 7C1

FIGURE 7C2

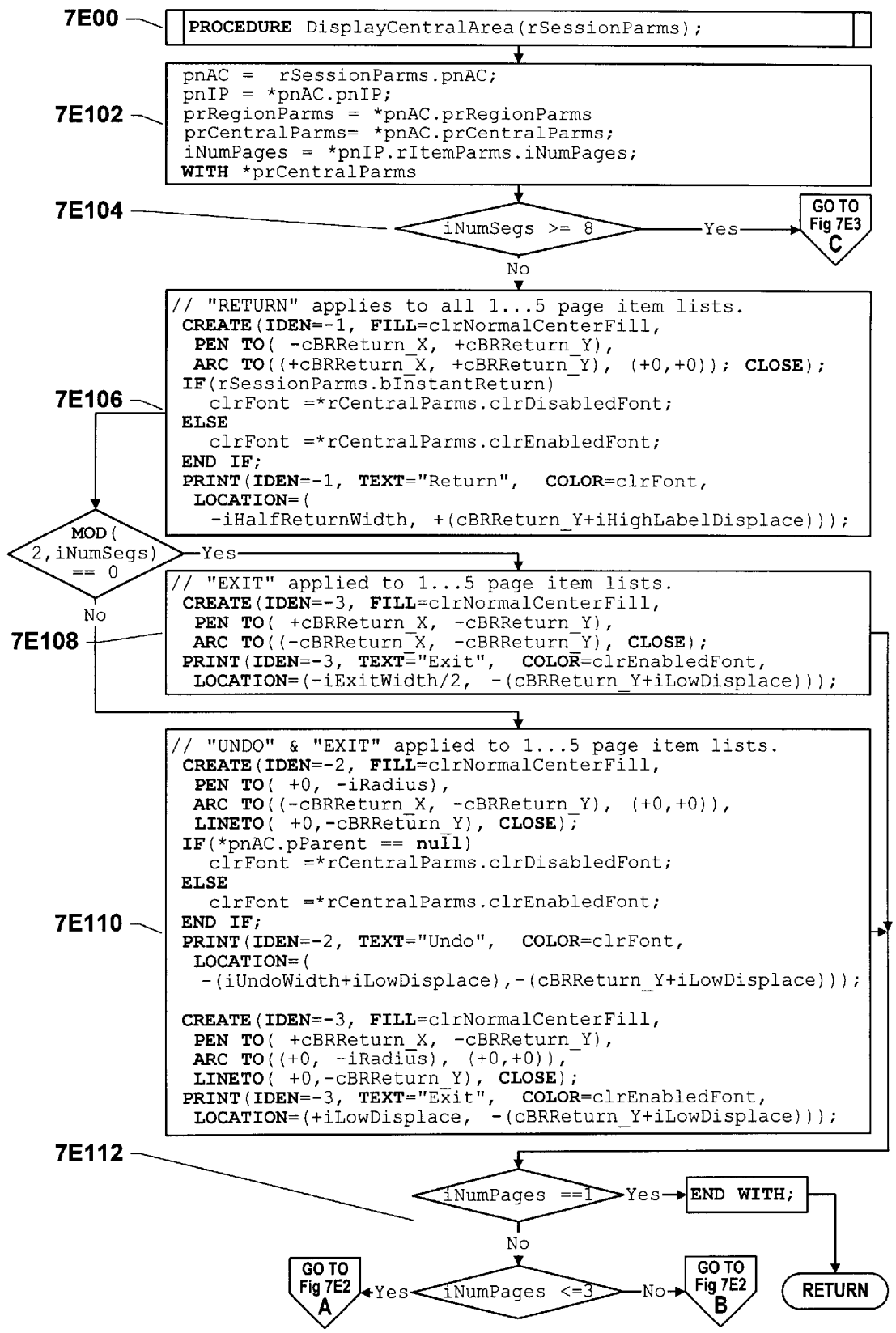
FIGURE 7E1

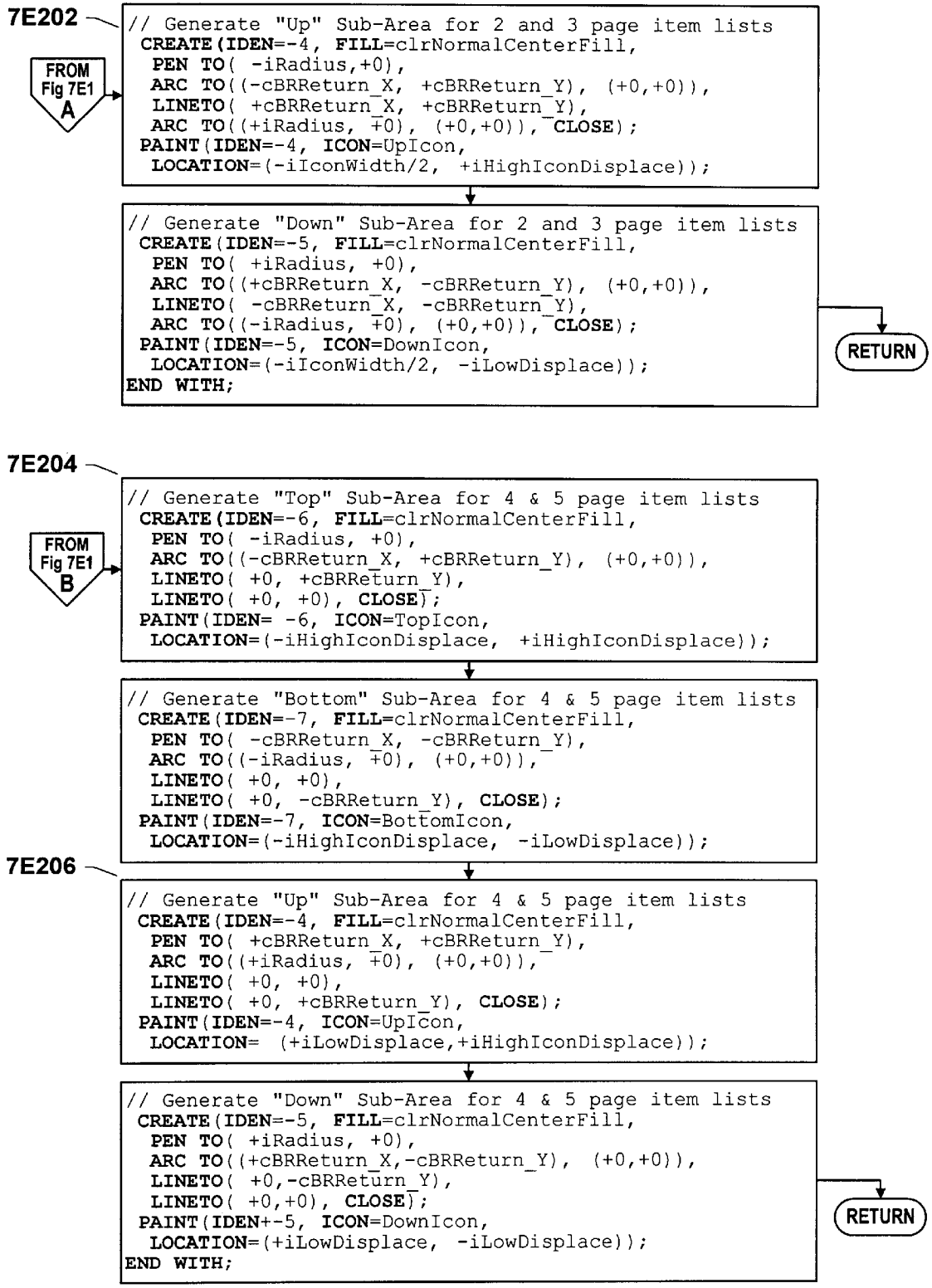
FIGURE 7E2

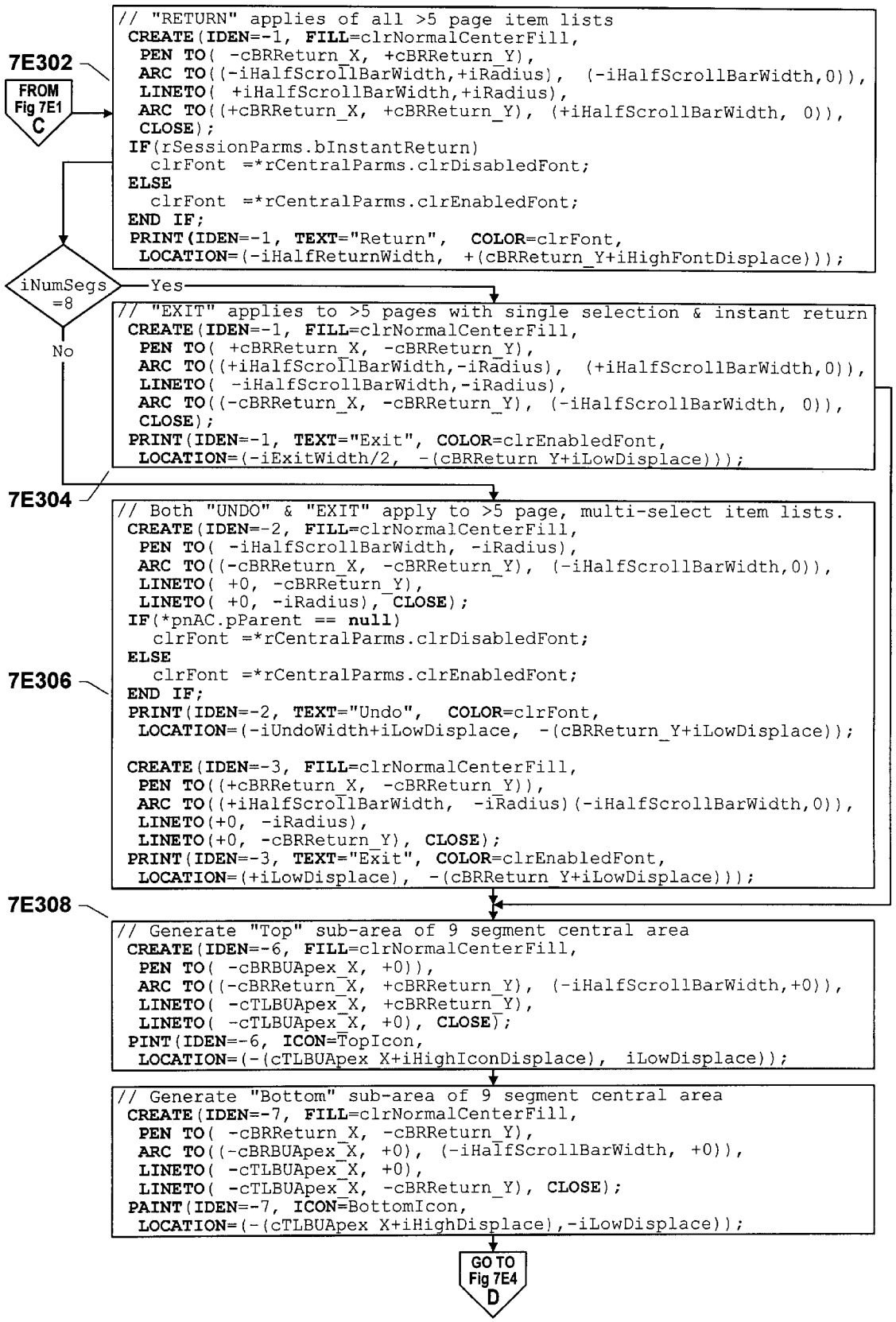
FIGURE 7E3

7E402 ── FROM: Fig 7E3 D

```
// Generate "PageUp" sub-area of 9 segment central area
CREATE(IDEN=-4, FILL=clrNormalCenterFill,
  PEN TO( -cTLBUApex_X, +0),
  LINETO( -cTLBUApex_X, +cBRReturn_Y),
  LINETO( +cTLBUApex_X, +cBRReturn_Y),
  LINETO( +cTLBUApex_X, +0), CLOSE);
PAINT(IDEN=-4, ICON=UpIcon,
  LOCATION =(-iIconWidth/2, +iHighIconDisplace));
```

```
// Generate "PageDown" sub-area of 9 segment central area
CREATE(IDEN=-5, FILL=clrNormalCenterFill,
  PEN TO( -cTLBUApex_X, -cBRReturn_Y),
  LINETO( -cTLBUApex_X, +0);
  LINETO( +cTLBUApex_X, +0);
  LINETO( +cTLBUApex_X, -cBRReturn_Y); CLOSE);
PAINT(IDEN=-5, ICON=DownIcon,
  LOCATION = (-iIconWidth/2, -iLowDisplace));
```

7E404

```
// Generate "BinaryUp" sub-area of 9 segment central area
CREATE(IDEN=-8, FILL=clrNormalCenterFill,
  PEN TO( +cBRReturn_X, +cBRReturn_Y);
  ARC TO((+cBRBUApex_X, +0), (+iHalfScrollBarWidth, 0));
  LINETO( +cTLBUApex_X, +0);
  LINETO( +cTLBUApex_X, +cBRReturn_Y); CLOSE);
PAINT(IDEN=-8, ICON=BinUpIcon,
  LOCATION =(+(cTLBUApex_X+iLowDisplace),+iHighIconDisplace));
```

```
// Generate "BinaryDown" sub-area of 9 segment central area
CREATE(IDEN=-9, FILL=clrNormalCenterFill,
  PEN TO( +cTLBUApex_X, +0),
  ARC TO((+cBRReturn_X, -cBRReturn_Y), (+iHalfScrollBarWidth,0)),
  LINETO( +cTRBUApex_X, -cBRReturn_Y)),
  LINETO( +cTRBUApex_X, +0), CLOSE);
PAINT(IDEN=-8, ICON=BinDownIcon,
  LOCATION =(+(cTRBUApex_X+iLowDisplace),-iLowDisplace));
```

7E406

```
// Generate Top ScrollBar
CREATE(IDEN=-10, FILL=clrLightGrey,
  PEN TO(-iHalfScrollBarWidth, +iRadius),
  RECTANGLE(
    HEIGHT=(iScrollBarHeight), WIDTH= 2*iHalfScrollBarWidth);
```

```
// Generate Bottom ScrollBar for a 9 segment central area
CREATE(IDEN=-11, FILL=clrLightGrey,
  PEN TO(-iHalfScrollBarWidth, -iRadius),
  RECTANGLE(
    HEIGHT=(iScrollBarHeight), WIDTH= 2*iHalfScrollBarWidth;
```

```
// Display page blocks in both scroll bars
Y_Lower = -*pnIP.rItemParms.iHalfDisplayHeight;
Y_Upper = +*prCentralArea.iRadius;
X_End   = +iHalfScrollBarWidth;
END WITH;
```

7E408

```
DO iPage = 1 TO iNumPages -1 BY 1
```

```
Y_Lower = Y_Lower + *pnIP.rItemParms.iPageBlockHeight;
Y_Upper = Y_Upper + *pnIP.rItemParms.iPageBlockHeight;
DRAW(PEN_TO(-X_End,Y_Lower), LINE_TO(+X_End,Y_Lower));
DRAW(PEN_TO(-X_End,Y_Upper), LINE_TO(+X_End,Y_Upper));
```

```
END DO
```

7E410

```
*pnIP.rItemParms.iHalfDisplayWidth=
              *pnIP.rItemParms.iHalfDisplayWidth +
              *prCentralParms.iHalfScrollBarWidth;
```

( RETURN )    FIGURE 7E4

```
┌─────────────────────────────────────────────────────────────┐
│ PROCEDURE   SetUpPage(rSessionParms);                       │──── 7F00
└─────────────────────────────────────────────────────────────┘
                              ↓
┌─────────────────────────────────────────────────────────────┐
│ // Access required variables                                │
│   pnAC = rSessionParms.pnAC;                                │
│   prRegionParms  = *pnAC.prRegionParms;                     │
│   prCentralParms= *pnAC.prCentralParms;                     │──── 7F02
│   pnIP = *pnAC.pnIP;                                        │
│   iNumItems  = *pnIP.rItemParms.iNumItems;                  │
│   iNumPages  = *pnIP.rItemParms.iNumPages;                  │
└─────────────────────────────────────────────────────────────┘
                              ↓
┌─────────────────────────────────────────────────────────────┐
│ // NOTE: ScrollBar origin is the center of its bottom edge. │
│ // Calculate & load values to arItemsOnPage data structure. │
│                                                             │
│  WITH *pnIP.rItemParms;                                     │
│     iMaxRegions    = *prRegionParms.iMaxRegions;            │
│     iStartPageItem= 1 - iMaxRegions;                        │
│     iEndPageItem   = 0;                                     │
│     iPageBlockHeight= iScrollBarHeight/iNumPages;           │
│     iScrollBlock_Y  = iScrollBarHeight;                     │
│                                                             │
│    DO iPageNo = 1, iNumPages                                │
│       iStartPageItem= iStartPageItem + iMaxRegions;         │
│       iEndPageItem  = iEndPageItem  + iMaxRegions;          │──── 7F04
│       iScrollBlock_Y= iScrollBlock_Y - iPageBlockHeight;    │
│       *pnIOP.arItemsOnPage[iPageNo].iStartItem = iStartPageItem;│
│       *pnIOP.arItemsOnPage[iPageNo].iEndItem = iEndPageItem;│
│       *pnIOP.arItemsOnPage[iPageNo].cScrollBlock_Y = iScrollBlock_Y;│
│    END DO;                                                  │
│                                                             │
│ //  Allow for partially filled last page                    │
│     *pnIOP.arItemsOnPage[iNumPages].iEndItem= iNumItems;    │
└─────────────────────────────────────────────────────────────┘
                              ↓
┌─────────────────────────────────────────────────────────────┐
│ // Identify the initial page of items to be displayed       │
│   IF(rSessionParms.bInitialPage)                            │
│     iCurrPage = 1;                                          │
│   ELSE                                                      │
│     IF(iNumPages <= 5)                                      │
│        iCurrPage = (iNumPages +1)/2;                        │
│     ELSE                                                    │
│        IF(MOD(2,iNumPages) == 1))                           │
│           iCurrPage = (iNumPages +1)/2;                     │──── 7F06
│        ELSE                                                 │
│           iCurrPage = iNumPages/2;                          │
│        END IF;                                              │
│     END IF;                                                 │
│   END IF;                                                   │
│ END WITH;                                                   │
└─────────────────────────────────────────────────────────────┘
                              ↓
                         ( RETURN )

FIGURE 7F
```

```
┌─────────────────────────────────────────────────────────────┐
│ PROCEDURE DisplayThumb(rSessionParms);                      │ ─ 7H00
└─────────────────────────────────────────────────────────────┘
                              ↓
┌─────────────────────────────────────────────────────────────┐
│ // NOTE: Page # 1 is denoted by the top-most page block of the
│ // scrollbar. A scrollbar's origin is at its bottom center.
│
│ // Determine position of the top Thumb: Relative Hot Spot location
│ // is defined to be proportionate to the position of said PageBlock
│ // to all page blocks.  By converting page count to "Base 0" the
│ // first page is 0% of height of iPageBlockHeightor iThumbHeight.
│ //   Similarly the last page is at the 100% level.
│                                                              │ ─ 7H02
│  pnAC = rSessionParms.pnAC;
│  prRegionParms  = *pnAC.prRegionParms;
│  prCentralParms = *pnAC.prCentralParms;
│  pnIP = *pnAC.pnIP;
│  iHalfDisplayHeight = *prRegionParms.iHalfDisplayHeight;
│  iCurrPage = *pnIP.rItemParms.iCurrPage;
│  iNumPages = *pnIP.rItemParms.iNumPages;
│  iPageBlockHeight= *pnIP.rItemParms.iPageBlockHeight;
│  iThumbHeight = *prCentralParms.iThumbHeight;
└─────────────────────────────────────────────────────────────┘
                              ↓
┌─────────────────────────────────────────────────────────────┐
│ // Relative to scrollbar origin, calculate the Y-coord hot spot of
│ // the hotspot of the pageBolck representing the current page.
│  rRelHotSpotLoc= 1-((REAL(iCurrPage)- 1.0)/(REAL(iNumPages)- 1.0))  │ ─ 7H04
│  rRelPBHS= REAL(iPageBlockHeight)*rRelHotSpotLoc;
│  rAbsPBHS= REAL(iPageBlockHeight)*(iNumPages-iCurrPage)+rRelPBHS;
└─────────────────────────────────────────────────────────────┘
                              ↓
┌─────────────────────────────────────────────────────────────┐
│ // Relative to scrollbar origin, calculate the Y-coord hot spot of
│ // the top edge of the Thumb location representing the current page.
│ // Requires positioning the Thumb so the PageBlock and Thumb hot     │ ─ 7H06
│ // spots coencide.
│  rRelThumbHS = REAL(iThumbHeight)*rRelHotSpotLoc;
│  cCoordThumb_Y=INTEGER(rAbsPBHS+(iThumbHeight-iRelThumbHS));
└─────────────────────────────────────────────────────────────┘
                              ↓
┌─────────────────────────────────────────────────────────────┐
│ // Remove images of old thumbs
│  DESTROY_SHAPE(IDEN= -12);
│  DESTROY_SHAPE(IDEN= -13);                                   │ ─ 7H08
└─────────────────────────────────────────────────────────────┘
                              ↓
┌─────────────────────────────────────────────────────────────┐
│ // Paint new THUMB in each scroll bar
│  WITH *prCentralParms
│   CREATE(IDEN=-12, FILL=clrMediumGrey,
│     PEN TO(-(iHalfScrollBar-1), iRadius + cCoordThumb_Y),
│     SQUARE(SIDE=iThumbHeight));
│
│   CREATE(IDEN=-13, FILL=clrMediumGrey,
│     PEN TO(-(iHalfScrollBar-1), -(iHalfDisplayHeight-cCoordThumb_Y)),
│     SQUARE(SIDE=iThumbHeight));
│  END WITH;
└─────────────────────────────────────────────────────────────┘
                              ↓
                        ( RETURN )

FIGURE 7H
```

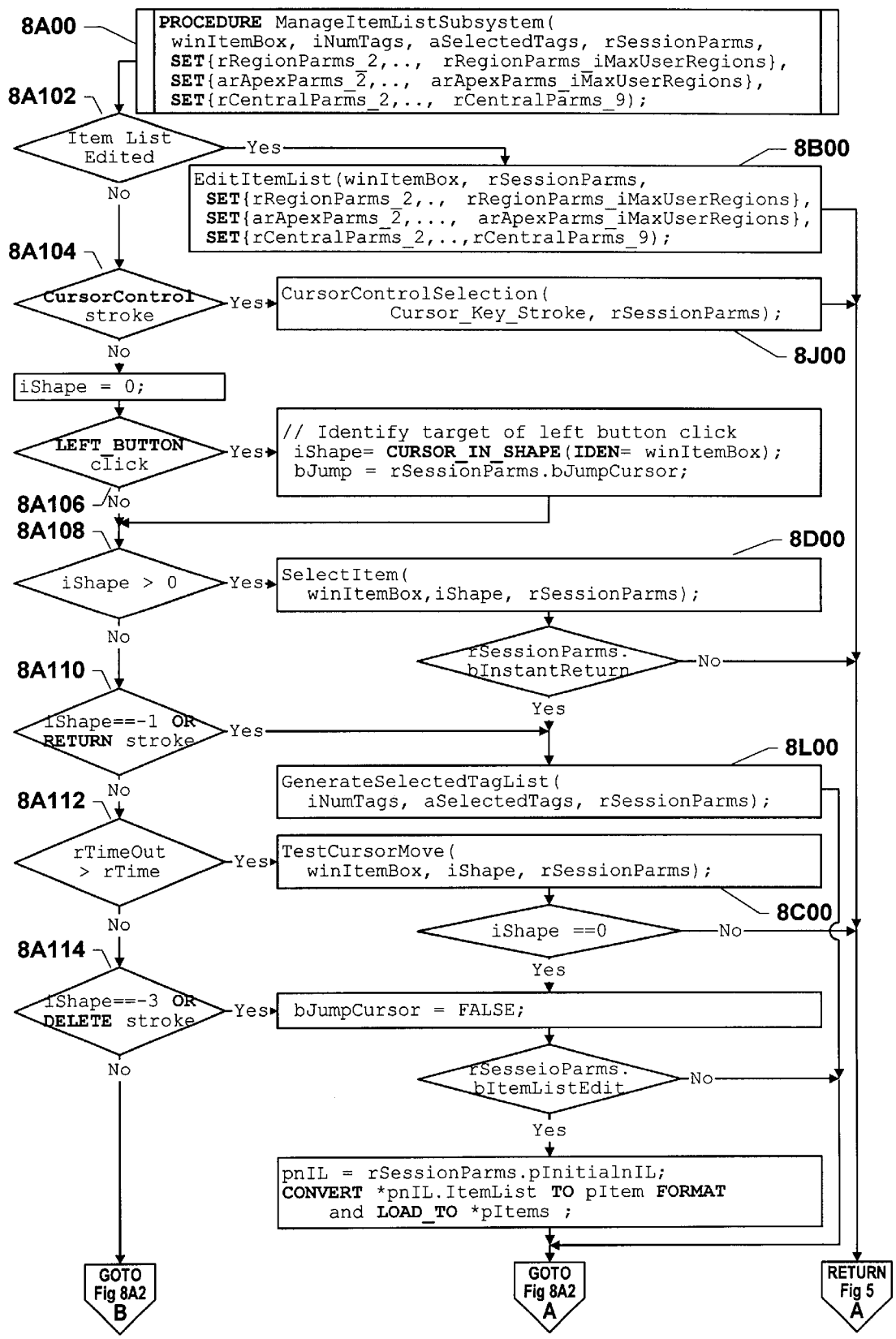
FIGURE 8A1

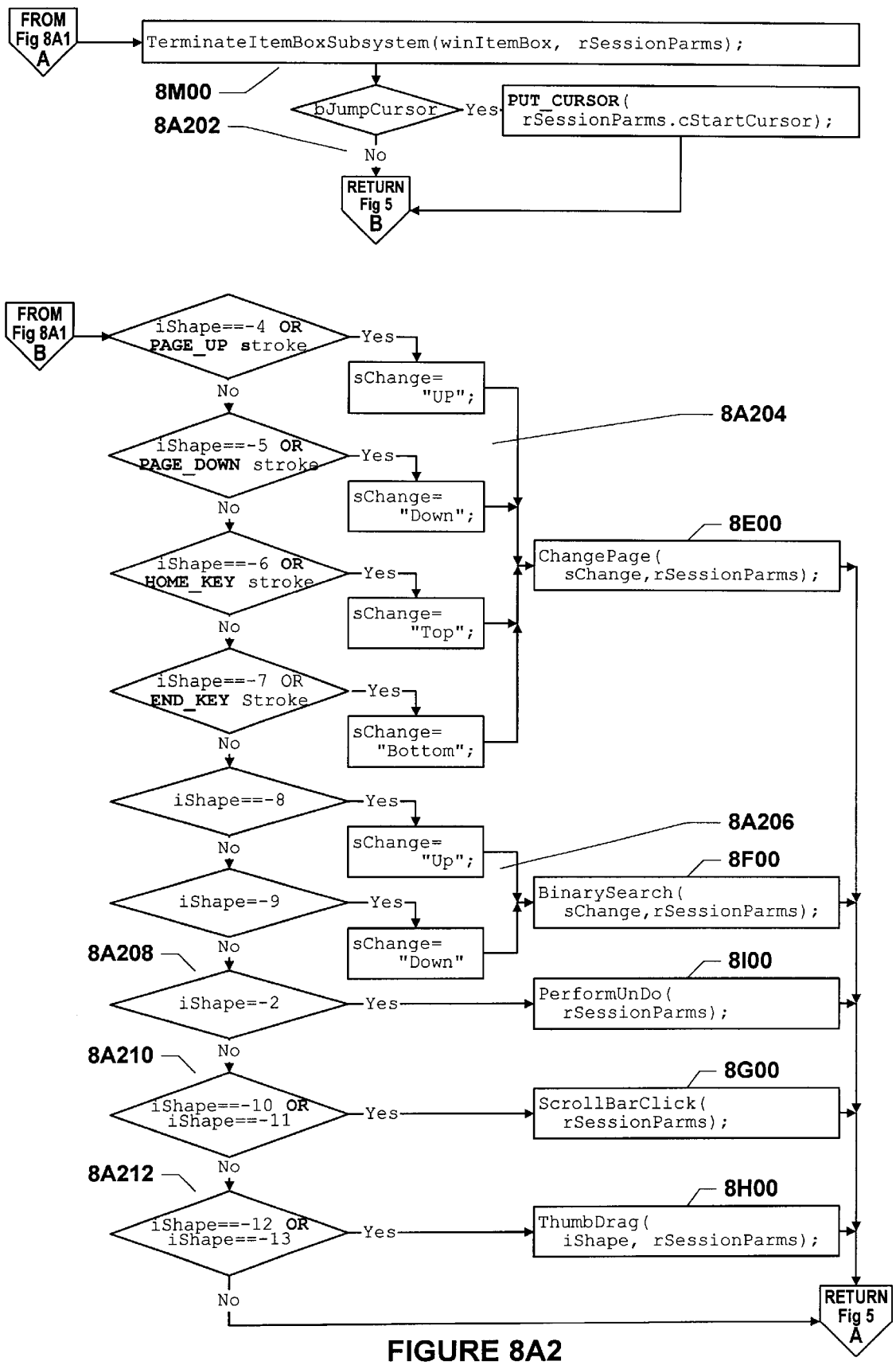
FIGURE 8A2

```
PROCEDURE EditItemList(winItemBox, rSessionParms,
  SET{rRegionParms_2...rRegionParms_iMaxUserRegions},
  SET{arApexParms_2...arApexParms_iMaxUserRegions},
  SET{rCentralParms_2...rCentralParms_9});
```
— 8B00

```
// Record that item list edit is performed
rSessionParms.bItemListEdit = TRUE;
```
— 8B02

```
// Allocate memory for edited Item List
AllocateAdditionalMemory("EditItems", rSessionParms);
```
— 8K00

```
SetUpShellAndCentralArea(rSessionParms,
  SET{rRegionParms_2...rRegionParms_iMaxUserRegions},
  SET{arApexParms_2...arApexParms_iMaxUserRegions},
  SET{rCentralParms_2...rCentralParms_9});
```
— 7C00

```
// Assign pointers to data structures
pnAC = rSessionParms.pnAC;
prRegionParms = *pnAC.prRegionParms;
prCentralParms= *pnAC.prCentralParms;
pnIP = *pnAC.pnIP;
```
— 8B04

```
RESIZE_WINDOW(IDEN="ItemBox", HANDLE= winItemBox,
  WIDTH = 2*(*pnIP.rItemParms.iHalfDisplayWidth),
  HEIGHT= 2*(*prRegionParms.iHalfDisplayHeight));
```
— 8B06

```
// Paint selected shell for edited "ItemBox"
DisplayShell(rSessionParms);
```
— 7D00

```
// Paint Central Area configuration for edited "ItemBox"
DisplayCentralArea(rSessionParms);
```
— 7E00

```
// Generate parameters required to identify item list pages.
SetUpPage(rSessionParms);
```
— 7F00

```
// Paint initial page of edited item list in selected shell.
DisplayPage(rSessionParms);
```
— 7G00

```
// Position cursor near display center & set appropriate fill.
IF(*prCentralParms.iNumSegs <= 3)
  PUT_CURSOR(0, +5);
  FILL_SHAPE(IDEN= -1, COLOR= *prRegionParms.clrHostingFill);
  *pnIP.rItemParms.iCurrHost = -1);
ELSE
  PUT_CURSOR(5, -5);
  FILL_SHAPE(IDEN= -5, COLOR= *rRegionParms.clrHostingFill);
  *pnIP.rItemParms.iCurrHost = -5);
END IF,
```
— 8B08

( RETURN )

FIGURE 8B

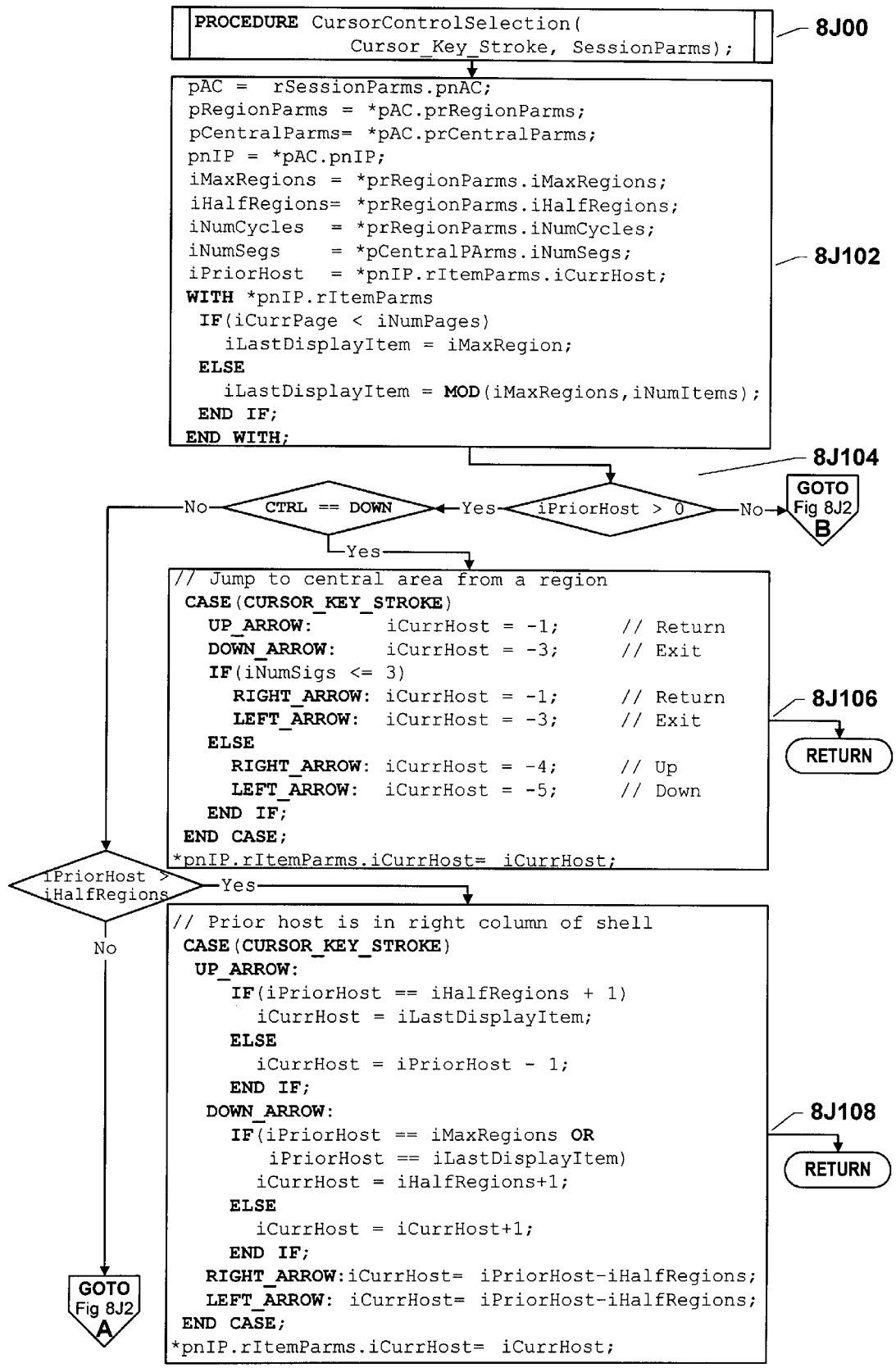
FIGURE 8J1

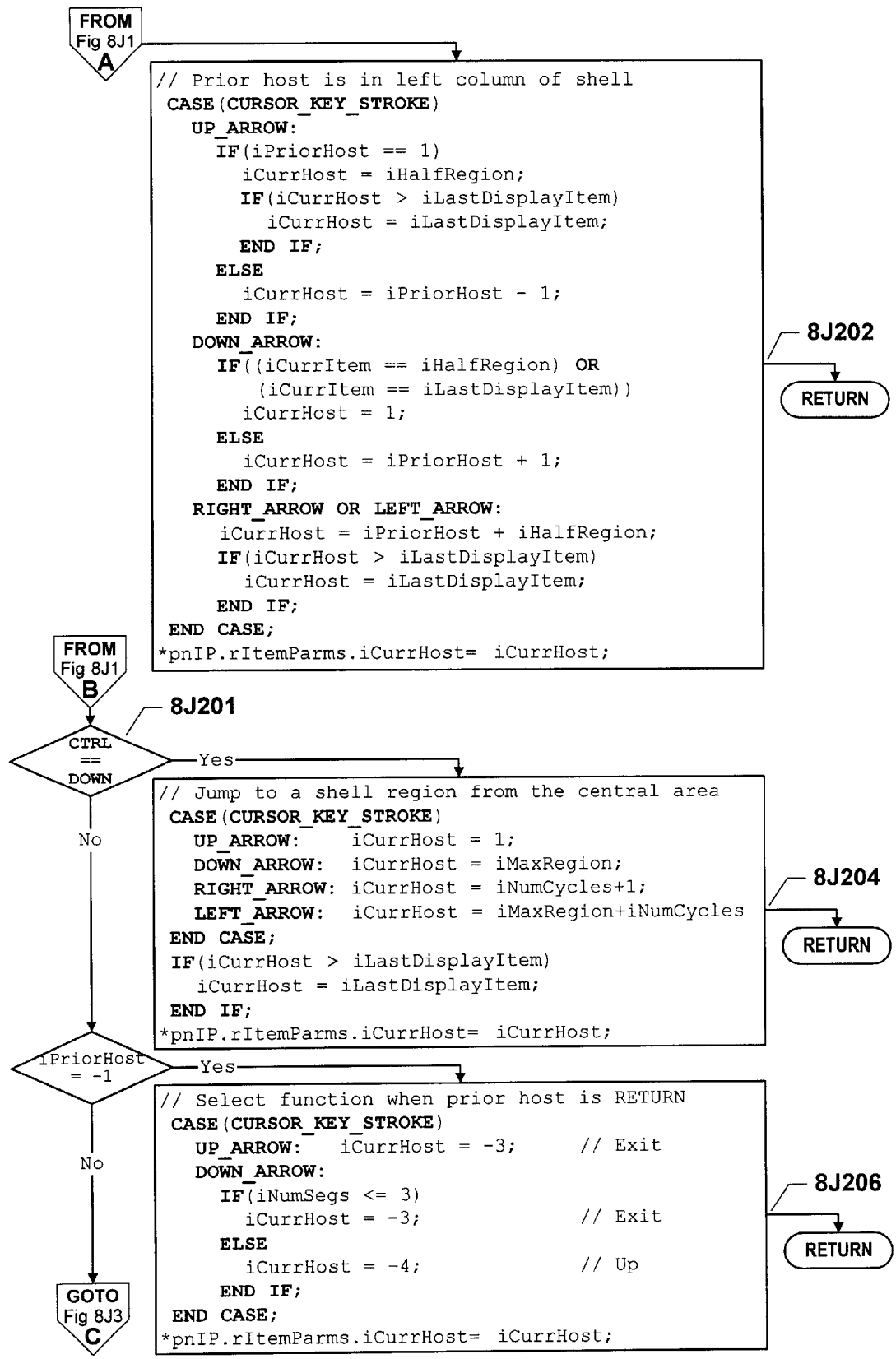
FIGURE 8J2

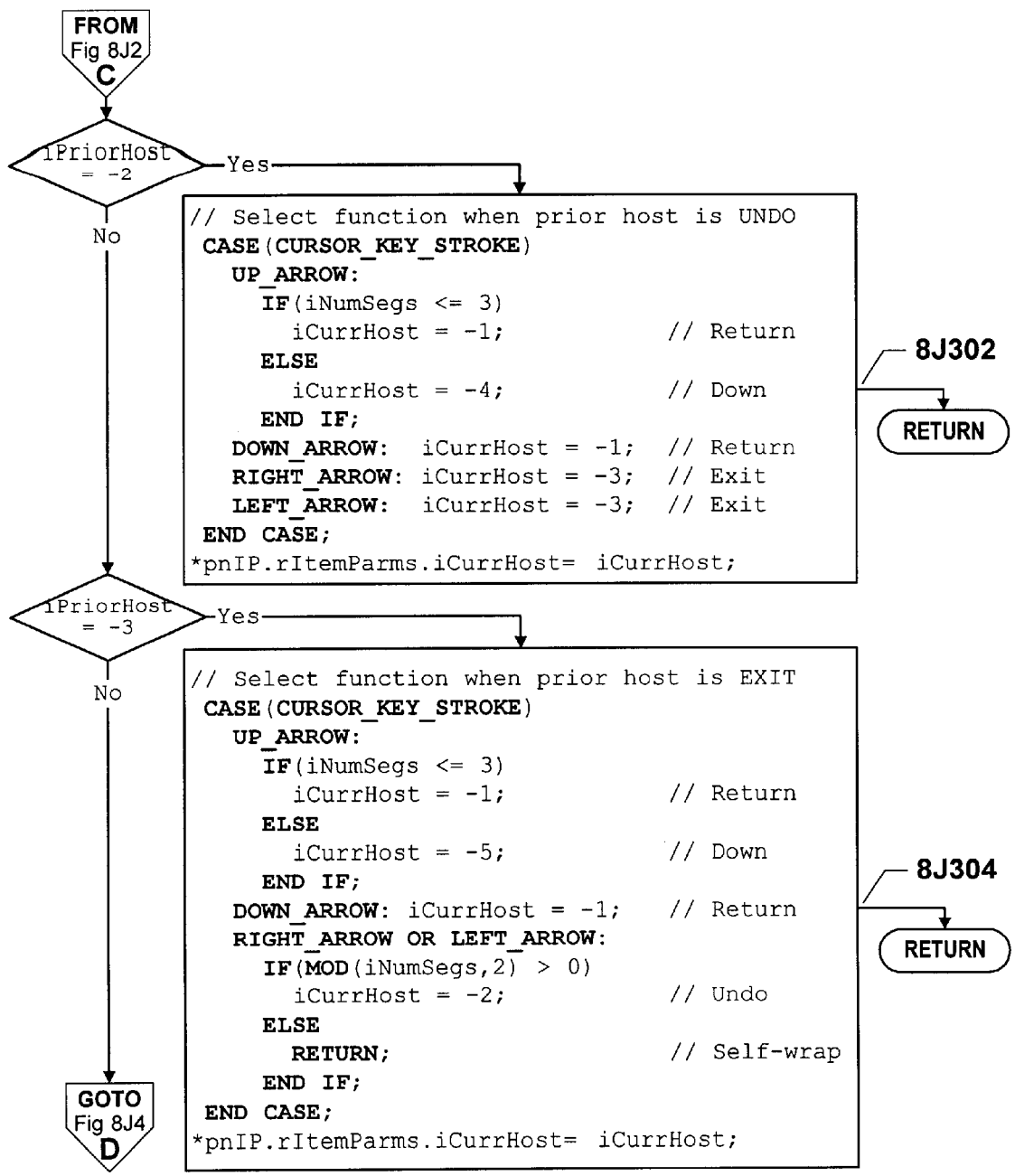
FIGURE 8J3

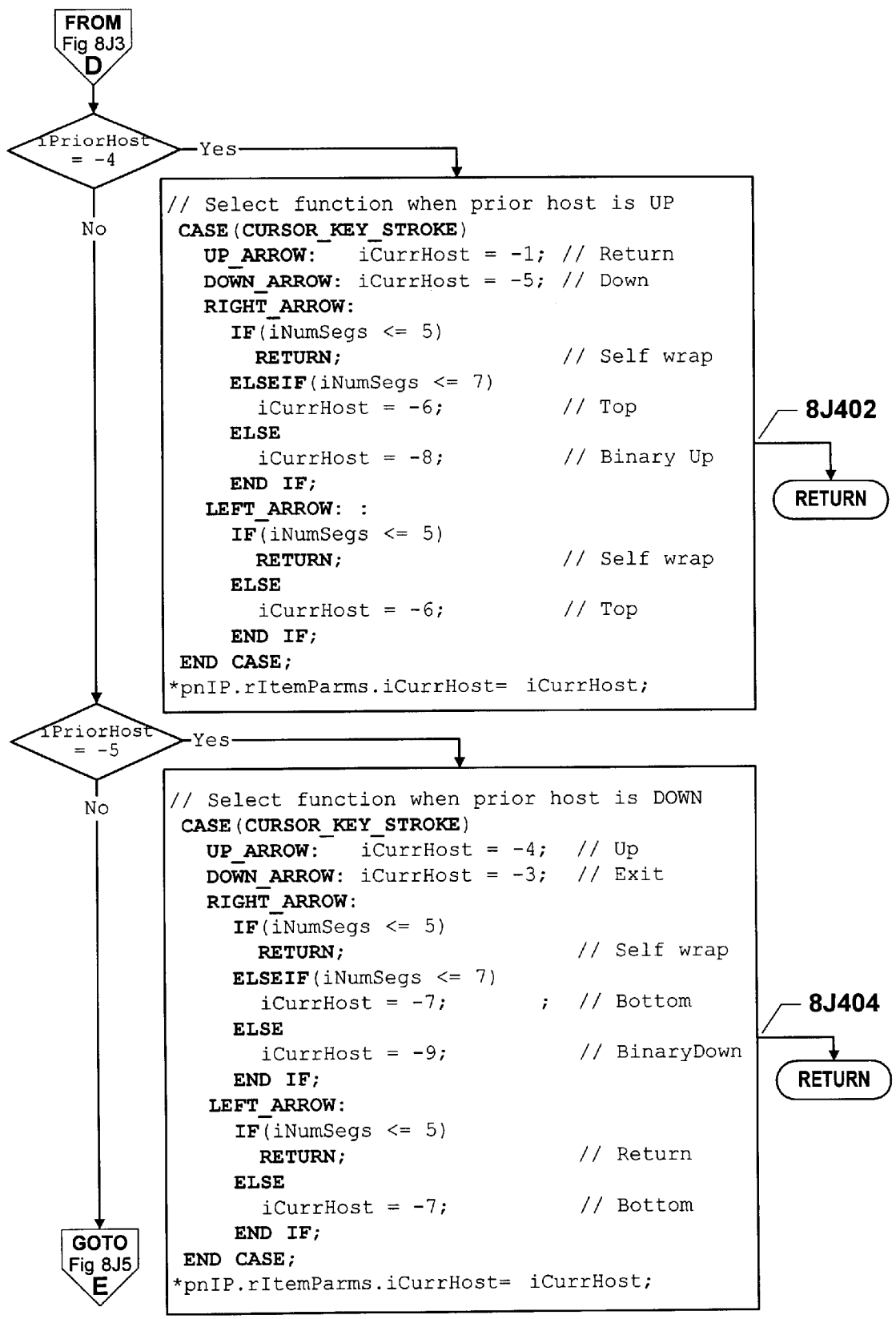
FIGURE 8J4

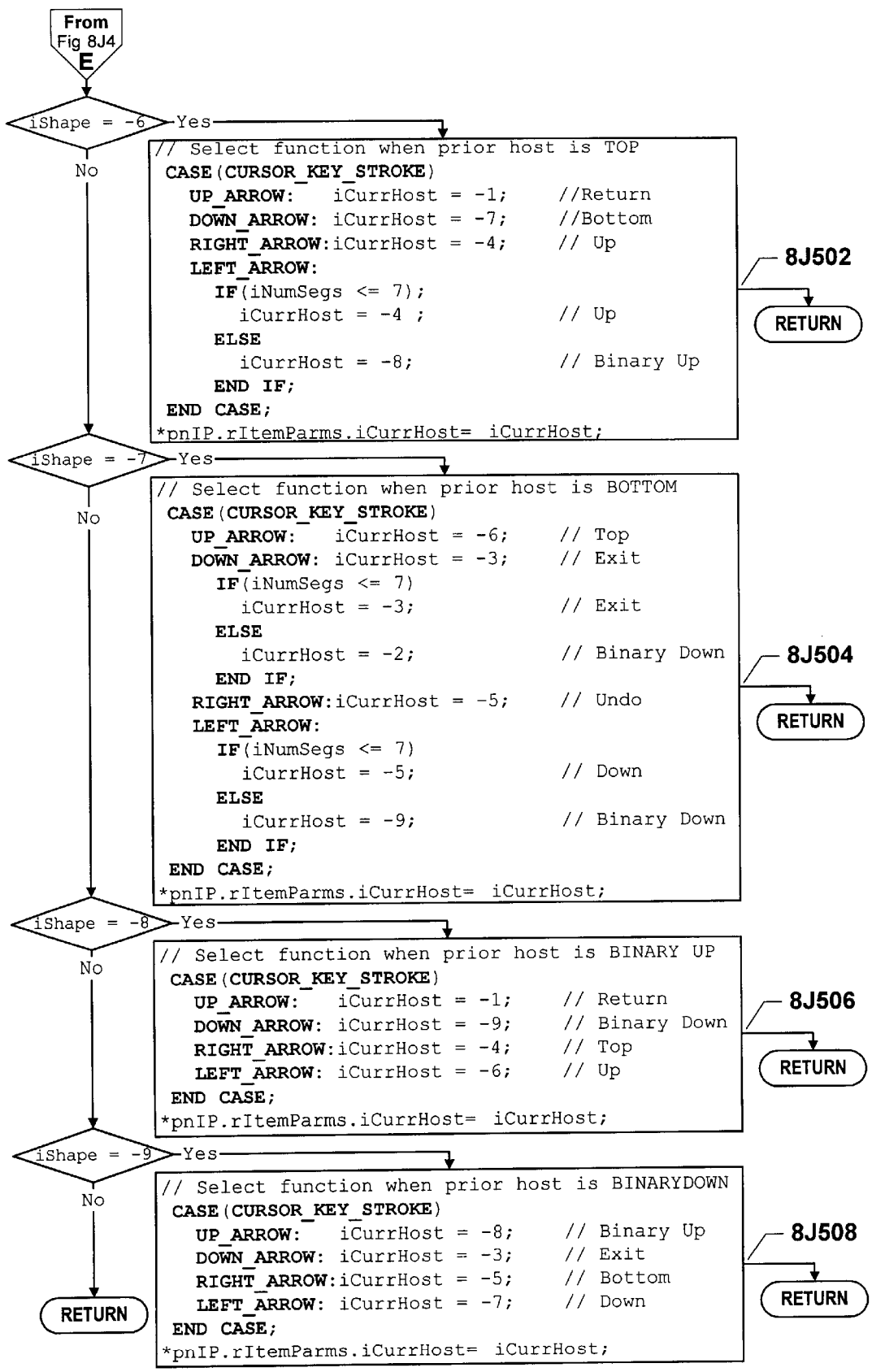
FIGURE 8J5

METHOD TO ACHIEVE LEAST EFFORT SELECTION FROM AN ITEM LIST OF ARBITRARY LENGTH

BACKGROUND OF THE INVENTION

1. Field of the Invention

The present invention relates generally to the fields of operating systems and their graphic user interfaces, application software, display of item lists, and the selection of items from such lists using a least possible physical effort.

2. Description of the Background Art

Typically a list box is a rectangular graphic containing an arbitrary, vertical list of items displayed one item per line from which one or more desired items can be selected using either mouse or cursor control manipulation. List boxes are commonly integrated into the Graphic User Interface (GUI) of current operating system for use in making selections from such data sets as Font names, scaling sizes, file names, etc. Combo boxes combine a list box with an edit box to enable the user to update the item list. List/Combo Boxes evolved from research conducted by Xerox during the late 1970's, adapted to the Apple Lisa and the X-Windows system in the 1980's, and subsequently influenced the design of Microsoft Windows in the early 1990's. While manuals of style detail how to format list/combo boxes, a search of the professional literature and review of commercial products concludes that scant research has been published and there has been only modest design changes since their original commercial introduction. This invention alters this picture since the very different list display and the resultant management capabilities made available by this invention enables the user to display and select one or more items from a list with considerably less physical effort than is required using techniques presently employed.

Richard Simon, (Windows 95 WIN 32 Programming API Bible, 1996, p. 26) suggests that a list/combo box control should display between 3 and 8 items. With lists of this size the user action required to make a selection is either to traverse the mouse to the desired item and left clicking or to stroke the "↓" and "↑" cursor control keys to illuminate the desired item and stroke the "Enter" key. For lists exceeding approximately eight items, the current art generally offers a scrolling capability and some manifestation of "Page-Up" and "Page-Down" function keys. A traditional scrollbar, located at the side of the display rectangle, provides a thumb and possibly "Up" and "Down" scroll buttons commonly positioned at the top and bottom of the scollbar. Once the cursor is in the scrollbar any of three options are available to alter the items displayed. A left click within the scrollbar body scrolls the display to the same relative location in the list as the click was in the scollbar. An alternate scroll technique is to drag the thumb until the desired item becomes visible. Less rapid but more visually comprehensible scrolling is achieved via the scroll buttons. A single click on either of these buttons scrolls the list a given number of items—usually 1 to 3—in the indicated direction. A press performed on either scroll button initiates continuous scrolling until the button is released. When the desired item is displayed on the computer screen it is selected by traversing the mouse to highlight the desired item followed by a left click. Inclusive selection of contiguous items between the currently illuminated and the previously selected item is generally accomplished by a "Shift+Left-Click" operation. Multiple items at arbitrary locations can generally be selected via successive illumination of desired items and performing a "Ctrl+Left–Click" operation on each item desired.

The current art of the scrollbar contains several sub-optimum design features. Use of the scrollbar requires an initial traverse of a distance that typically exceeds half the width of the display rectangle. Many users find the time between a click on the scrollbar and completion of the scroll excessive and opt instead to employ the thumb drag technique. Some applications—Microsoft Windows Explorer and Visio being examples—display the thumb with a height proportionate to the number of items in the list. When the list is long this design can result in a thumb that presents a very narrow target when approached from the side. Acquiring such a target entails a notably more physical effort than is required to acquire a thumb having height at least equal the thumb width. Once the thumb is acquired, a thumb drag over a long item list can result in a scrolling speed that exceeds the capacity of some users to interpret the items scrolled. An additional disadvantage of the thumb common to long item lists is that to display a desired item the user must drop the thumb within a range of a few pixels. Many users find achieving such precision excessively time consuming and instead employ the thumb drag technique to reach the neighborhood of the desired item and then adopt an alternate technique that demands less muscular control to display the actual item desired. Thus, after acquiring the thumb the user performs a bothersome homing to either acquire a scroll button or the "Page-up" or "Page-Down" keys to perform the final display. To display the top-most or bottom-most item of a list via the scrollbar requires clicking the mouse in the top-most or bottom-most portion of the scrollbar. Targeting these locations, especially when dimensions are not delimited, can be shown more difficult than targeting the top or bottom of the list via the thumb.

Most application systems permit the user to select a desired item via keyboard manipulation. Lack of standard assignments exist among major software vendors regarding the functions assigned the "Page-Up," "Page-Down," Home," and "End" keys. It can be generally assumed that these keys, perhaps in simultaneous stroke with either the "Ctrl" or "Shift," permit the user to illuminate either the first and last of the items currently on display or the top-most and bottom-most portions of the list. Once the desired item is displayed on the screen, manipulation via the "Up-Arrow;" (↑) and "Down-Arrow," (↓) keys is performed to change the item highlighted. The generally accepted standard is that a stroke of the "↑" or "↓" key illuminates, respectively, the item preceding or following the item that currently hosts the cursor. If a "↑" stroke illuminates the top-most item, an additional "↑" stroke wraps to highlight the bottom-most item of the list. The obverse holds for "↓" stroke. Once the desired item is highlighted a stroke of the "Enter" key affects selection.

The principle weakness of item selection via keyboard manipulation is that the display of a desired item far removed from the currently displayed page but not near the list's top or bottom can take unacceptable time. When the item list is part of the application software's display rather than the operating system's GUI, some applications provide a "Go To . . . " menu option which displays a dialog box requesting the page number of the page to be displayed. Although the "Go To . . . " technique can be repeated if the desired item is not displayed users will commonly employ "Page-Up" and "Page-Down" to reach the desired display when the item sought is felt to be close. The "Go To . . . " technique is inappropriate unless the user has accurate knowledge of where the desired item is located in the list and the list length. Additionally, the two stage requirement of the "Go To . . . " technique embodies notable overhead. To use this technique the user must either traverse to the menu or execute an accelerator key sequence such as "Alt"+ "E"→"G." Once the dialog box is displayed the user must either key a number or use the mouse to select an item from a list of identifying numbers. Another available technique is to execute multiple strokes of an appropriate key or activate the automated repeat capability from press of that key. Ideally, this leads to sequential display of all items between the current display and the desired display. Commonly, however, the user will either under or over shoot the desired display and must spend additional time to make a correction. It is known that performing these activities can engender a feeling of wasted time in the user.

The present invention enables the user to select one or more items from a list with a level of physical effort that can be quantitatively and objectively shown by my U.S. Pat. No. 5,880,723 patent to be generally less than with currently available techniques. In part the present invention derives from, but notably alters, the application of my U.S. Pat. No. 5,596,699 patent that deals exclusively with the efficient manipulation of menu systems and the handling of the multiple levels of sub-options required by such menu systems. It will be shown that the Linear-Viewing/Radial Selecting Item Box introduces six concepts not found in the current art:

(1) It dynamically determines that number of pages required to display a list in a manner f that minimizes the physical effort expended to display a desired page,
(2) Given the number of pages it dynamically determines that number of items displayed per page in a manner to minimize the physical effort expended to select an item from a displayed page;
(3) It generates a compact central control area comprised of sub-areas that provide page display functions that permit display of a desired page in a manner that minimizes the physical effort expended,
(4) It dynamically generates a central control area comprising only those display functions that permit display of a desired page in a manner that minimizes the physical effort expended,
(5) For long item lists paired scrollbars centrally positioned within the display obviate the need for the initial long traverse needed to access the traditional scrollbar,
(6) Keyboard management of item selection is performed in a manner to permit display of any desired page and make selections from lists in a manner that minimizes the physical effort expended, The Number and Size of List Pages: A page is defined as the number of items the display graphic can present at one time. In this invention the number of pages is the rounded-up quotient of the list length divided by the number of items per page. The screen real estate available to display a page and thus the number of items per page depends on which of two different aspects of a computer session is being engaged. To employ Microsoft terminology, "user space" is defined as those areas of the screen devoted to manipulation of data of direct interest to the user and generally contain such data as client name lists, inventory items, dates, etc. "Non-user space" is screen real estate devoted to controls displayed by the GUI to provide the user with control of the operating system and generally contains such objects as menus, toolbars, status bars, minimize buttons, list/combo boxes, etc.

When an item box is in non-user space, it is designed to not consume extensive screen real estate and thus not interfere with the user's focus on the screen area of current interest. As noted, Richard Simon, whose concern is with non-user space lists, suggests that a list/combo box should display between 3 and 8 items. To display the same number of items this invention employs a display half as high and somewhat more than twice the width of traditional item boxes. This invention displays items in two vertical columns rather than in a single column as with traditional item boxes while permitting item selection with less average effort than with the traditional item box. Thus, if the extra width can be managed without interfering with the area of the screen of user interest, application of Simon's standard permits this invention to make available a display of between 6 and 16 items. Unpublished research by the inventor shows that persons using this invention find up to 18 items per display the upper limit for a display. This invention and the Simon Rule are thus in accord, but in expanded form.

User space for display of item lists in an application program can commonly be extended over the height of the screen to permit simultaneous display of 20 to 30 items. Provided the length of one item does not exceed approximately one-third the width of the user space available for list display, this invention can effectively display 40–60 items per page. When 16 or more items are displayed per side, the angle subtended by each region at the display center discourages item acquisition by a click in the non-rectangular portion of the target area thus disallowing maximum benefits of the design. However, for this case, the user traverses to the rectangular portion of the desired region and clicks. When the click occurs in the portion of the rectangular region closest to the display center, my patent U.S. Pat. No. 5,880,723 shows that the increase in physical effort over clicking within the non-rectangular area is minimal.

Efficient Page Display

The central area comprises from 2 to 9 "function-areas" that are conceptually independent areas shaped such that the aggregation of their various shapes form a set of functions that is generally circular, visually pleasing, and efficient to use. While the generally circular shape is generally advantageous to utilization of this invention, this shape is not a requirement for utilization of this invention and any shape of aggregative function-areas positioned within the shell in a manner to reduce the physical effort of item selection is subsumed by this invention. The invention configures the central area in a manner dependent on the number of pages required to display the item list. Consider item lists of either two or three-pages. For lists of this length the invention provides the "Up" and "Down" function-areas and jumps the cursor at activation to slightly above or below the center line as stipulated during system development. If the initial page chosen for display is Page 1 and the cursor is pre-positioned over the "Down" function-area, a click on "Down" will display Page 2. A second click will display Page 3 if the list comprises three pages or Page 1 with a two page list because of wrap capabilities. Alternatively, if it is opted to initially display the median page, Page 2 will be displayed. A click on "Down" will display Page 3 (or Page 1 with a two page list). A second click on "Down" will display Page 1 due to wrap. Equivalent results are obtained when the cursor is pre-positioned over "Up." Thus, assuming 14 items per page, this invention permits display of the page containing a desired item from among a set of 42 with at most two clicks. There will follow a single traverse—depending on the central area radius—of at most 0.75 inches terminated by a click to illuminate and select the desired item.

When the list requires either four or five pages for its display the invention generates a central area that incorporates the functions "Top" and "Bottom" in addition to "Up" and "Down." If the user opts to initially display the median page, Page 3 is displayed at system activation. Pages 4 and 5 can be displayed with one click and two clicks respectively without requiring a cursor traverse. After a traverse of approximately 0.25 inches into the "Up" function-area one click displays page 2 or an equivalent traverse to "Top" and one click displays Page 1. Thus, if fourteen items are displayed per page, display of any page from a list of 70 items requires at most a single traverse of about 0.25 inch to display the desired item followed by a double click. Similar activity is required if the initial page displayed is Page 1. In this case, Pages 2 and 3 require a single and double click respectively for their display. Display of Page 4 requires a traverse into the "Up" function-area followed by a single click. Display of Page 5 entails a similar traverse into "Down" and a single click. These results are equivalent to those obtained when the median page is initially displayed.

The preceding examples have presumed central areas containing the "Up" and "Down" page changing functions apply to lists of 2 or 3 pages and the "Top" and "Down" functions are added for 4 or 5 page lists. An alternate possibility would initially display the median page with the "Up" and "Down" functions for lists of 2 to 5 pages and add the "Top" and "Bottom" functions when the lists require 6 or 7 pages. After applying the same cursor manipulation logic as employed above, it is seen that with fourteen items per page display of any desired item from a list of up to 98 items requires at most one 0.25 inch traverse followed by a double click.

For an ordered list requiring many pages for its display, the invention generates an oblate central area and adds the Binary-Up, "BU" and Binary-Down, "BD" function-areas to the previous four paging functions. These functions enable the user to perform a binary search for a desired page. When the invention is initialized, a "top boundary" is set to 1 and a "bottom boundary" set to the number of pages required for the list display. Whenever "BU" is clicked the bottom boundary is set to one less than the page currently displayed and the median page between top boundary and bottom boundary is displayed. When "BD" is clicked the top boundary is set to one more than the page currently displayed and the median page between the two bounding variables is displayed. Appropriate use of the "BU" and "BD" functions can display a desired page from a very long list with a small number of function activations. As example, if 14-item pages are employed, 128 pages are required to display a list containing 1792 items. The maximum number of "BU" and "BD" functions required to display any page of this list is $\log_2(128)=7$. Based on likely use of the "Up" and "Down" functions once the page being displayed is close to the desired page, the actual number of function activations will generally be less than this maximum.

When a list requires many pages for its display the invention generates dual scrollbars positioned as exemplified by 1C46 of FIG. 1A. These scrollbars are identical and when the thumb of one is moved, the thumb of the other is moved in identical fashion by processes of the invention. Depending on exigencies of a particular application, the scrollbar body may visibly display "page blocks" that, at the developer's choice, may be numbered to further communicate precise information identifying each page. This centered, dual design provides two effort saving benefits not found in the current art. First, the centrality of the location enables the user to avoid the longer traverse to the edge of the display as is typically required. Second, given the pre-positioning of the cursor when the item box is initially displayed, the user need never traverse a distance exceeding the sum of the central area radius plus half a scollbar length.

While the example of 1A22 may appear to suggest that dual scrollbars appear in the same displays that utilize the "BU" and "BD" function-areas, the invention does not presuppose that binary search functions and dual scrollbars must be utilized jointly. Either capability is presumed available for use as here disclosed whenever warranted by the exigencies of a computer environment.

The invention always provides an enabled "Return" to allow the user declare item selection complete when a multi-selection list is managed. With single selection lists the "Return" is still present but disabled unless explicitly parameterized otherwise. In common with the invention's goal of minimizing the physical effort of item selection, the "Return" area can be activated by a traverse of perhaps 0.5 inches followed by a click. When a multi-selection list is being managed, an "Undo" capability is provided. In the case where there has been prior user activity, "Undo" permits returning the system to the state that existed prior to the current user activity. The invention also provides an "Exit" function-area to enable the user to abort the activation and return the system to the state that existed when list selection was activated. The "Exit" capability is valuable to cancel list changes made by editing activity.

Efficient Item Selection Via the Mouse

The proceeding shows that while the number of items displayed per page depends on whether the invention is to assist the operating system or an application system, each use presents a maximum number of items per page. Exigencies of a particular application will indicate the size of said maximums.

Irrespective of the maximum number of items permitted per display, this value divided into the number of items in the list and rounded up to give the number of pages required to display the complete list. However, it is likely that the last page is only partially filled. The presence of unutilized regions on the last page permits optimization by decreasing the number of regions per page until the last page is maximally filled. By reducing the number of items displayed per page, the common apex of the triangular portion of each region is increased thus lowering the physical effort of acquiring an item.

Efficient Item Selection via the Cursor Control Key Pad

This invention provides for page display and item selection via keyboard control. Although any scheme of keyboard activity that alters the cursor location in the invention's display is subsumed by the invention, there exists a preferred implementation appropriate for most applications. In one aspect, the invention's use of the "↑" and "↓" keys is similar to the current art in that strokes of the "↑" and "↓" keys move the cursor one item up and one item down respectively. In another aspect of the invention, the invention's use of the "↑" and "↓" differs from the current art in that any wrap that occurs is on the column hosting the cursor. As example, if the cursor is in item region 7 of a 12-item page, a stroke of "↑" wraps the cursor to item region 12 rather than moving it to item region 6 as with the current art. The current art generally does not utilize the "→" or "←" keys to move the cursor within an item list. In a manner compatible with user expectations (see: Deborah Mayhew, *Principles and Guidelines in Software User Design*, 1992, pp. 289–296) this invention employs the "→" or "←" keys to jump the cursor to the same relative region in the opposite column of the display. When the designated opposite item region is inactive, the cursor jump is to the bottom active item region of the opposite column of the display. If the right column does not contain an active item, strokes of the "→" or "←" keys are ignored.

To illustrate the efficiency of item selection with cursor control keys, consider, as shown below, that transfer from the central area into a 16-region shell can be performed in a manner locate the cursor on Region 1, 5, 10, or 14. It can be expected that with a 16-item page 4/16=25% of items desired will be appropriately illuminated upon entering the shell from the central area. From Region 1, Region 2 is attained by a "↓," Region 7 by a "↑," and Region 8 by a "→." From Region 5, Region 4 is attained by a "↑," Region 6 by a "↓," and Region 12 by a "→." From Region 10, Region 9 is attained by a "↑," Region 11 by a "↓," and Region 3 by a "←." From Region 14, Region 15 is attained by a "↓," Region 13 by a "↑" and Region 7 by a "←." Thus, with skilled employment of the cursor control keys illumination of any region in shells of size 4 through 16 requires no more than one key stroke.

The same cursor movement paradigm applies when the cursor is manipulated within the central area. To illustrate the cursor control assignments—see FIG. 1D for specifics—presume the cursor is over "Down" of the central area detailed by 1B80 of FIG. 1B. For this central area configuration a "↑" or "↓" moves the cursor to "Up" or "Exit" respectively. If, instead, either the "→" or "←" is stroked the cursor moves to "BD" or "Bottom" respectively. FIG. 8J shows a similar pattern is followed for any central area configuration. From this, it is apparent that if the cursor is positioned within a function-area—as it is at activation of the display—illuminating any page changing function-area of any central area configuration will never require more than two key strokes.

After central area manipulation displays the desired page, the user performs a simultaneous "CRLT" plus a cursor control stroke. The cursor control key stroked determines which region becomes the cursor's host; namely: "Ctrl+↑", "Ctrl+↓", "Ctrl+←", and "Ctrl+→" moves the cursor to the regions specified in the above example. With multi-selection lists, the central area is re-accessed by a "Ctrl" plus a cursor control stroke. The cursor control key stroked determines which central area function becomes the cursor's host with "Ctrl+↑", "Ctrl+↓", "Ctrl+→", and "Ctrl+←" moving the cursor to "Return", "Exit", "Up", and "Down" respectively. These assignments permit selection of any function-area with at most one additional cursor control stroke.

It is subjectively apparent that this invention enables a user to perform item selection from arbitrarily long lists with notably shorter mouse traverses or fewer keystrokes than is required by the current art. My patent U.S. Pat. No. 5,880, 725 can objectively and quantitatively verify that this perception is valid.

SUMMARY OF THE INVENTION

As more fully described herein, the computer list selection system of the invention generates a plurality of list item target areas that include active rectangular areas responsive to pointing device selection. The rectangular areas each contain a list item, or in some cases a blank field, depending on the number of items in the list.

According to one aspect of the invention, the system dynamically allocates list items to a plurality of individual pages, one page being viewable at a time, such that a portion of the list is displayed in the rectangular areas. A dynamic page allocation system determines the number of list items displayed on a page based on the total number of items in the list.

According to another aspect of the invention, the system further generates a central region in fixed relation to the rectangular areas. The central region is responsive to pointing device selection to control navigation among items in the list. The central region may be divided into sub-regions each providing different navigation functions. The system changes the function and number of sub-regions based on the number of pages or the number of items in the list.

According to yet another aspect of the invention, the sub-region functions may include binary search control members that are selectively actuable to traverse the list in a binary tree search pattern.

To provide further navigation control, the active central region may also employ dual scroll bars having first and second scroll members disposed respectively above and below the center or origin point of the active central region. The scroll members are linked such that movement of either one causes like movement of the other.

In yet another aspect, the invention provides a cursor position control system that uses a predefined set of cursor movement keys to move the pointing device to predetermined locations within the active central region and alternatively to predetermined locations within the rectangular area.

BRIEF DESCRIPTION OF THE DRAWINGS

FIG. 1 contains four diagrams detailing the format of the item box display:

FIG. 2 contains five flowcharts disclosing the high level structure of computer programs for the item box display.

FIG. 3 contains five definitions of data structures required by the preferred implementation.

FIG. 3A1 through 3A2 is a set of data structures appropriate for the generation of the preferred implementation of the invention.

FIG. 3B1 through 3B3 is a set of definitions of the variables stored in the data structures disclosed by FIG. 3A.

FIG. 4 contains five diagrams illustrating how data structures disclosed by FIG. 3 are generated during a representative employment of the invention.

FIG. 6 is four pseudo-code flowcharts disclosing the preferred implementation for generation of shell and central area parameters.

FIG. 6D is a flowchart of pseudo-code to generate data structure rCentralParms.

FIG. 7 is eight pseudo-code flowcharts disclosing the preferred implementation for the generation and display of the initial page at activation of the Item Box Subsystem.

FIG. 7B is a flowchart of pseudo-code that allocates memory required for Item Box Subsystem activation.

FIG. 7C1 through 7C2 is a flowchart of pseudo-code that determines the most appropriate shell size and central area configuration.

FIG. 7E1 through 7E4 is a flowchart of pseudo-code that paints the said most appropriate central area configuration to the display screen.

FIG. 7F is a flowchart of pseudo-code that prepares the initial page of items displayed

FIG. 7H is a flowchart of pseudo-code that generates and paints the two scroll bar thumbs.

FIG. 8 is thirteen pseudo-coded flowcharts disclosing the preferred implementation for management of user manipulation of the item box.

FIG. 8A1 through 8A2 is a flowchart of pseudo-code that identifies and responds to manipulations of the item box.

FIG. 8B is a flowchart of pseudo-code that updates the item box after an edit of the item list.

FIG. 8I is a flowchart of pseudo-code that performs the Undo function.

FIG. 8J1 through 8J5 is a flowchart of pseudo-code that manages cursor motion via the cursor control keypad.

DETAILED DESCRIPTION OF THE PREFERRED EMBODIMENT

Conventions and Notation

The preferred implementation is presented as a series of computer processes expresses in pseudo-code. To enhance clarity of this pseudo-code there is no attempt at succinctness through use of specialized, language specific statements such as are common in, say, C++. Rather, the intent is to employ generic statements whose interpretation will be obvious to those of normal skill in the programming arts. Also, to add clarity to the flow of logic, this pseudo-code does not provide complete detail regarding the passing of the basic data structures between processes via declarations of global data, arguments in calling statements, etc. FIGS. 3 and 4 define and illustrate use of the ten major data structures of the preferred implementation in such detail that a programmer of typical skill will readily understand how to make appropriate data structures available as needed.

Individual components of the figures are identified according to the notation template "cSpxx". The left-most integer, "c," identifies one of the eight categories of figures; each category dedicated to a separate aspect of the invention. Categories are, in turn, divided into related but separate subjects identified by a capitalized letter represented by "S" of the notation template. Full disclosure of the material of a subject may require more than one page. The "p" of the notation template identifies the page of a subject by sequential integers commencing with 1. If disclosure of a subject requires one page, the "p" is deleted for succinctness to give a notation template of "cSxx". The "xx" identifies a particular item within the page. The "xx" values on a page carry no implication except for the notation "OO" which communicates that a pseudo-code flowchart is being identified or referenced.

Strings in bold represent reserved words that either identify reserved or functions presumed available to the programming language in which the invention is expressed or suggest names of messages presumed available to the operating system. Non-bold strings contain two conventions to aid their interpretation. Longer strings commonly contain embedded capital letters. Such strings comprise concatenated sub-strings of capitalized words or abbreviations selected to suggest their purpose. Strings containing left-most capital letters identify Procedures or Functions. Strings commencing with lower case letters identify data types:

a→array.

b→Boolean.

c→(X,Y) i.e., an array of coordinate values.

i→integer.

ll→linked list.

n→node of a linked list.

p→pointer.

*p→X reference to the variable pointed to by "p."

r→record or real (context identifies usage).

s→string of characters.

win→handle to the window displaying an item page.

Dot notation, "." embedded in strings denote a member of a data structure. Thus, rRegionParms.iMaxRegions references the iMaxRegions variable in the rRegionParms data structure.

Overview to Item Box Display

Figure 1A:
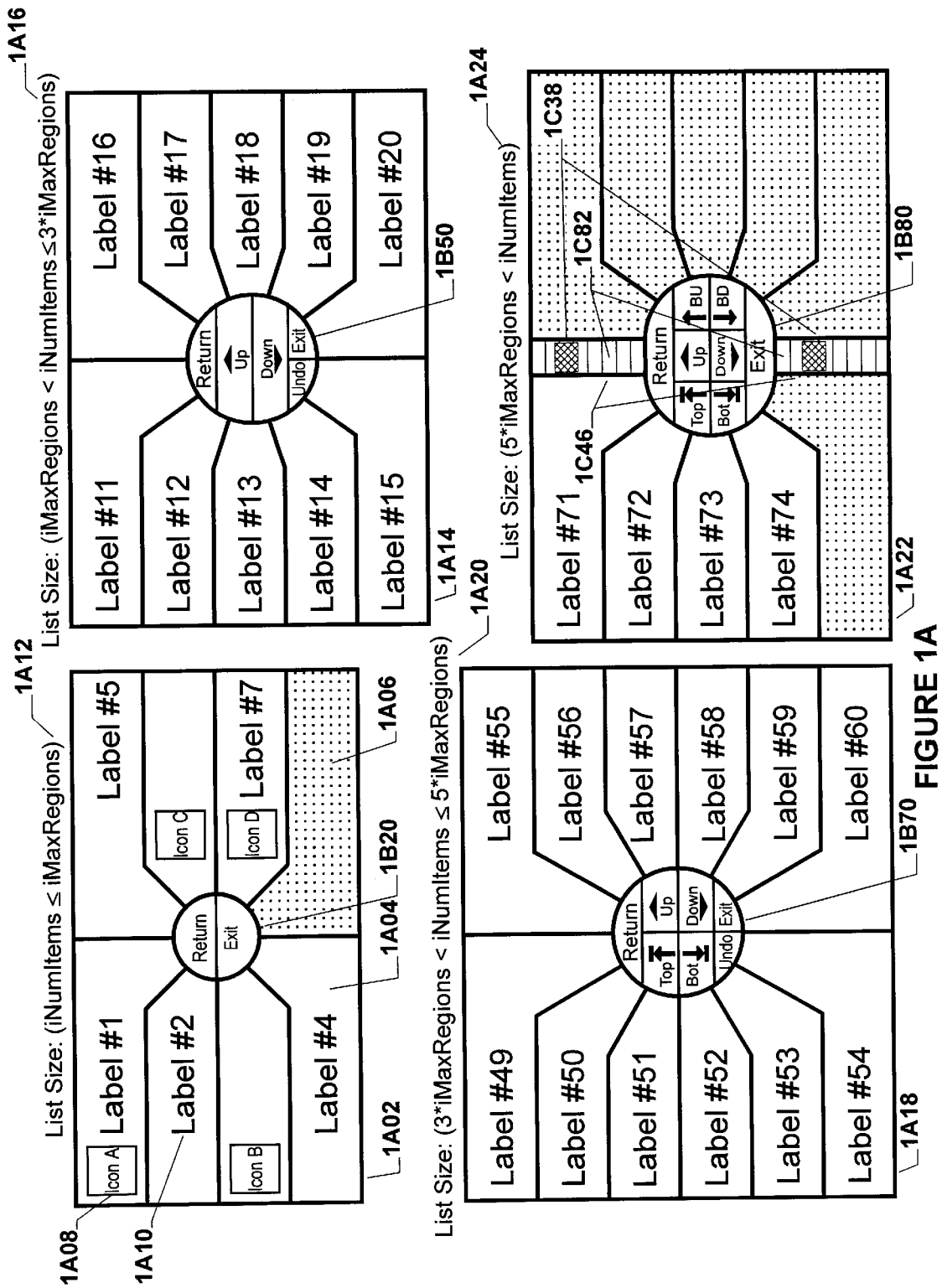
FIG. 1A is a diagram illustrating four of the many related ways the item box display can be generated.
Figure 1B:
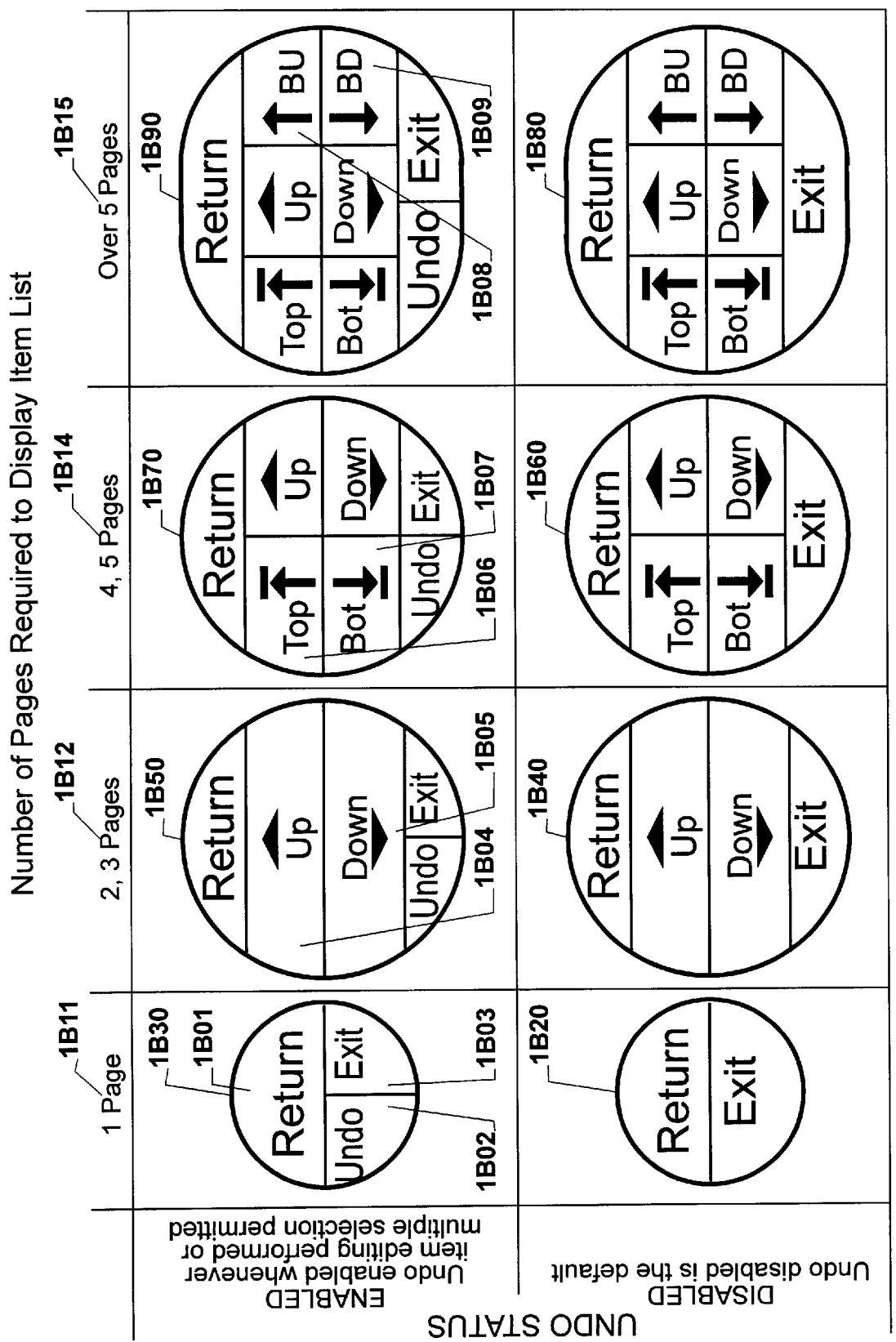
FIG. 1B is a set of diagrams presenting the eight preferred configurations for the Central Area for any item box display.

FIGS. 1A and 1B disclose components for a graphic that enable a computer user to perform item selection from a list with notably less physical effort than with the current art. This graphic comprises two interacting parts. The "shell" enables the user to highlight and select the desired item. The shell comprises an aggregation of "regions." Each region, exemplified by 1A04, comprises a non-rectangular portion and a contiguous rectangular portion. Any even number of regions may be combined in the manner depicted by FIG. 1C to form shells of differing size as exemplified by 1A02, 1A14, 1A18, and 1A22. Any particular set of items displayed in the regions of a shell comprises a "page." If it is desirable for continuity purposes, items on a page may display one or more items of the prior and following pages. The preferred implementation does not employ this overlapping of pages but pages with such overlapped items are subsumed within the scope of this invention. If the number of items of the list is not evenly divisible by the number of regions of a shell, unutilized regions—hereafter called "inactive" regions—will exist on the last page. Examples of inactive regions are shown by the single stapled region, 1A06, of 1A02 and the six similarly stapled regions of 1A22. "Active" regions contain an icon 1A08 and/or a label 1A10 and may be selected or de-selected.

Upon activation, the Item Box Subsystem solicits the number of items in the list being processed and determines whether utilizes single or multiple selection. An initial determination of the maximum number of regions that the shell will contain is based on whether the list is located in a non-user or user area of the screen. If the list is controlled by a non-user area, the maximum shell size is iMaxNonUserRegions; if control is by a user area the maximum shell size is iMaxUserRegions. Both of these constants are declared in 3A00. The number of pages in the list is determined by dividing the number of items in the list by maximum shell size. Generally, maximum shell size will not divide evenly into the number of items thus resulting in a partially filled the last page. The shell size is optimized for the given number of pages by reducing the number of regions comprising the shell until it contains the minimum possible number of regions commensurate with display of the list using the given number of pages. Unpublished research by the inventor indicates the maximum shell size should not exceed about 18 regions when selection is expected to occur via click in the non-rectangular area of a region.

The central area comprises an aggregation of irregularly shaped areas termed "function-areas." Six function-areas that alter the page displayed are provided; namely: "Up," "Down," "Top," "Bottom," "Binary Up," and "Binary Down" with the particular set of functions provided for a given display determined by the number of pages required for the list. When appropriately selected, these six functions permit display of any desired page with at most one mouse traverse for lists of nearly 100 items. "Return" and "Exit" functions are always provided to permit normal and abnormal termination of the Item Box Subsystem. If a prior action exists, the "Undo" function is available to provide error recovery. FIG. 1A presents exemplar graphics of the displays generated by the invention. Headings 1A12, 1A16, 1A20, and 1A24 illustrate the size of item lists suggested by the preferred embodiment for which each central area is most appropriate. In this embodiment central area configurations 1B20 and 1B30 are optimum for item lists of one page, 1B40 and 1B50 are optimum for displays of two or three pages, 1B60 and 1B70 are optimum for displays of four or five pages; and 1B08 and 1B09 are optimum for displays of six or more pages. However, this invention does not presume the limits suggested by 1A12, 1A16, 1A20, and 1A24 are inviolate and the actual limits applied to any application will depend on exigencies of that application. Nor does this invention presume that the proposed function set is optimal for all possible computer software. This invention subsumes any configuration of any functions displayed in the central area of a shell as here defined that furthers the efficient selection of one or more items from a list.

Overview to Management of the List Box Subsystem

Processes of 5A02 initiate 6A00 processes to generate parameters required to define all sizes of shell and central area configurations. This activity can be performed one time only when the List Box Subsystem is installed with results written to disk and read as needed. Alternately, this activity can be performed at each computer start-up with the option of either writing parameters to disk or maintaining them in direct access memory. A third approach is to identify the most appropriate shell size and central area configuration each time the List Box Subsystem is activated and to generate the required parameters anew as needed. Which of these approaches is employed will depend on the strategies employed by the operating system for resource optimization and is outside the purview of this invention. Irrespective, of the parameter generating timing, the approach used does not alter the disclosures of this invention that relate generally to an improved method for the selection of one or more items from a list. These variations in the generation of the shell and central area parameters are therefore subsumed by this invention Once the required shell and central area parameters are available, the system enters an infinite loop at 5A04 that is exited only when the computer session is ended. Once the 5A04 loop is entered, the user interacts with the computer, 5A06, with user activity evaluated by 5A08. If the computer session is not ended, 5A10 determines whether the action occurred in a user or non-user area. If a user area is detected the cursor coordinates are stored for use in returning the cursor to the probable area of focus at Item Box Subsystem termination. If the user activity does not relate to item box activation, other processes, 2A08, are undertaken.

When the user requests activation of the Item Box Subsystem, the processes of 7A00 are performed to identify the most appropriate shell size and central area configuration. Pointers to access these most appropriate components of the 3A02, 3A03, and 3A04 data structures are determined and made available for later use. A second loop at 5A12 is then entered with 5A14 soliciting the next user request of the Item Box Subsystem. Processes of 8A00 identify and respond to the request. The 5A12 loop is exited only when the item box is either normally or abnormally terminated.

Note that 5A00 represents the master looping routine that forms the basis of modern GUI based operating systems. It is to be appreciated that, as presented, 5A00 is only suggestive of how such master looping is performed by actual operating systems and is presented here only to indicate how it interacts with the List Box Subsystem Disclosure for the Generation of the Shell and Central Area Parameters

Figure 1C:
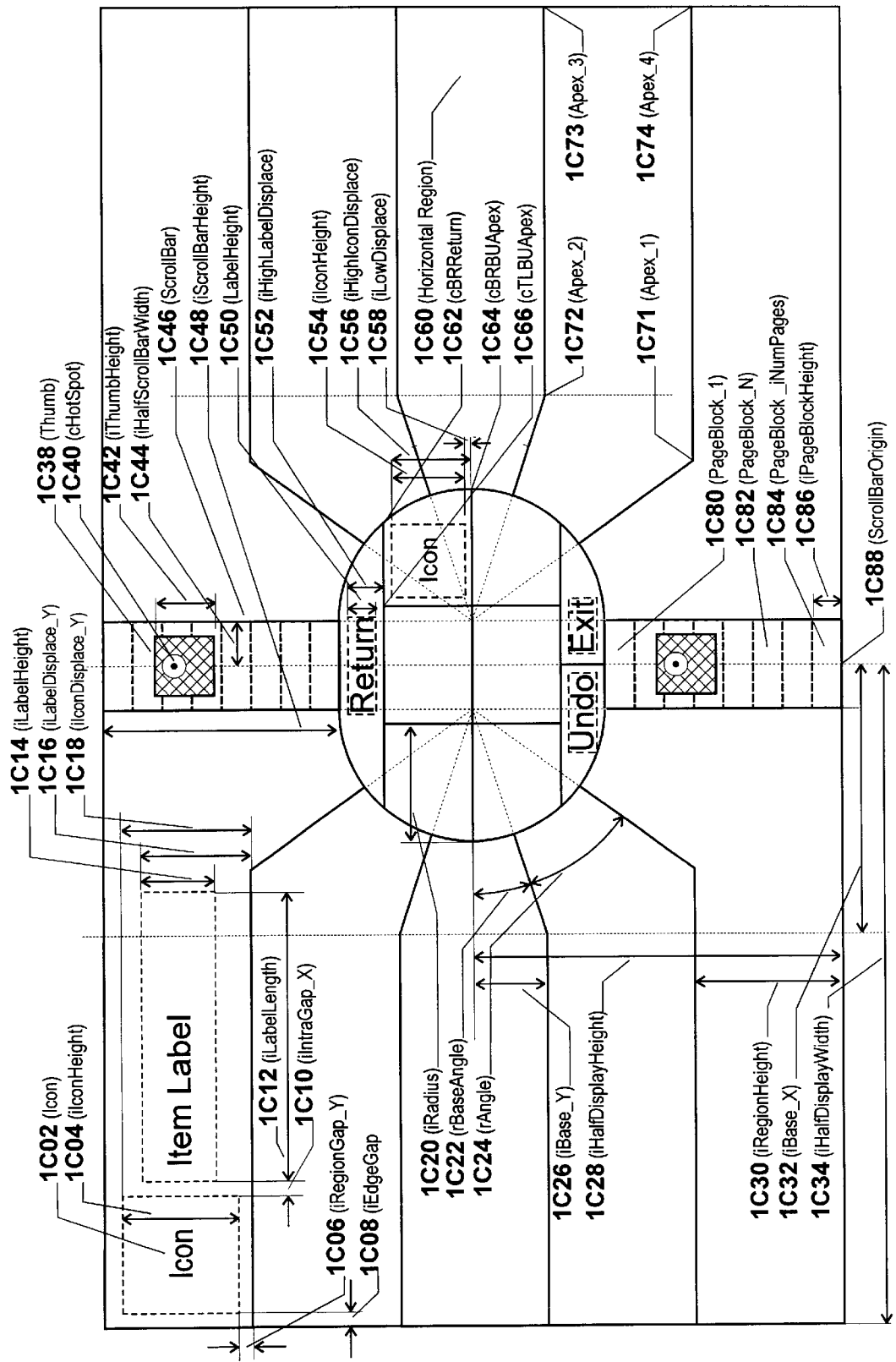
FIG. 1C is a diagram that provides visual representation of many of the parameters employed to render any item box on a computer display.
Figure 1D:
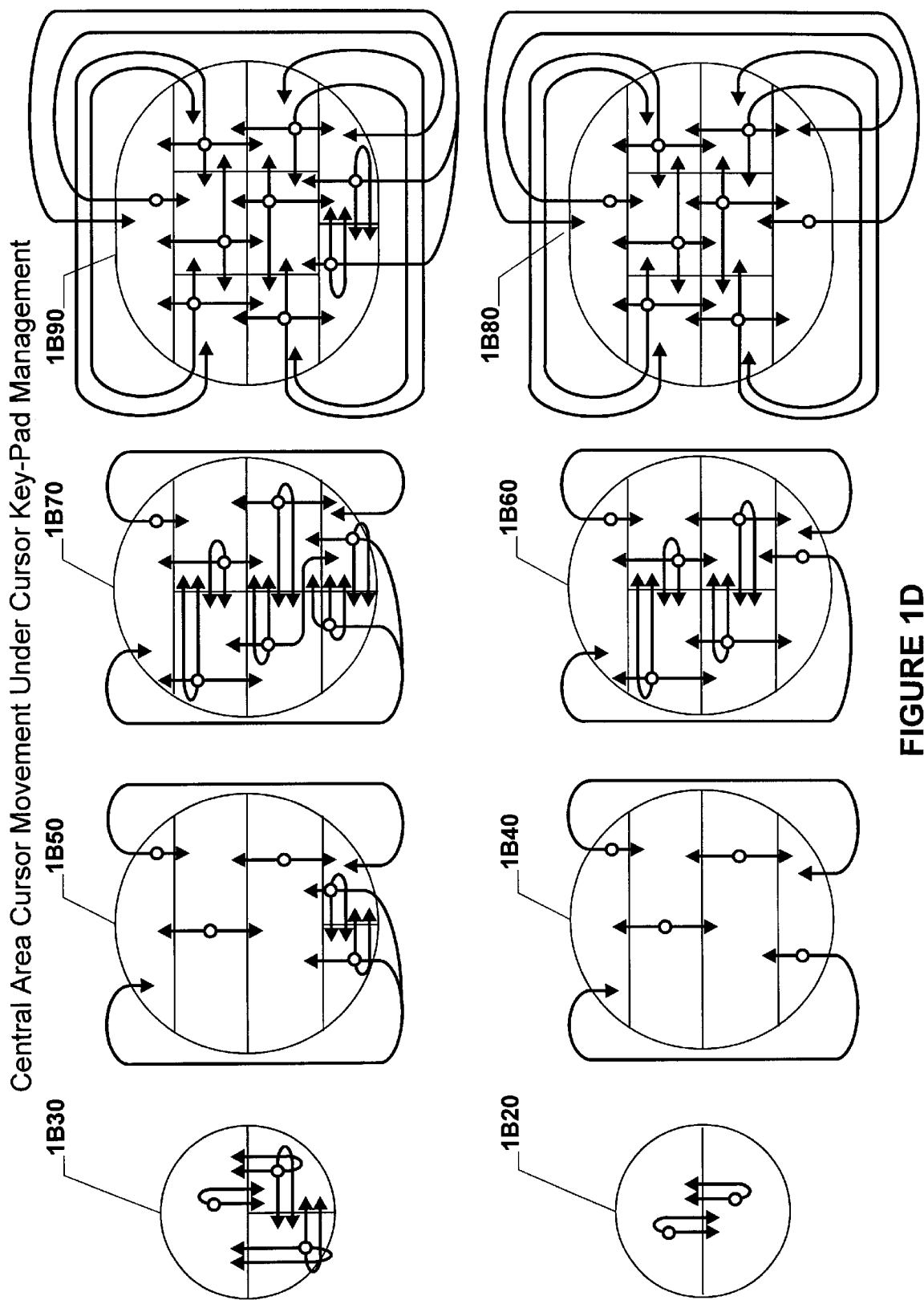
FIG. 1D is a set of diagrams indicating the cursor destination from each possible initial function-area for each of the eight central area configurations.
Figure 2A:
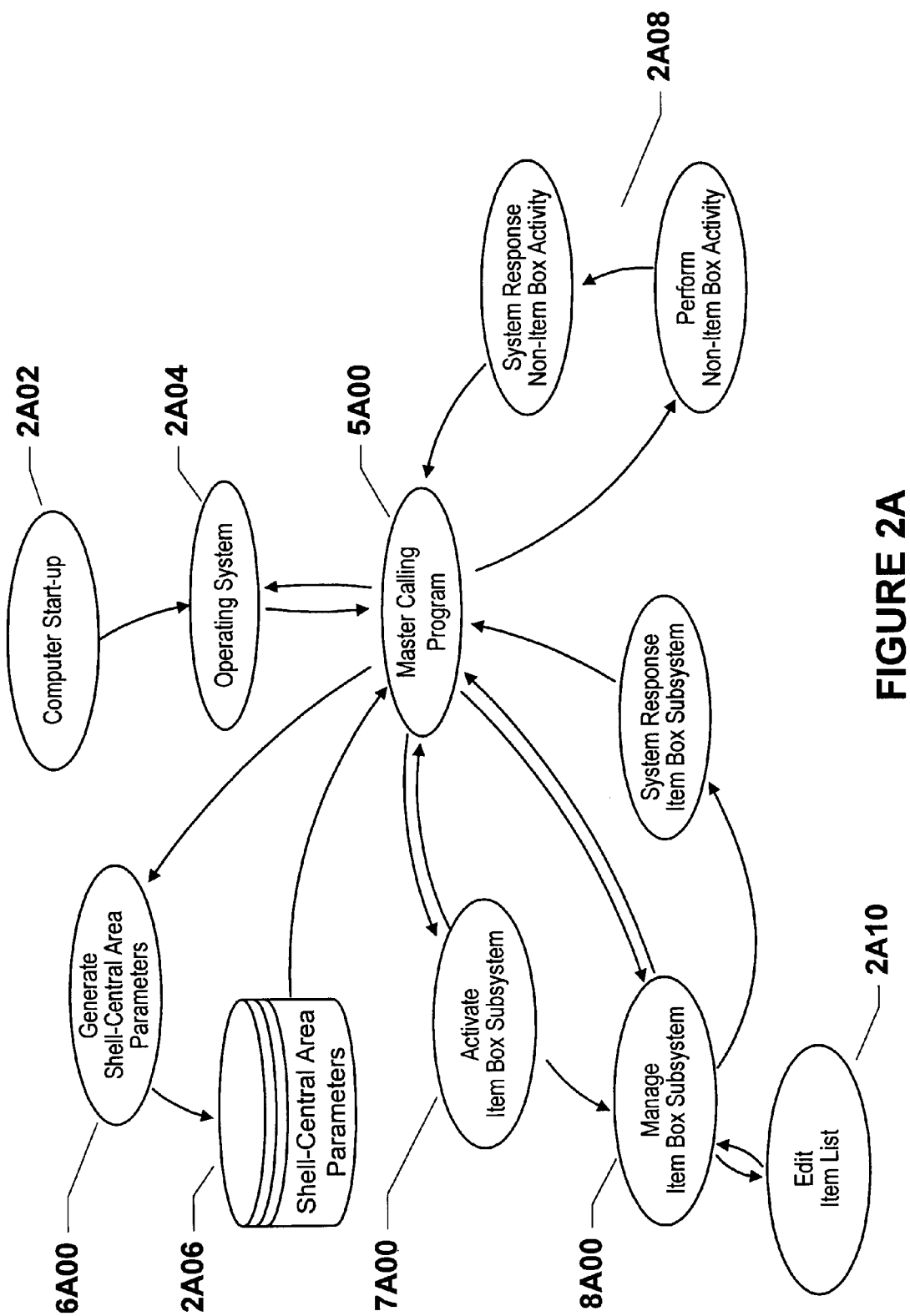
FIG. 2A is a flowchart disclosing the top-level structure of the master-calling program to manage the item box display.
Figure 2B:
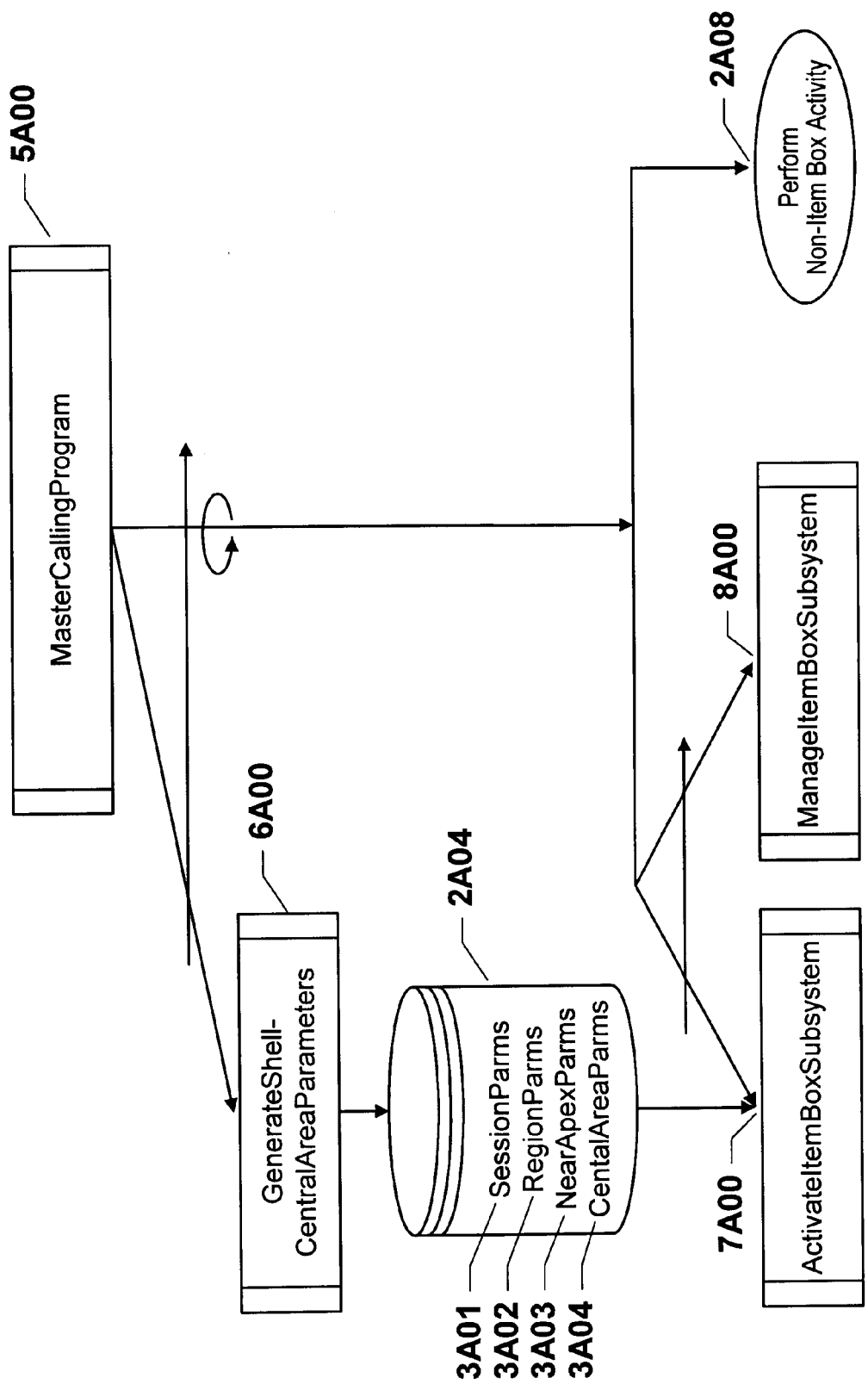
FIG. 2B is a flowchart disclosing high level structure of the master-calling program that activates the Item Box Subsystem.
Figure 2C:
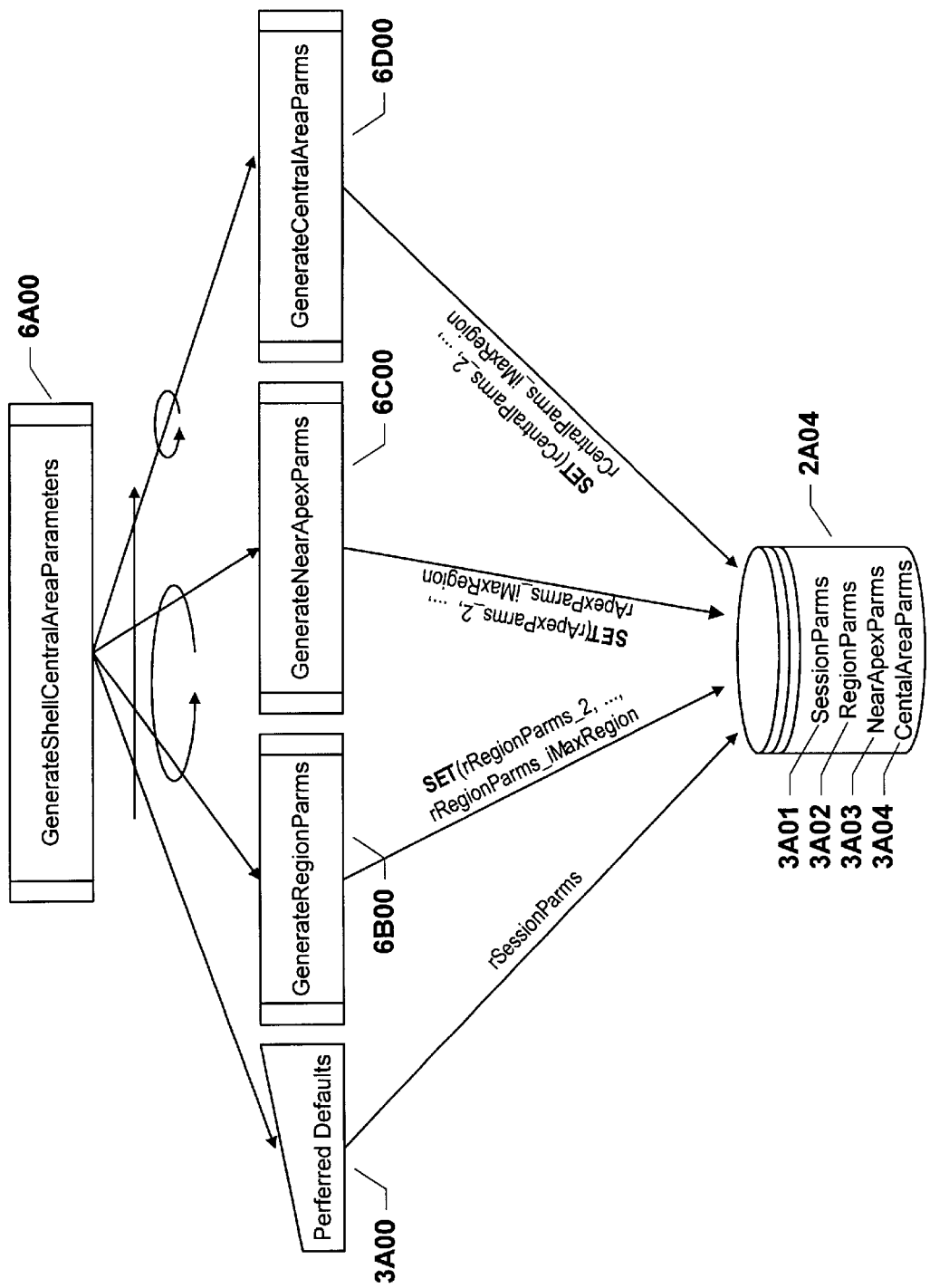
FIG. 2C is a flowchart disclosing high level structure of a computer program that generates parameters that define the shell and central area.

GENERATE ITEM BOX PARAMETERS:

(6A00) FIG. 2C discloses that high-level calling procedures of 6A00 comprise four processes. System administrators and users initially interact with input mechanisms, 6A02, not here detailed, to specify values of 3A00 for which proposed defaults are not acceptable. Once all appropriate constants have been introduced, parameters critical to control of all Item Box Subsystem activations are placed in variables of the 3A01 data structure via assignments specified by 6A04. These parameters are defined by FIG. 3B1. As shown by the circular arrow of FIG. 2C, procedures of 6A06 perform repetitive calls first to 6B00, which generates the basic region parameters, then to 6C00, which generates the coordinates of the two region apexes closest to the center. 6A06 shows this sequence to be repeated once for each shell size. 6A08 performs eight calls to 6D00 to successively generate parameters required by each of the eight different central area configurations. This preferred each shell size. 6A08 performs eight calls to 6D00 to successively generate parameters required by each of the eight different central area configurations. This preferred implementation indicates that 6A10 write the completed parameters disk at 2A04. Exigencies of a different environment, as noted above, may suggest an alternate approach to managing these parameters.

GENERATE SHELL PARAMETERS (6B00):

Processes performed by 6B00 divide into two parts. The first part, 6B02, relates to parameters that apply to all shells regardless of size. Parameters referenced by 6B02 are either direct assignments from 3A00 to 3A02 or are simple arithmetic manipulations of 3A00 values prior to assignment to 3A02. Being trivial processes to comprehend they are not expanded upon here.

The second part determines parameter values based on a two component criteria: (1) does the shell have horizontal regions; i.e., regions depicted by 1C60, and (2) is the value of iBase_X, 1C32, assigned or calculated. 1A18 exemplifies a shell with no horizontal regions while the regions of 1A14 that are labeled "Label #13" and "Label #18" depict horizontal regions. When horizontal regions are not present coordinate values that define regions of Quadrants 2, 3, and 4 are easily generated by appropriate reflection of Quadrant 1 coordinates. Because a horizontal region is bisected by the X-axis, such regions are resident to two quadrants and are handled as a special case. The array iQRegion of 3A02 is provided to identify the region defined by the invention to start each quadrant. When reference is to the iQRegion array, this invention defines the four quadrants of a shell to comprise those regions lying wholly within the upper half and lower half of the right and left side of a shell. Index values of the aQRegion array identify the quadrant number referenced. Each element of the aQRegion array is assigned the identifying number of the region closest to the X-axis that is wholly within the quadrant. 6B02 assigns the parameter iNumCycles, a member of 3A02, the value equal to the number of regions contained wholly each quadrant.

The parameter rBaseAngle, 1C22, is the angle between the bottom leg of the first region wholly contained within its quadrant and the X-axis. 6B04 and 6B06 generate parameters for shells without horizontal regions and, consequently, rBaseAngle is assigned a zero value. From similar consideration and in the absence of horizontal regions, iBase_Y, 1C26, also equals zero. 6B08 and 6B10 process shells having horizontal regions. For such shells, 1C22 is one-half the region height. As will be seen in 7D00, the shell having two regions does not employ 1C22 for shell generation and 6B08 sets it to zero.

The parameter iBase_X, 1C32, is the horizontal distance between the Y-axis and the near apex closest to the X-axis for the region closest to the X-axis. For lists of five or more items, 1C32 is determined by the tangent functions given in 6B06 and 6B10. For lists of less than five items, such tangent functions are undefined and iBase_X is assigned a default value that depends on the size of the central area plus a displacement specified by iDefaultBase_X of 3A00. The other item of this part is the variable iHalfDisplayHeight, 1C28. This value is the sum of the height of all regions wholly within a quadrant plus half the height of any horizontal region.

The shell parameters thus generated are listed in 3A02 and 3A03 of FIG. 3A1 with full definitions provided by FIG. 3B1. FIG. 1C provides visual interpretation for those shell parameter definitions whose name is not self-explanatory.

GENERATE NEAR APEX PARAMETERS (6C00):

6C00 deals with the "near apexes;" i.e., apexes of the regions illustrated by 1C71 and 1C72,. During determination of near apexes in quadrant #1, 6C00 names the apex closest the X-axis the "Bottom" apex and the one farthest from the X-axis the "Top" apex. For quadrants 2 and 3 reflection is performed and the "Top" and "Bottom" apexes are renamed Apex_1 and Apex_2 in such a way that Apex_1 is always below Apex_2. The invention subsequently names the apex horizontally opposite Apex-2 to be Apex_3, 1C73, and the apex horizontally opposite Apex_1 to be Apex_4, 1C74.

To determine coordinates of the near apexes 6C00 initially determines whether the shell contains horizontal regions. When horizontal regions are present, coordinates of their near apexes are generated from iBase_X and iBase_Y by the permuted value signs as shown by 6C02. 6C04 tests whether the shell contains only horizontal regions and, if so, immediately returns to 6A06

After initializing the temporary variables rTopAngle, iTop_X, and iTop_Y with the values of rBaseAngle 1C22, iBase_X 1C32, and iBase_Y 1C26 respectively, 6C06 enters a loop of iNumCycles repetitions to generate near apex coordinates for each shell in turn as detailed by 6C08. 6C08 initially reassigns rTopAngle, iTop_X, and iTop_Y to rBottomAngle, iBoftom_X, and iBottom_Y respectively since a "top" value becomes the "bottom" value of the next region processed. The new iTop_Y value is simply the old iTop_Y plus the height of a region and the new rTopAngle is the old rTopAngle plus the rAngle, 1C24. Unless the last region is being processed, the new iTop_X is the new iTop_Y divided by the tangent of the new rTopAngle. When the last region is being processed, the new iTop_X is assigned zero. Once the "top" and "bottom" values are determined for quadrant #1, they are reflected and renamed as specified in 6C10.

Once looping over the regions for one shell size is complete, processing returns to 6A06 and the next larger shell is processed. Once all shells have both the rRegionParms, 3A02, and arNearApex, 3A03, parameters generated, processing passes to repetitive calls that generate parameters for the eight different central area configurations via successive activations of 6D00.

GENERATE CENTRAL AREA PARAMETERS (6D00):

Processes of 6D02 assign values from 3A00 to 3A04. Values manipulated by 6D02 are either non-varying or are simple arithmetic manipulations of 3A00 values applicable to each of the central area configurations. Reference to FIG. 1C provides visual interpretation for most central area parameters with variable definitions provided by 3A04 of FIG. 3B2. While the meaning of iLabelHeight, 1C50, and iIconHeight, 1C54 are presumed evident, other parameters governing placement of labels and icons may be less self-explanatory. The parameter iLowDispalce, 1C58, indicates a specified displacement from a base line to the closest point of the object being considered. Since icons and labels generally have different height two parameters, iHighIconDisplace, 1C58, and iHighLabelDispalce, 1C52, are provided. This embodiment positions objects relative to the coordinate of their top left corner. Persons experienced with programming of computer graphics can readily imagine a variety of techniques for the placement of displayed objects without altering the intent of this invention. Another somewhat obscure variable is the iPerCentRadius parameter of 3A04. This parameter permits calculation of the equal but opposite "Y" displacements from the X-axis of the horizontal lines delimiting the "Return" and "Exit" function-areas. This displacement is the product of the radius, 1C20, and iPerCentRadius.

The second part, 6D04, determines parameter values specific to different configurations of the central area. Because of the few function-areas present in the two and three segment configurations the radius, 1C20, for these configurations is specified by the defaulted parameter iShortRadius found in 3A00. All remaining central area configurations employ the larger radius stored in iLongRadius found in 3A00. Because of the simple configuration of the central area of 1B20 and 1B30, there is no need to employ references other than the origin and radius when generating these central areas. The function-areas of 1B40, 1B50, 1B60 and 1B70 require a single reference point that is not determined directly from the origin and radius. 6D04 thus employs the Pythagorean Theorem to determine the coordinates of point 1C62. With the eight and nine function-area configurations of 1B80 and 1B90, three references are required; namely: 1C62, 1C64 and 1C66. With 1B80 and 1B90 the X-value of 1C62 is the value determined for 1B60 is offset by iHalfScrollBarWidth. The "X" value of 1C64 is the sum of the iRadius and iHalfScrollBarWidth. 1C66 is positioned to divide the sum of 2*iHalfScrollBarWidth, 1C46, and 2*iRadius, 1C20 into three equal lengths.

At completion of 6D04 input-output operations write data structures 3A01, 3A02, 3A03, and 3A04 to disk storage.

Figure 7A:
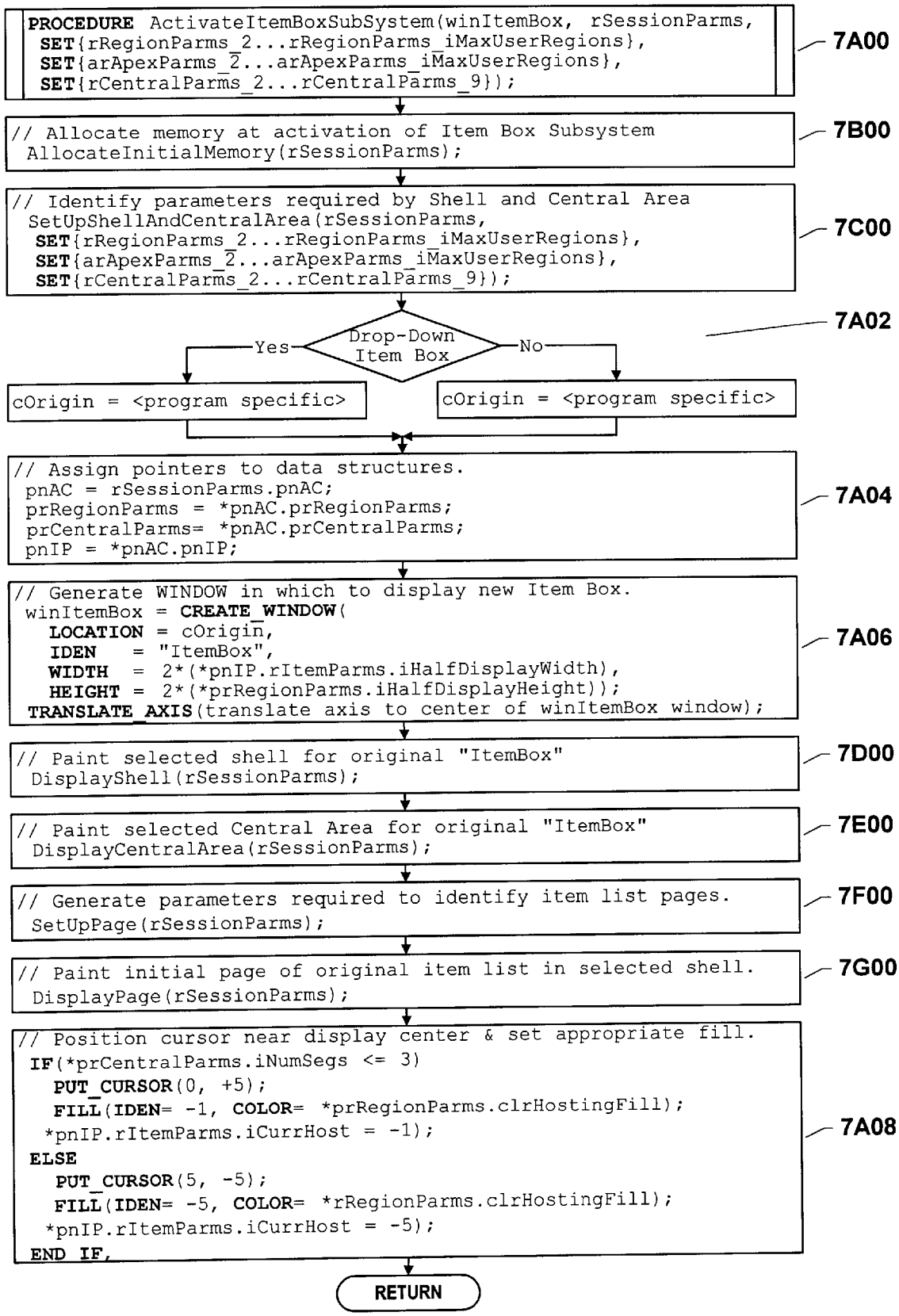
FIG. 7A is a flowchart of pseudo-code that manages the initial display of an Item Box Subsystem activation.
Figure 7D:
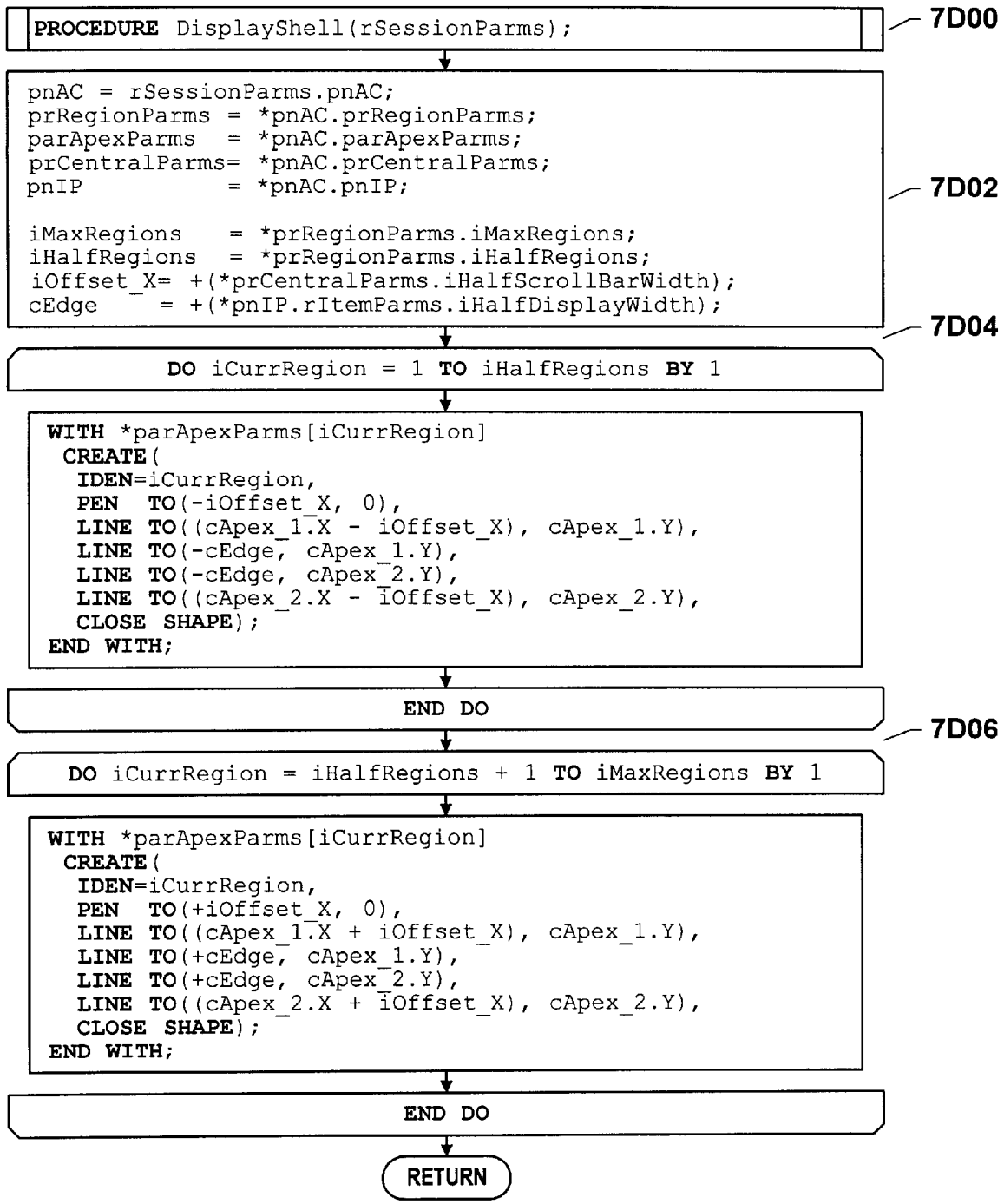
FIG. 7D is a flowchart of pseudo-code that paints the said most appropriate shell to the display screen.
Figure 7G:
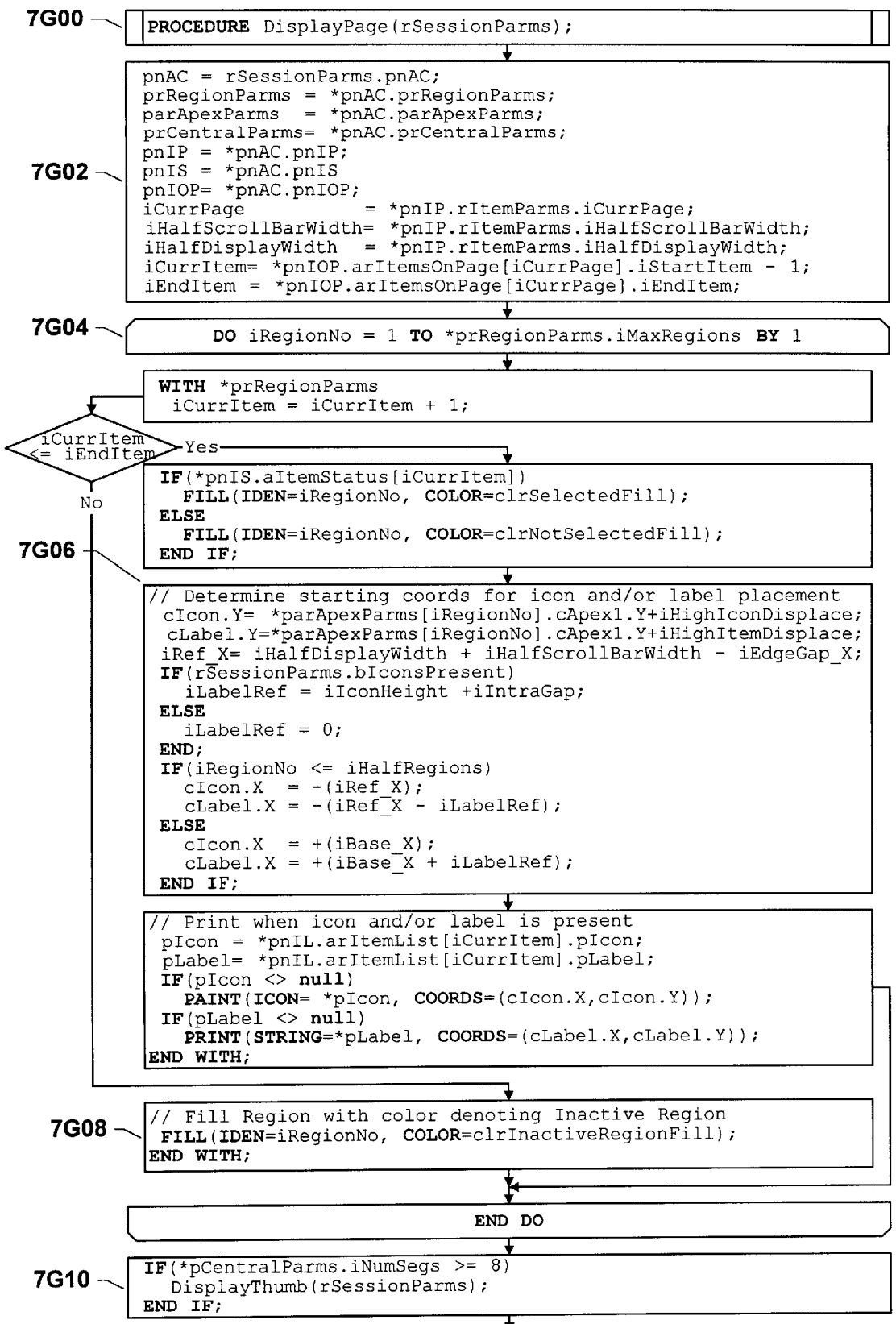
FIG. 7G is a flowchart of pseudo-code that paints the initial item page to the shell.
Figure 81:
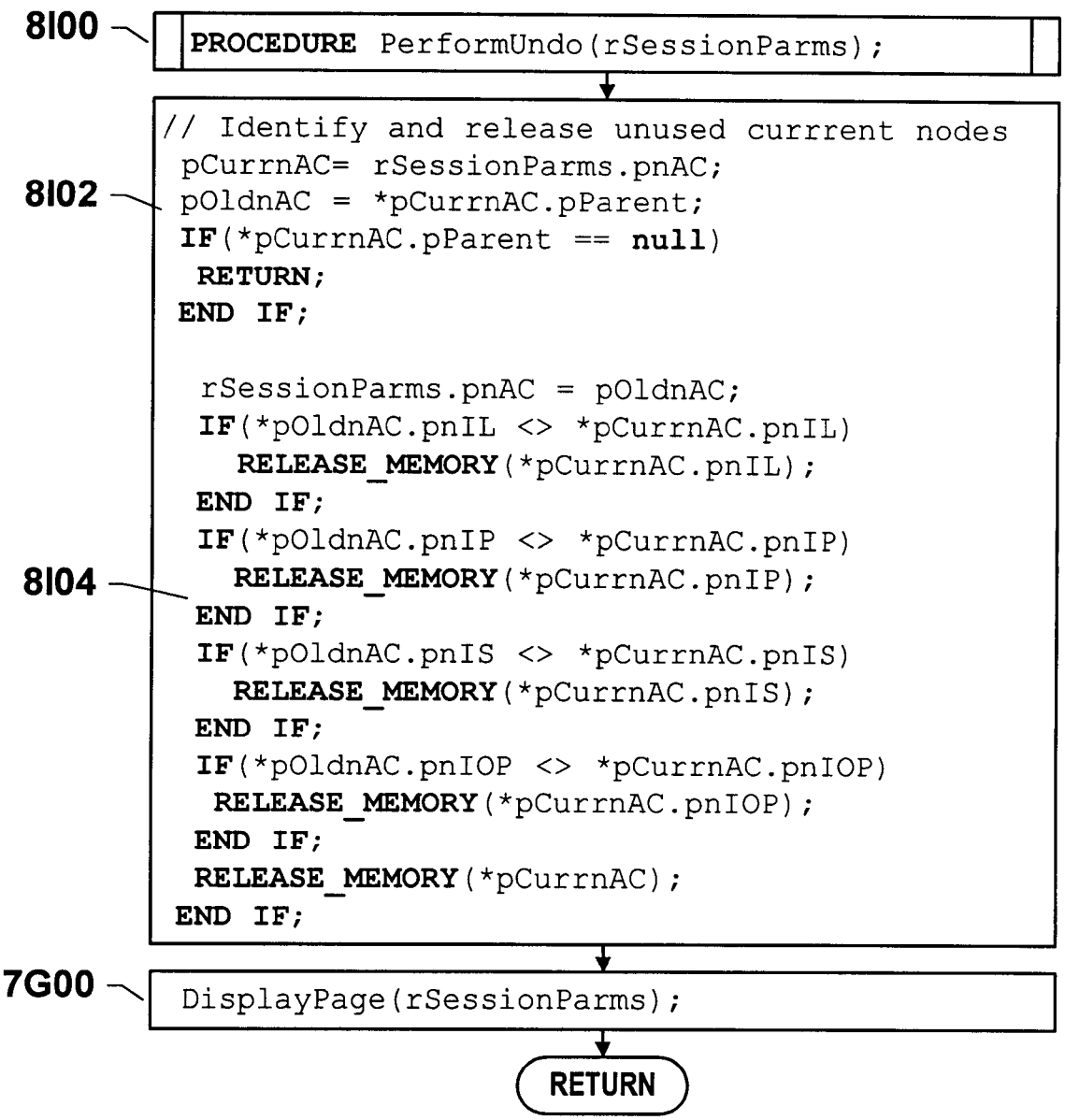

Disclosures for the Activation of the Item Box Subsystem (FIG. 7)

Figure 2D:
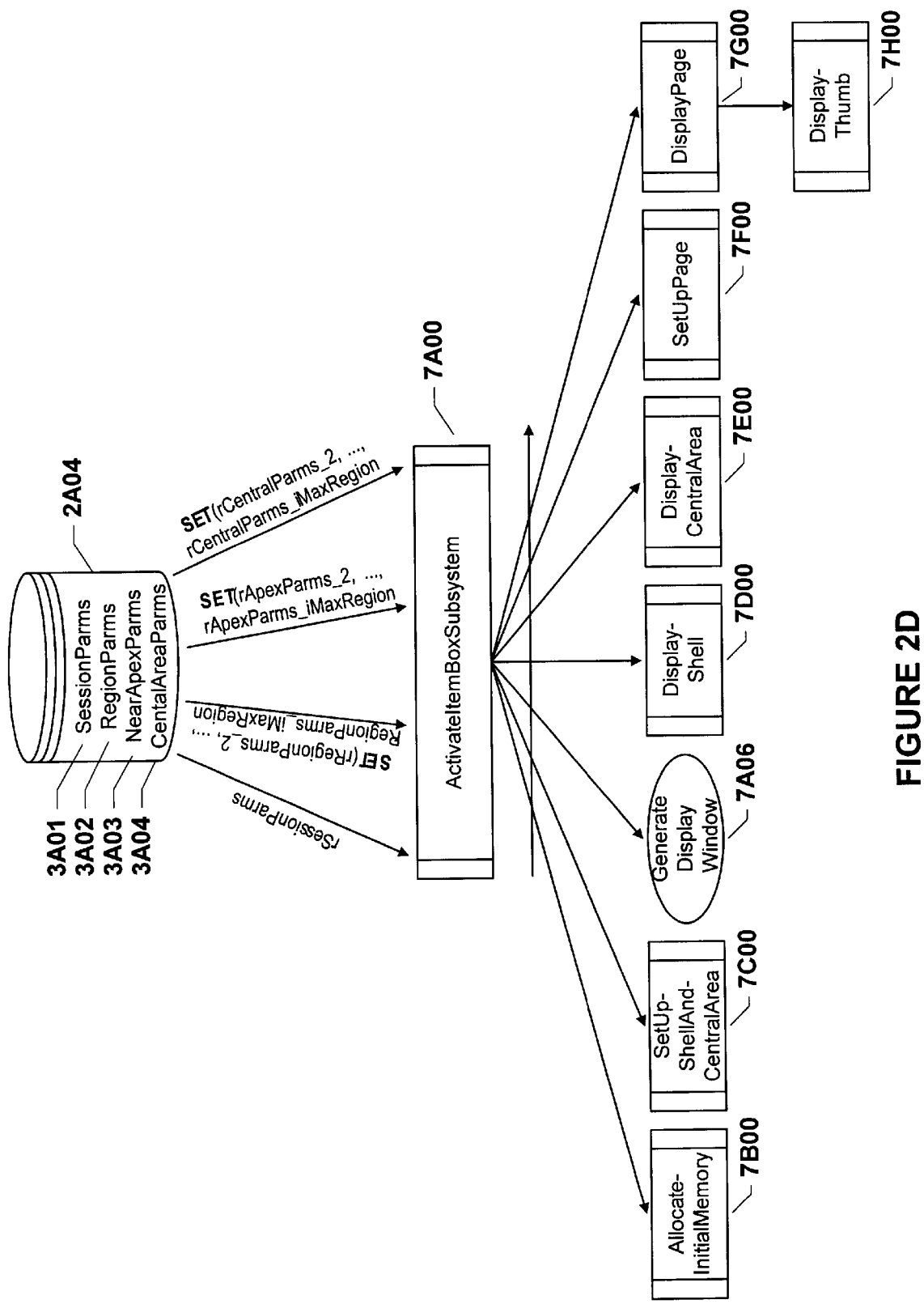
FIG. 2D is a flowchart disclosing high level structure of a computer program that displays the initial page of an item list upon activation of the item box display.
Figure 8C:
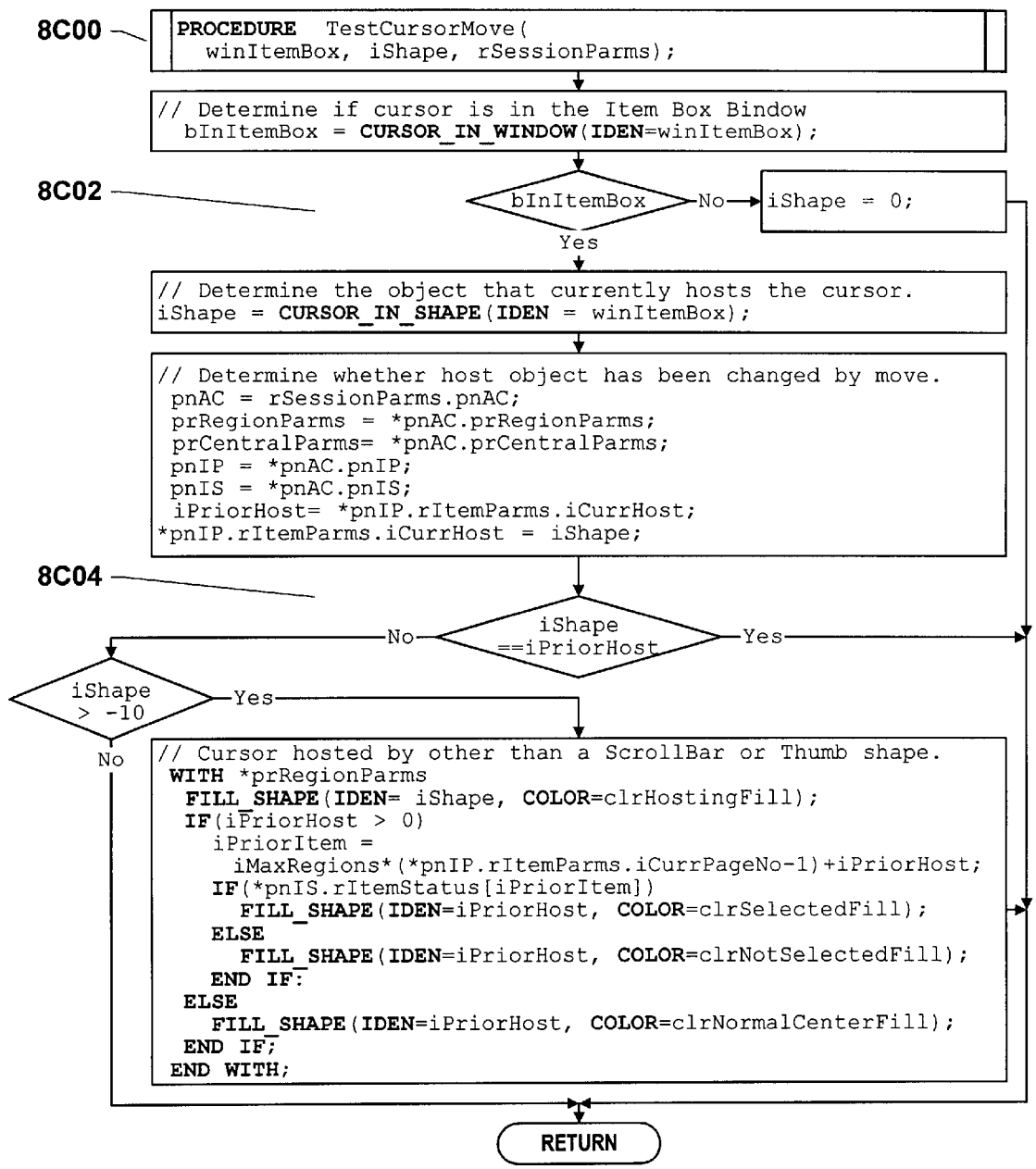
FIG. 8C is a flowchart of pseudo-code that tests for and responds to cursor moves.
Figure 8D:
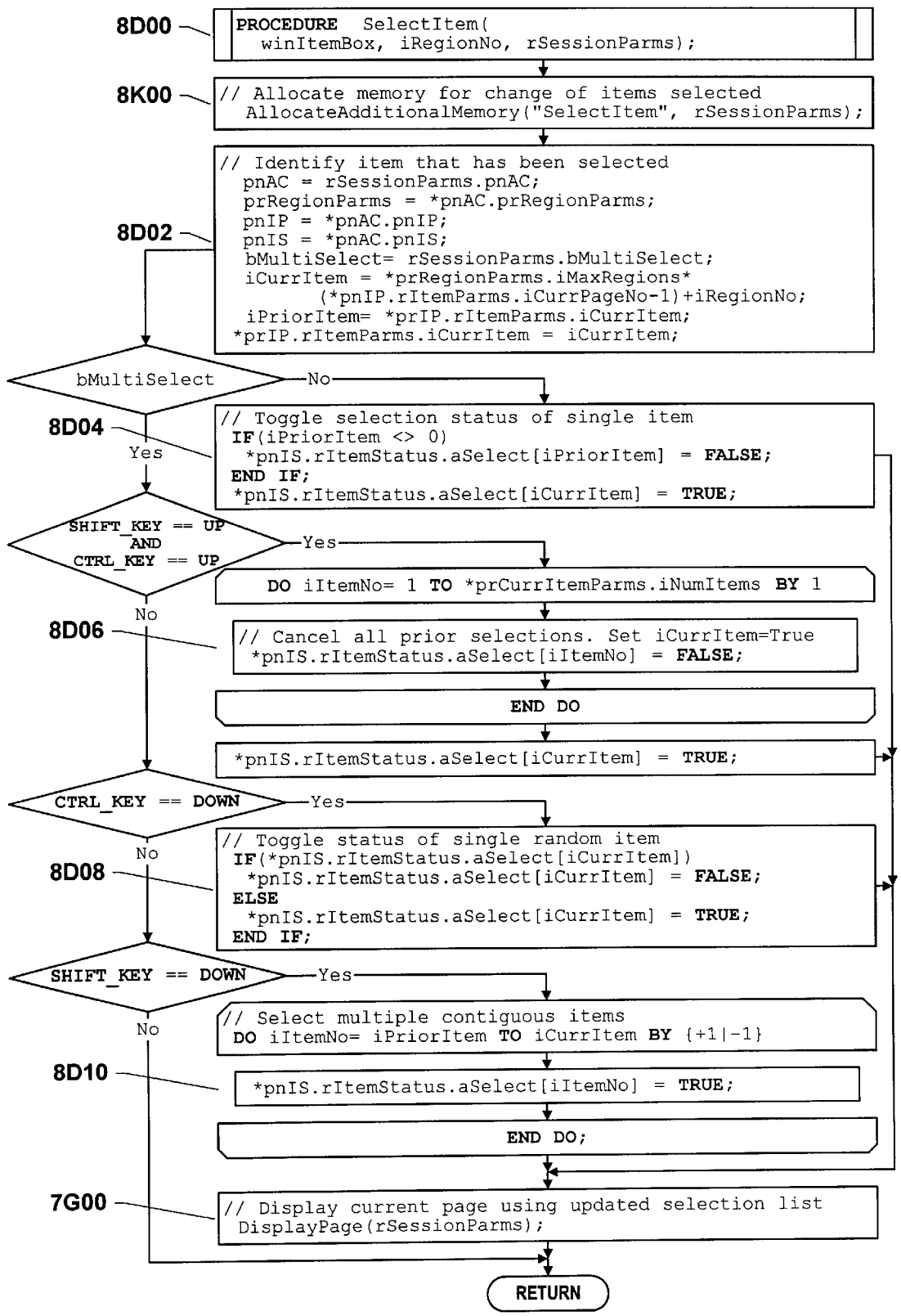
FIG. 8D is a flowchart of pseudo-code that manages item selection.
Figure 8E:
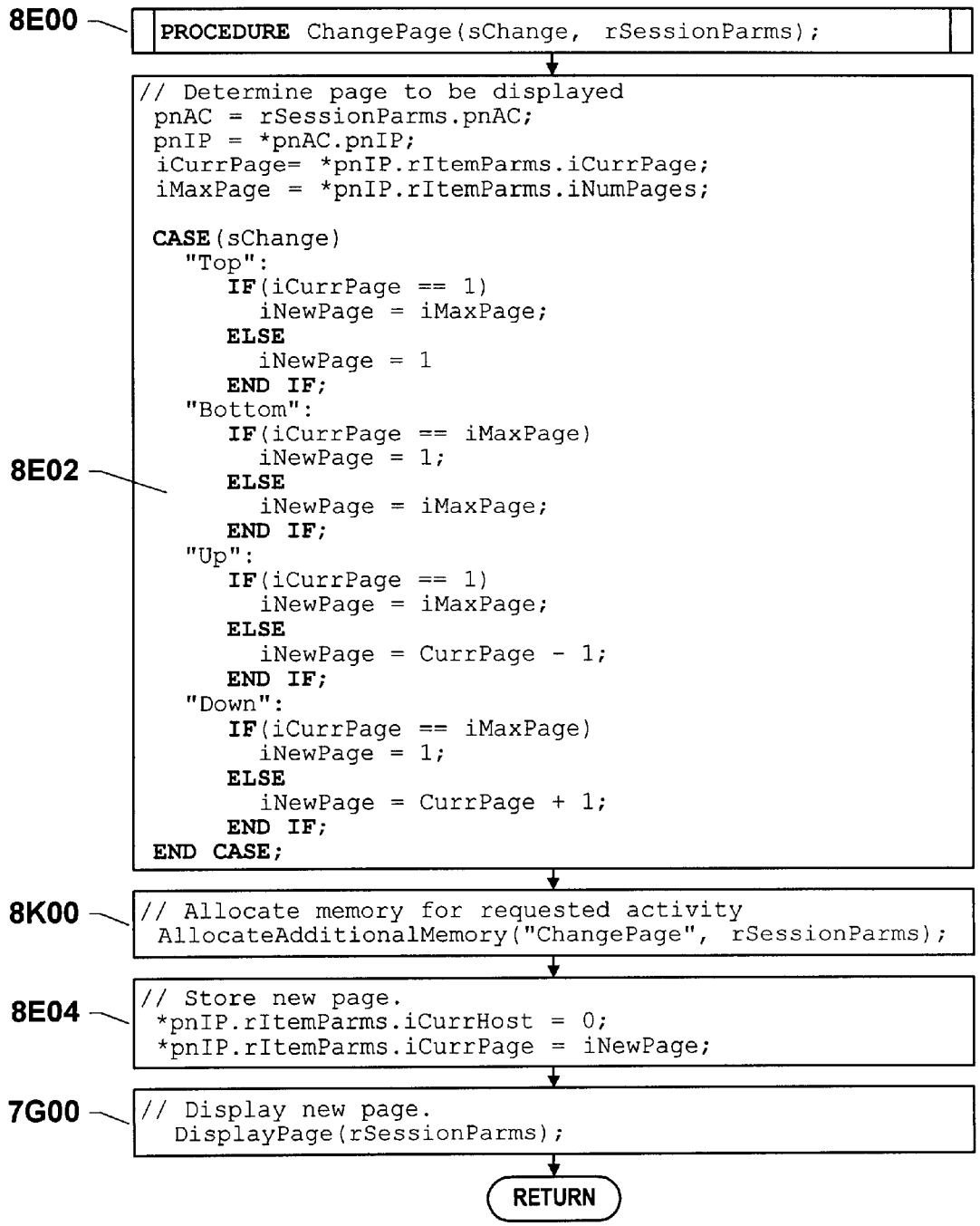
FIG. 8E is a flowchart of pseudo-code that changes the page to be displayed
Figure 8F:
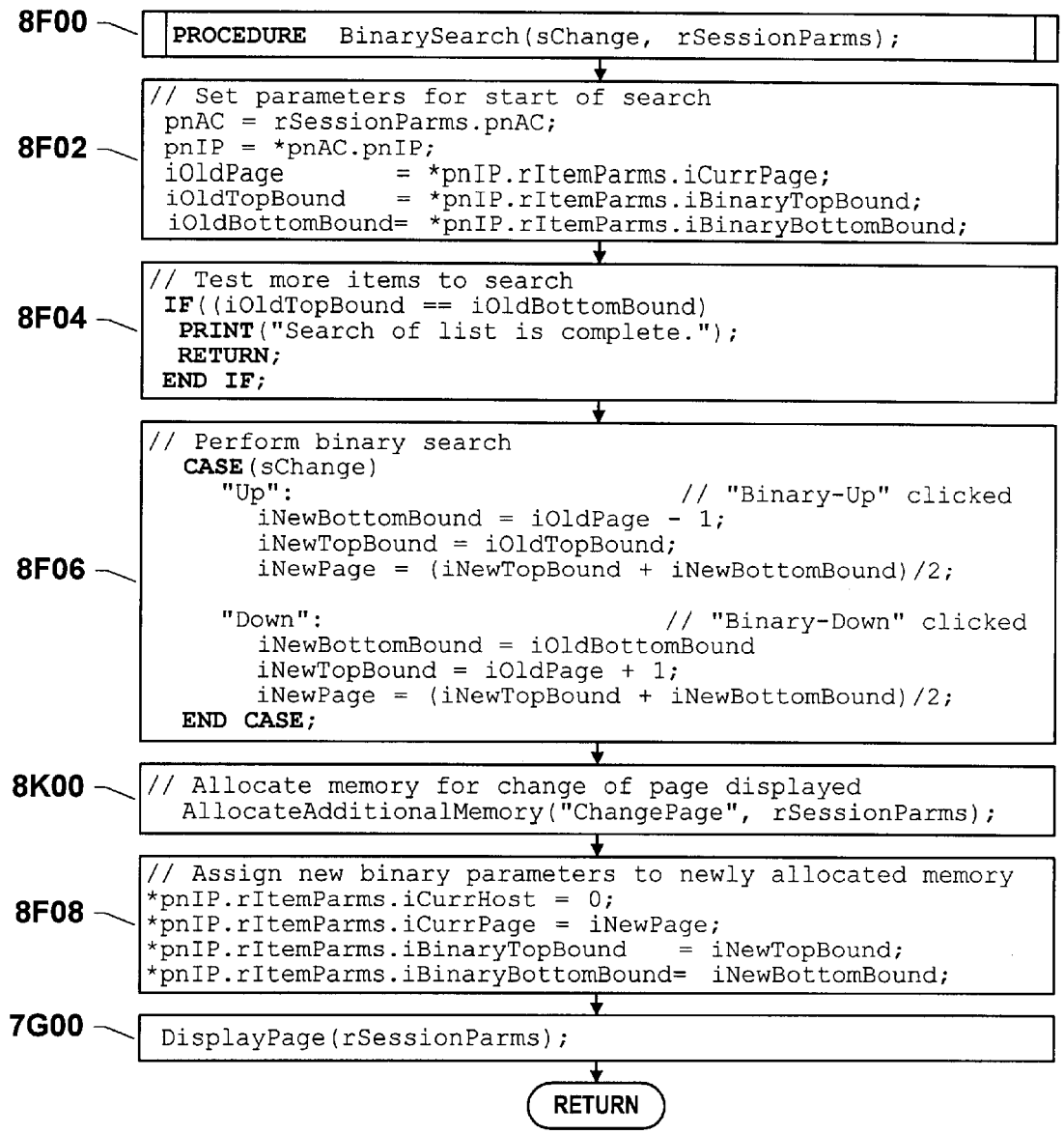
FIG. 8F is a flowchart of pseudo-code that manages binary search of the item list.
Figure 8G:
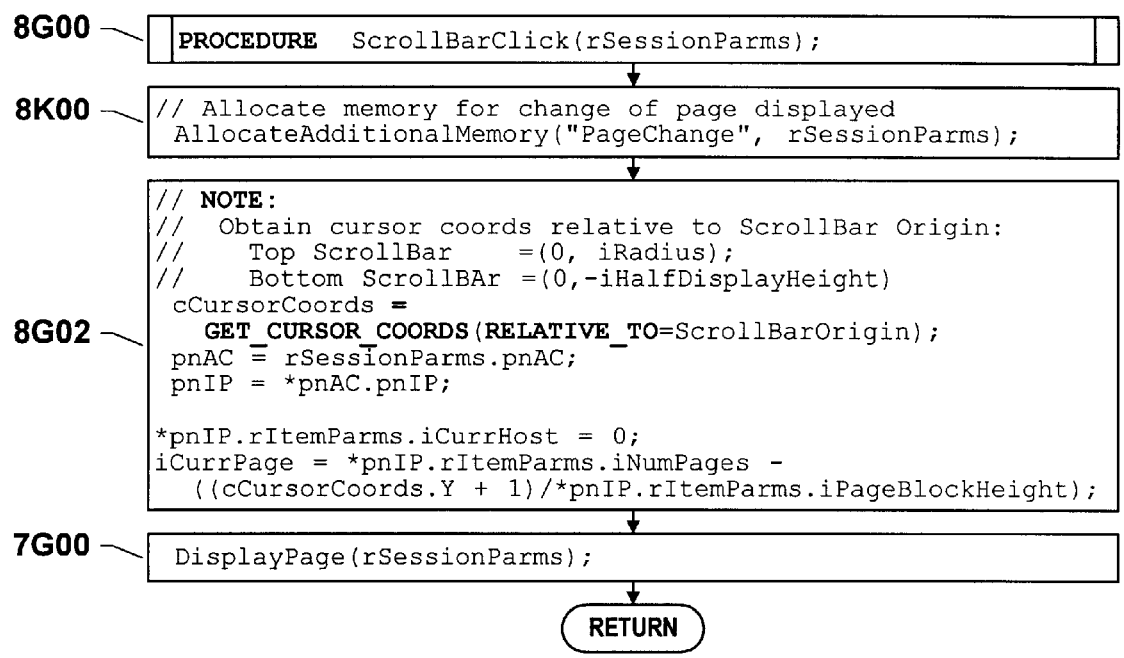
FIG. 8G is a flowchart of pseudo-code that manages a click on either scroll bar.
Figure 8H:
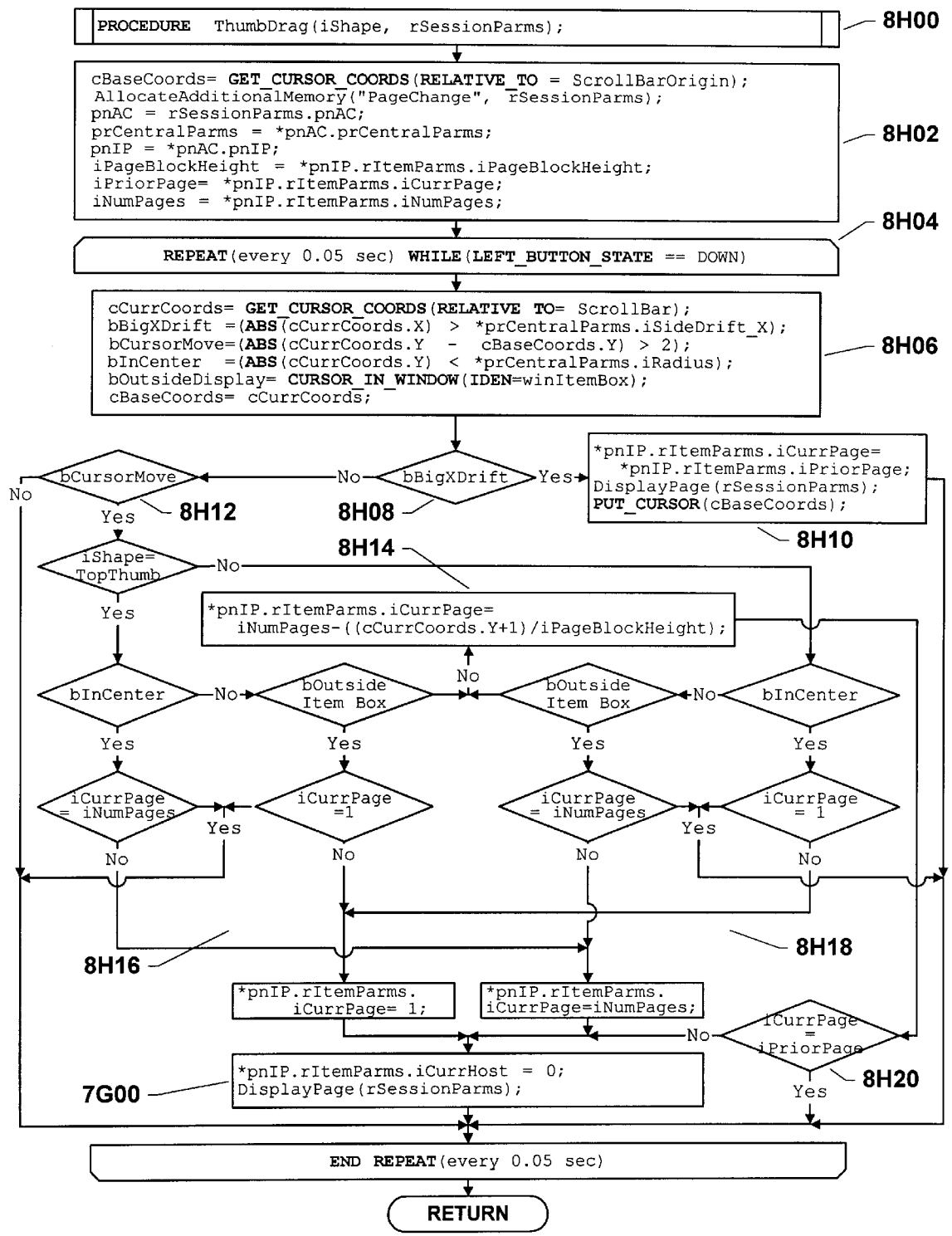
FIG. 8H is a flowchart of pseudo-code that manages a drag of either thumb.
Figure 8K:
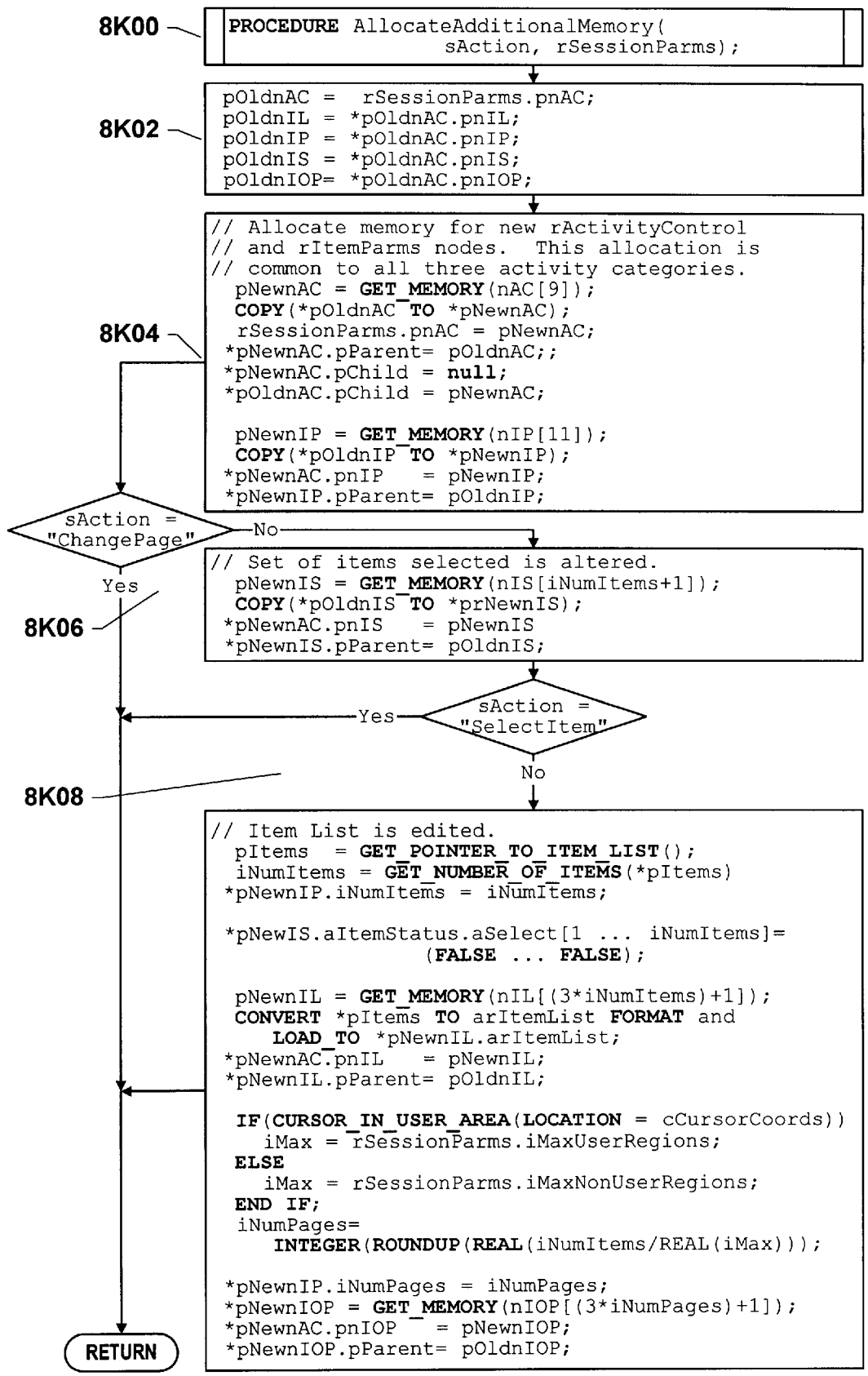
FIG. 8K is a flowchart of pseudo-code that allocates additional memory for the data structures in response to user activity.
Figure 8L:
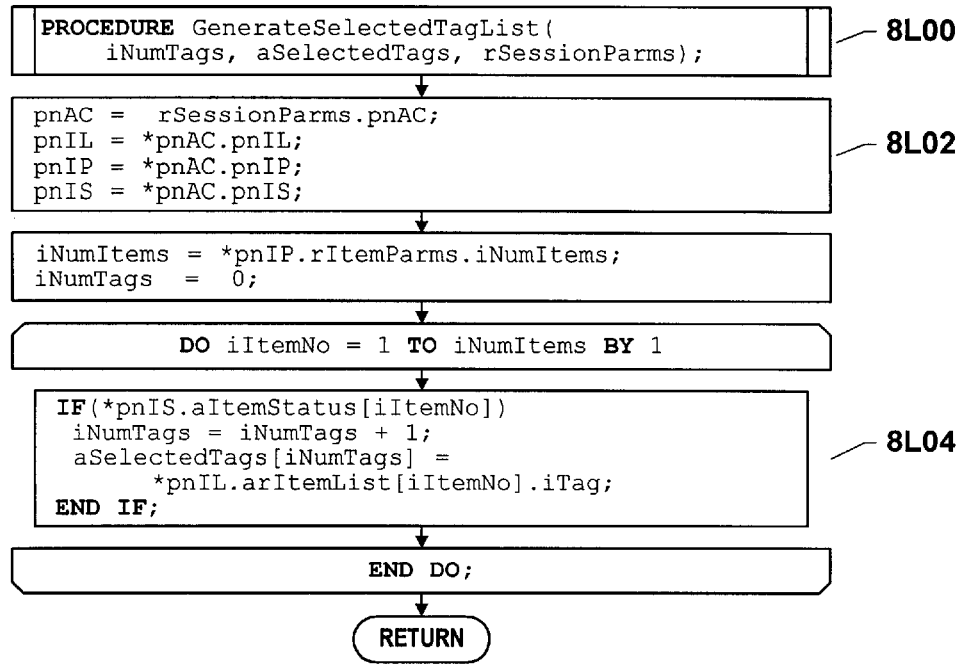
FIG. 8L is a flowchart of pseudo-code that generates the list of selected items.
Figure 8M:
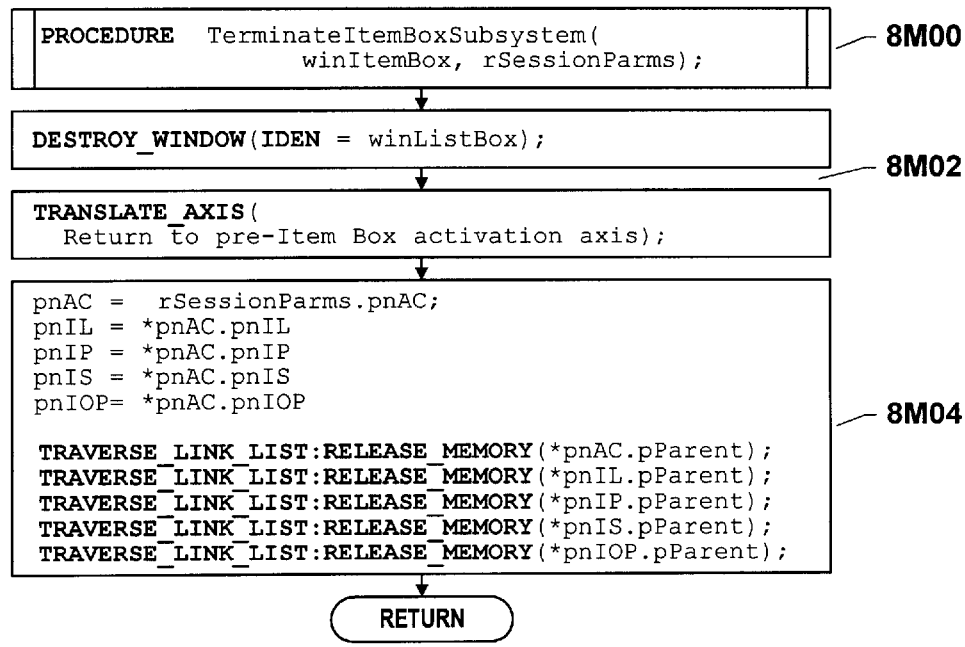
FIG. 8M is a flowchart of pseudo-code that terminates the current activation of the invention.

ACTIVATE ITEM BOX SUBSYSTEM (7A00):

FIG. 2D reveals that the six high level procedures initiated by 7A00 are performed via a single ordered sequence. The first stage of Item Box Activation is for 7B00 to allocate memory for the five data structures 3A05 through 3A09. Since full understanding these details is best achieved by an appreciation of how the Item Box Subsystem manages memory allocation it is recommended that the reader study the section titled "Allocate Additional Memory," FIG. 8K. As FIG. 8K is studied, it is suggested that data definitions of FIG. 3, and the example of FIG. 4 below also be reviewed. It will be presumed the reader follows this suggestion thus allowing these disclosures to avoid repetitive detail of memory management. With memory appropriately allocated, processes of 7C00 identify the optimum shell size and central area configuration for the given item list.

In the instance where the Item Box Subsystem represents an after-market replacement of a traditional list/combo box system, 7A02 determines the location of the display to be generated. This entails determining whether the item box is a drop-down or permanently displayed box, then determining the origin of the item box to be managed by. This is consequential when a permanently displayed traditional list or combo box in integrated into a dialog box since the replacement display will generally be wider than the display it replaces which necessitates reformatting the dialog box containing the list display. How such replacement is performed is not consequential to this invention and is assumed performed via methods not subsumed by this invention.

Once the shell and central area configuration for the current list are identified the window, in which the list or combo box (hereafter "Item Box" to denote either control) is rendered is created at 7A06. FIG. 2D shows that display of the initial page is performed in three stages. First, 7D00 renders the shell on the screen. Second, 7E00 renders the selected central area configuration on the screen. Third, 7F00 identifies the initial page to display and 7G00 renders the icons and/or labels that identify the items of this into the rectangular areas of the shell. Although not shown by FIG. 2D, the cursor is jumped to the defaulted location in the central area by 7A08. How each of these processes is accomplished is disclosed following.

ALLOCATE INITIAL MEMORY (7B00):

Required particulars of the item list are solicited by 7B02 which employs the operating system's message system to determine: (1) the address of the item list to be displayed, (2) the number of items in the list, (3) whether the list has single or multiple selection, and (4) whether the item list will be displayed in a list box or a combo box. 7B04 directly assigns the bMultiSelect and sListType values to 3A01, then determines whether the "Return" function-area, exemplified by 1B01, is to be enabled or disabled. Only if the user declares sReturnType, 3A00, to be "Explicit" or if the item list permits only single selection is "Return" disabled. When the IB01 function-area is disabled, its "Return" label is painted with the clrDisabledFont color stored in 3A04.

7B00 now commences a series of steps that allocate initial memory for each of the five data structures that are dynamically allocated and destroyed during each activation of the Item Box Subsystem. From the detour to FIG. 8K recommended above, the reader will appreciate that remaining processes 7B00 allocate memory for 3A05, 3A06, 3A07, 3A08, and 3A09 respectively; these allocations being identified in FIG. 4A by the subscript "0." 7B06 allocates memory for data structure llnAC, 3A05, a doubly linked list of rActivityControl records, that exists to provide overall access to the dynamically managed data structures of the Item Box Subsystem. As was disclosed by the memory management review of FIG. 8K, a new 3A05 node is created for each user action that requires Item Box Subsystem response. Because 3A05 itself is allocated at activation and destroyed at termination of the Item Box Subsystem, the address of the currently accessed llnAC node must be stored in static memory. This storage is provided by the pnAC variable of rSessionParms, 3A01.

While the format of the referenced item list will be specific to the operating system or currently active application software, it is presumed this format can be ascertained and reformatted in conformity with 3A06. To store the reformatted item list 7B08 allocates memory for a 3A06 node and loads its address to variable pnIL of rActivityControl, 3A05. It is appreciated that if the list management techniques disclosed by this invention are directly integrated into the GUI of an operating system provision for separate reformatting and management of the item list may not be necessary. Since this invention primarily concerns achieving a reduction of the physical effort expended to make one or more selections from an item box, its scope encompasses capabilities herein disclosed; capabilities that do not relate to whether the invention is employed to replace an existing list management system, is integrated into an application software, or is integrated directly into the operating system.

Every user action on the Item Box will alter information that specifies the state of the list; i.e., list composition, page displayed, item selection, cursor location, etc.. In consequence, 3B10 allocates the initial 3A07 node from the heap and assigns to it those variable that are known at initialization time. Remaining variables are set to zero. The address of this initial node is stored in pnIP of rActivityControl, 3A05. Since all reference to llnIP is to its top, only backward linkage to a node's parent is maintained.

The ultimate purpose of activating the Item Box Subsystem is to perform selection of one or more items. When multi-selection is permitted, the Item Box Subsystem provides several ways this can be accomplished with the result of each such user action maintained by the Item Box Subsystem. To this end, 7B12 allocates an initial nIS record, 3A08, that has one variable for each of the altemStatus elements of the item list. Since no items have been selected at activation time, 7B12 initializes the iNumItems, 7B02, of altemStatus to "FALSE" and loads the address of the new 3A08 record to variable pnIS of rActivityControl, 3A05.

7B14 calculates the number of pages used for list display to equal (iNumItems÷iShellSize), where iShellSize is the maximum number of regions permitted per shell. iShellSize takes one of two values which may or may not differ. The first value, iMaxNonUserAreaRegions, a variable of 3A01 with a value provided by 3A00, is the maximum number of regions per shell for lists managed by the non-user areas of the screen. Non-user area shells generally handle lists provided by the operating system to display such lists as fonts, programs available, etc. The second value, iMaxUserAreaRegions also of 3A01 with a value provided by 3A00, is the maximum number of regions of shells handling lists managed by the user areas of the screen. iMaxUserAreaRegion will generally be employed by application software to display lists where the list is the center of the user's attention and may contain hundreds of items. Results are stored in iNumPages of the 3A07 data structure. 7B14 allocates memory for the data structure llnIOP, 3A09, which exists to store: (1) the item starting a page, (2) the item ending a page, and (3) the Y-coordinates of each page block, 1C38, of the scroll bars. llnIOP is a singly linked list for storing with the address of the new node stored in nIOP of 3A05.

SET-UP SHELL AND CENTRAL AREA (7C00):

The purpose of 7C00 is to: (1) identify that shell which minimizes the physical effort of acquiring a desired, currently displayed item (2) identify that central area configuration which minimizes the physical effort of displaying the page containing the desired item, and (3) determine the width of the shell.

7C102 references pointers in 3A05 to accesses the iNumitems and iNumPages variables then initializes the variables iBinaryTopBound, and iBinaryBottomBound to 1 and iCurrPages respectively with storage in 3A07. Note that though these values are only used when the 1B80 or the 1B90 central area configuration is employed.

7C104 initially applies the rules presented by the column headings 1B11, 1B12, 1B14, and 1B15 to narrow to two the number of central area configurations this preferred embodiment considers for the display of the current list. The specific central area configuration to be utilized is then determined by reference to the iInstantReturn variable of 3A01. When iInstantReturn is TRUE there is no opportunity for the user to perform a second activity on the list and thus no need for the Undo capability.

After the number of pages appropriate for display of the item list is determined, the list can frequently be displayed using shells of fewer regions than the number used for the 7B14 calculations since the last—or only—page will frequently contain inactive regions. My patent U.S. Pat. No. 5,880,723 shows that item selection from a shell of fewer regions can always be performed with less physical effort than from a shell having more regions. It is consequently desirable to minimize the number of inactive regions present on the last page. To accomplish this, the number of inactive regions is determined by the first calculation of 7C106. If the number of inactive regions is greater than twice the number of pages, the regions per page can be decreased by multiples of two to attain that shell size that maximally fills the last page. This results in maximizing rAngle, 1C24, thus minimizing the physical effort of making a selection given that iCurrPages are used for the complete list display. The second calculation of 7C106 determines this desired shell size.

Processes of 7C202 utilize the value in iCurrNumRegions calculated by 7C106 to ascertain the address of the subsets of 3A02 and 3A03 that identify the parameters of the shell having this number of regions. These addresses are loaded respectively to the pointers prRegionParms and parApexParms of rActivityControl, 3A05. Process 7C204 utilizes iNumCentralAreas, determined by 7C104, to ascertain the address of the relevant subset of 3A04 and load the resulting address to prCentralParms of 3A05.

The processes of 7C06 employ parameters available now that the shell and central area configurations are known to calculate the scrollbar height and page block height. The resulting values, iScrollBarHeight and iPageBlocikHeight are stored in rltemparms, 3A07.

Final processes of FIG. 7C determine the width required for the shell and by implication the dimensions of the window that is to contain the item box. 1A02 illustrates the possibility that any given display may contain: (1) a label, 1A10, and an icon, 1A04, (2) a label only, (3) or an icon only. Processes of 7C208 initiate a loop that references each element of the item list. Since icons generally are squares of constant width it initially suffices to test whether any item tested incorporates an icon in its identification. Labels are different since, when present, there can be no supposition that they are of equal length. Thus, 7C208 tests each label encountered against the longest label previously encountered.

Once all items have been scanned, processes of 7C210 determine half the width of the display; iHalfDisplayWidth of 3A07. If item identification is by icon only, half the display equals half the width of the central area plus iBase_X, 1C32, plus iEdgeGap, 1C08, plus iIconHeight, 1C04. Half the width of the central area equals iRadius, 1C20 for central area configurations 1B20 through 1B70. If the central area displayed is either 1B80 or 1B90, iHalfScrollBarWidth, 1C44, is added to the iHalfDisplayWidth of 3A07 during processes of 7E410. If item identification consists only of labels, half the display width equals half the central area width plus iBase_X plus iEdgeGap plus the maximum label width, 1C12. When both icons and labels are employed to identify an item, iHalfDisplayWidth equals half the central area width plus iBase_X plus iEdgeGap plus iIconHeight plus iIntraGap, 1C10, plus the maximum label length. This invention does not require icons to be squares or that widths are equal between icons. Since adjustments to the above embodiment will be apparent to a person of typical programming skill, this invention subsumes cases where icons are of arbitrary dimension.

DISPLAY THE SHELL (7D00):

Display of the shell and central area employs three pseudo-code drawing messages presumed available via the operating system. The shape drawing message results in generation of the outline of a region or function-area. Another message renders the text, and the third renders an icon. The "CREATE" message renders the outline of a specified shape and identifies it to the operating system. The initial "PEN TO" argument specifies the origin of the shape, each use of an "ARC TO" or "LINE TO" argument renders a portion the shape's borders. "CLOSE" completes the shape. The "IDEN" argument exists to provide a unique identifier for each different shape. The "FILL" argument supplies a color that communicates the current state of the shape. The color proposed when the shape is not hosting the cursor is provided by the parameter clrNormalCenterFill of 3A04 with the actual color suggested by 3A00. When the shape hosts the cursor, the fill is provided by clrHostingFill of 3A02 with the actual color suggested by 3A00. These colors are simply suggestive colors with the invention equally applicable when using any suitable, alternate color set. The "PRINT" message renders any text displayed in the manner desired. The text actually rendered is specified by the "TEXT" argument, the shape to which it applies by the "IDEN" argument, and coordinates of the upper left corner by the "LOCATION" argument. The "COLOR" argument denotes the shape's state. When the shape is inactive, the identifying color is provided by clrDisabledFont of 3A04 with actual color suggested by 3A00. When the shape is active, the identifying color is provided by clrEnabledFont of 3A04 with actual color suggested by 3A00. The "PAINT" message renders an icon and has the "IDEN" and "LOCATION" arguments in common with "PRINT." "ICON" provides a pointer to any icon to be rendered.

Processes of 7D02 access four variables; namely: iMaxRegions and iHalf regions of 3A02, iHalfScrollBarWidth of 3A04, and iHalfDisplayWidth of 3A07. The loop, 7D04, which has iHalfRegions repetitions, is now entered to render each region of the left half-shell in turn. This loop assigns the value of the loop index as the region identifier. Note that iOffSet_X=iHalfScrollBarWidth is assigned the value zero unless the dual scrollbars are present. The rendering of a region commences with the pen either at a "Start" having coordinates of (0, 0) for configurations 1B20 through 1B70 or coordinates of (-iOffSet_X, 0) for configurations 1B80 and 1B90. Data structure 3A03 is referenced to obtain coordinates for Apex_1; i.e., the lower, near apex, as exemplified for an arbitrary region by 1C71. A line is drawn from Start to (cApex1.X-iOffSet_X, cApex1.Y). The line is continued to Apex_4, illustrated by 1C74, with coordinates (-cEdge, cApex1.Y). The line is now extended vertically upward to Apex_3, illustrated by 1C73, with coordinates (-cEdge, cApex2.Y) and thence to Apex_2, illustrated by 1C72, with coordinates (cApex2.X-iOffSet_X, cApex2.Y). Drawing a line back to Start closes the region. This process is repeated for each region of the left side.

A nearly identical sequence renders the right half shell with provision for the positive values of any offset occasioned by presence of scrollbars. The five apexes of any region of the right half-shell in generalized form are: $Start_N$=(+iOffset_X, 0), $Apex\_1_N$=(cApex$1_N$.X+iOffset_X, cApex$1_N$.Y), $Apex\_4_N$=(+cEdge, cApex$1_N$Y), $Apex\_3_N$=(+cEdge, cApex$2_N$.Y), and $Apex\mathrm{-}2_N$=(cApex$2_N$.X+cOffset, cApex$2_N$.Y).

DISPLAY THE CENTRAL AREA (7E00):

Reflection of five variables applied in conjunction with the above graphic rendering calls permit generation of any of the central area objects of FIG. 1B. Variables storing these five locating values are found in 3A04: namely, (1) iRadius, 1C20, (2) iHalfScrollBarWidth 1C44, and the three coordinates (3) cBRReturn, 1C62 —Bottom Right Apex of the Return area, (4) cBRBUApex, 1C64 —Bottom Right Apex of the BinaryUp area, and (5) cTLBUApex, 1C66—Top Right Apex of the BinaryUp area. Given the repetitive nature of these processes, descriptive focus will be on the logic by which function-areas form the central area configuration for a particular item list.

After 7E102 accesses appropriate pointers and variables, 7E104 performs a test to ascertain whether the central area is configured as 1B80 or 1B90. If either of these regions is to be rendered, it is generated separately because of its oblate shape.

Generation of central area configurations 1B20 through 1B70 commences with 7E106, which renders the "Return" function-area. A "CREATE" message is issued by 7E106 to draw an arc centered at the display origin (0, 0) of radius equal to iRadius, 1C20. The start and end coordinates for this arc are (-cBRReturn_X, cBRReturn_Y) and (+cBRReturn_X, cBRReturn_Y) respectively. A "CLOSE" argument in the message completes the shape of this function-area. Positioning of the "Return" label employs the iHighLabelDisp, 1C52, and iHalfReturnWidth stored in 3A04. A test based on modulus arithmetic is made at 7E108 to ascertain whether the "Exit" label is to be rendered in a whole segment as with 1B20, 1B40, 1B60 or in a half segment as with 1B03, 1B05, or 1B07. If "Exit" comprises a whole segment, its rendering is as with "Return" but with an arc from (+cBRReturn_X, -cBRReturn_Y) to (-cBRReturn_X, -cBRReturn_Y), Placement of "Exit" employs the iLowDisplace and iExitWidth, both of 3A04. If "Exit" is rendered in a half segment, processes of 7E110 position the start point at (+cBRReturn_X, -cBRReturn_Y), generates an arc to (0, -iRadius), produces a vertical line to the X-axis, and then closes the shape of the function area. Positioning of the "Exit" label employs the value stored in iLowDisplace in both the vertical and horizontal dimensions. Identical processes applied to reflected values generate the "Undo" function-area.

7A00 now executes the 7A112 decisions to determine whether there are to be two page altering functions, or four page altering functions in the central area. 7E202 processes generate the "Up" area for 1B40 and 1B50 central area configurations. 7E202 positions the cursor at (-iRadius, 0), draws an arc to (-cBRReturn_X, +cBRReturn_Y), extends a line to (+cBRReturn_X, +cBRReturn_Y), draws another arc to (+iRadius, 0), then closes. The abscissa of top-left corner of the "Up" icon is minus half the width of the icon with the ordinate equal to iHighiconDisplace, 1C56. Rendering of the "Down" function-area is identical to rendering of the "Up" function-area with appropriate regard to signs and icon displacement.

7E204 provides the processes that render the four page altering functions of central area configurations 1B60 and 1B70. Processing of "Top" commences at coordinates (-iRadius, 0) with an arc to (-cBRReturn_X, +cBRReturn_Y) followed by a line to (0, +cBRReturn_Y) then a line to (0, 0) with a close. The top-left corner of the top icon is positioned at location (-iHighIconDisplace, +iHighIconDisplace). "Bottom" is rendered in a similar manner with attention given coordinate values. Rendering of "Up" commences at (+cBRReturn_X, +cBRReturn_Y) with an arc to (+iRadius, 0) followed by a line to (0, 0) then a line to (0, +cBRReturn_Y) with a close. The top-left corner of the "Up" icon is positioned at location (+iLowDisplace, +iHighIconDisplace). "Down" is rendered in a similar manner with attention given coordinate values.

Generation of 1B80 and 1B90 central area configurations parallels the above with two exceptions. The presence of the dual scrollbars, 1C46, results in the left and right shell halves being separated by the scrollbar width in the manner illustrated by 1A22. For the rendering of the "Return" function-area 7E302 shows that the adjustment required to the 7E106 process is to set the arc origin to (−iHalfScrollBarWidth, 0) and arc from (−cBRReturn_X, +cBRReturn_Y) upward to (−iHalfScrollBarWidth, +iRadius). Then draw a horizontal line to (+iHalfScrollBarWidth, +iRadius). Now set the arc origin to (+iHalfScrollBarWidth, 0) and arc down to (+cBRReturn_X, +cBRReturn_Y) and then close the area. Processes 7E304 generate the stand-alone "Exit" object with processes 7E306 generating the "Exit" and "Undo" function-areas in the manner of 7E302. The six page changing functions, detailed via 7E308 through 7E404, require extensive pseudo-code but proceed identically to the similar processes of 7E206 save for the need to offset the origin of any arcs by an amount equal to iHalfScrollBarWidth, 1C44.

Since dual scrollbars provide a means for altering the page displayed, they conceptually comprise part of the central area. While the preferred implementation of this invention incorporates the dual scollbars into displays having the "BU" and "BD" function-areas, as shown in the exemplar 1A22 display, it is to be emphasized that dual scrollbars and the 1B80 and 1B90 configurations are not to be considered conjoined. Thus, it is possible to incorporate dual scroll bars with any appropriate display.

Rendering the top scrollbar requires 7E406 to set the top-left corner at (−iHalfScrollBarWidth, +iHalfDisplayHeight). From this location a rectangle is rendered having a width of 2*iHalfScrollBarWidth and height of iScrollBarHeight. The bottom scrollbar has its top-left corner at (−iHalfScrollBarWidth, −iRadius) with dimensions identical to those of the top scrollbar. The scrollbars are conceptually segmented into iNumPages of equal sized "Page Blocks," 1C82. The blocks are contiguously positioned in ascending order so that the top-most page block, 1C80, in each scrollbar represents Page 1 while the bottom page block, 1C84, in each scrollbar represents Page iNumPages. This embodiment encompasses the possibility of drawing lines horizontally across the scrollbars to represent the page blocks. If, say, every fifth such page block were numbered the user would be provided with a useful tool to aid locating a desired page. Processes of 7E408 detail this style without the optional page identification.

SET-UP THE PAGE DISPLAY (7F00):

Processes of 7F04 read values for the maximum number of regions and scrollbar height. Appropriate temporary variables are loaded with base values, as shown in 7F04. The approach used is required because page identification increases in the downward direction from the scrollbar top while block identifying coordinate values increase in an upward direction from bottom of the scrollbar. A loop is now entered which performs simple additions or subtractions to generate values for loading the new aItemsOnPage node of llnIOP, 3A09. Caution must be exercised with the last page since this page will frequently contain inactive regions. This caution is handled by the last assignment of 7F04.

Lastly, 7F06 reads the binitialPage from rSessionParms, 3A01, and determines whether the first or median page is to be displayed. If the median page is requested this is determined, as appropriate, for lists of under six pages or for an arbitrary number of pages.

DISPLAY THE CURRENT PAGE (7G00):

When these processes of 7A00 are reached all memory required for activation of the Item Box Subsystem has been allocated, the most appropriate sized shell is displayed, the most appropriate central area configuration is displayed—with scrollbars if appropriate—and the page to display is known. What remains is to reference each item of the desired page, acquire the appropriate icon and/or label of each, determine their appropriate coordinates relative to the center of winItemBox (see 7A06), and render them on the screen. 7G02 enters the necessary data structures and transfers values from storage to temporary variables. A loop is entered at 7G04 that passes over each region of the display. Processes of 7G06 are entered if the region is active, i.e., will receive an icon and/or label. Otherwise, 7G08 is entered which fills the inactive region with the clrInactiveRegionFill found in 3A02 with value proposed in 3A00. For active regions, the processes of 7G06 first determine whether the item to be displayed in the currently referenced region of the specified page has been selected. When the Item Box Subsystem is being activated, no items have been selected and, in consequence, to all regions are filled with the color clrNotSelectedFill found in 3A02 using the color proposed in 3A00.

The top-left corner of any particular icon or label is determined as displacements from a lower boundary of the rectangular portion of the appropriate region and an appropriate left reference. The coordinate for the Y-reference line for, say, the $N^{th}$ region is cApex1.$Y_N$; a value stored in 3A03. Values for the displacement above the Y-reference is provided by iIconDisplace_Y, 1C18, and/or iLabelDisplace_Y, 1C16, and stored in data structure 3A02. The coordinate for the X-reference line is −iHalfDisplayWidth, a variable of 3A07, for left column items and +iBase_X, a variable of 3A02, for right column items. When the item list employs even one icon all labels are displaced rightward from the proceeding by the sum of iIconHeight, 1C04, and iIntraGap, 1C10, both stored in 3A02. Display of the icon and/or label employs the message capability detailed by 7E00 to paint icons and print labels.

7G10 determines if the central area displayed is either a 1B80 or 1B90 configuration. If so, processes of 7H00 are initiated to determine the position and render the thumb for each scrollbar.

DISPLAY SCROLLBAR THUMBS (7H00):

Objects 1C82 are implicit or explicit representations of "page blocks" present in the two scrollbars to denote pages of the list.

A thumb, 1C38, may have a height greater than that of a "page block," 1C82, thus requiring a method for meaningful thumb placement throughout the scollbar that maintains the thumb wholly within the scrollbar when page first and last pages are displayed. 7H00 discloses that this is accomplished by defining a "hotspot" unique to each page block; namely, a page block hotspot is located below its top edge by a distance proportionate to its height equal to its page number relative to the total number of pages, iNumPages of 3A07. Each thumb also has a hotspot, 1C40, but one that is dynamically positioned down its height an amount equal to the relative position of the hotspot of the page block the thumb currently identifies.

After 7H02 accesses appropriate pointers and transfers needed parameters to temporary variables 7H04 determines the needed hotspot locations. 7H02 initially determines the hot spot of iCurrPage, 3A07, the page currently being referenced, relative to its own height. This value is then converted to the hot spot's location in terms of its Y-coordinate value within the scrollbar relative to the scrollbar origin, 1C88. 7H06 positions the thumb location by locating the thumb hotspot to coincide with the hotspot of the appropriate page block. The top-left corner of the thumb is determined by adding the vertical displacement of the thumb's hotspot to the Y-coordinate of the page block hotspot. These processes result in the thumb's top edge coinciding with the of the scrollbar's top edge when page 1 is displayed or with the bottom edge of the scrollbar bottom edge when the last page is displayed.

Processes of 7H08 perform the actual rendering of the thumbs. First, both thumbs identifying the prior page are unpainted. Then the two thumbs are successively rendered using the CREATE_SHAPE message detailed in 7E00.

Disclosures for the Management of Item Box
Subsystem (FIG. 8)

Figure 2E:
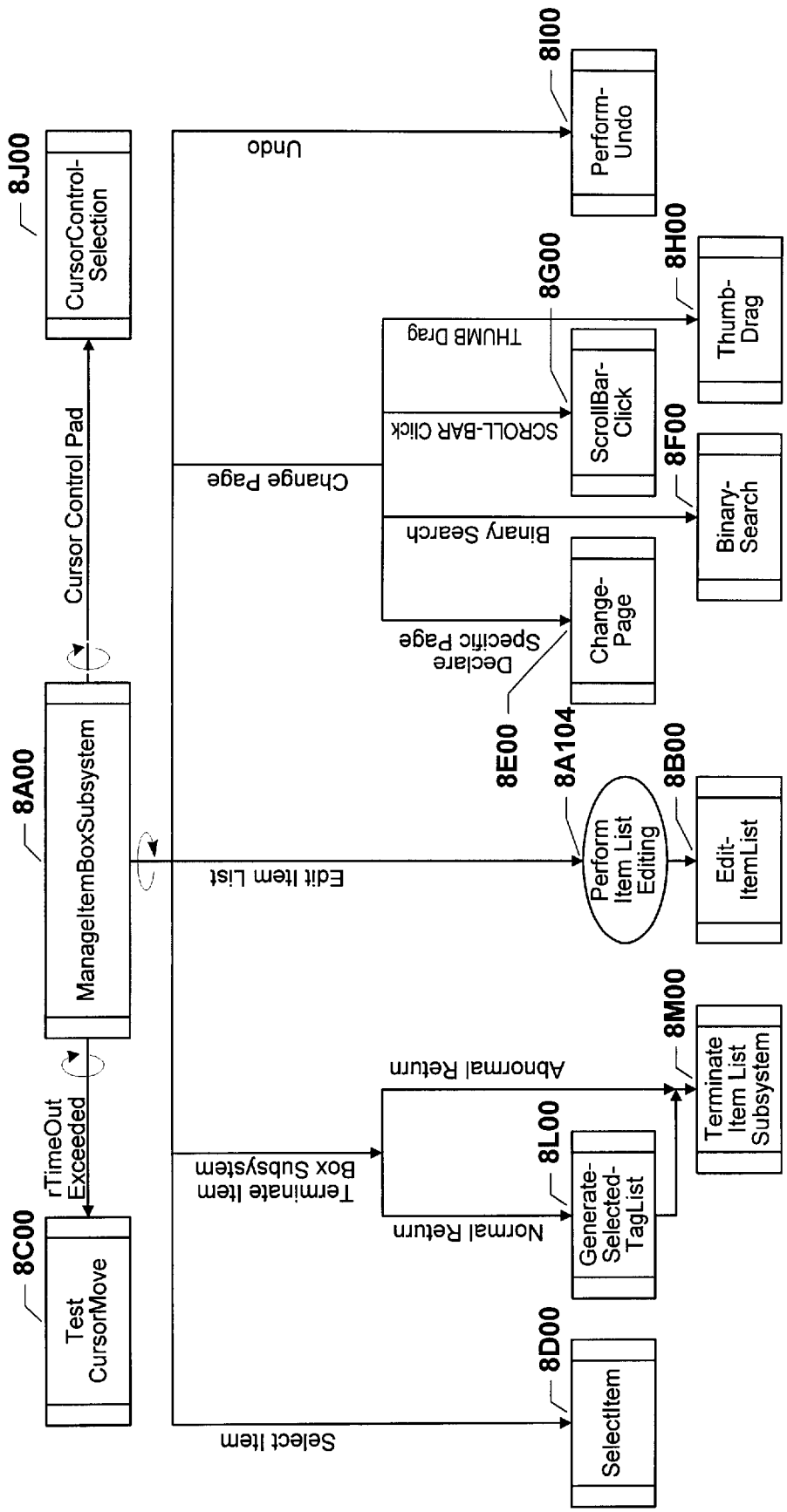
FIG. 2E is a flowchart disclosing high level structure of a computer program that manages user manipulation while interacting with an item box display.

MANAGEMENT OF ITEM BOX SUBSYSTEM (8A00):

Once activation of the Item Box Subsystem is complete, 5A12 generates an infinite loop that captures, 5A14, and responds, 8A00, to any user manipulation of the item list. This loop is exited only upon termination of the current Item Box Subsystem activation. FIG. 2E discloses that the high level calling procedures of 8A00 comprise six user-initiated activities that can be performed in arbitrary order. The remaining high level procedure is a system-controlled timeout handled automatically by 8C00 to monitor mouse movement. Editing of the item list, 8A102, is the one list management activity performed by the user while the Item Box Subsystem is active that is not subsumed by this invention. However, at return from list editing, the processes of 8B00 adjust data structures in preparation for subsequent user activity. When the item box is a combo box activated for list editing there must be a mechanism that communicates this activity to the Item Box Subsystem at its occurrence. This is the mechanism tested by 8A102. The particular mechanism that permits 8A102 to detect the occurrence of editing is outside the purview of this invention.

The Item Box Subsystem manages five categories of user activity. The user may request display of a different page in four distinct ways: (1) issue a specific page request, 8E00, (2) perform a binary search, 8F00, (3) click in either of two scrollbars, 8G00 (4) drag either of two thumbs, 8H00. Once the displayed page shows a desired item, 8D00 permits its selection. If an error is made 8I00 permits an "Undo" of the preceding action. One of two normal returns can terminate the current activation of the Item Box Subsystem: (1) instant return when a single selection list is being managed and (2) explicit return that requires a click of "Return" or stroke of the RETURN key. An abnormal return can be requested by a click of "Exit" or stroke of the DELETE key. The cursor control commands of 8J00 are available to provide the user an alternate means of performing each category of user activity without homing the hand to the mouse.

8A104 tests to ascertain whether a user action relates to cursor control keypad stroking. If the cursor controls were used the processes of 8J00 are initiated. Since strokes on the cursor control keypad only alter highlighting of the regions or the functions of the central area, return is to the 5A12 loop which awaits a RETURN key stroke or other user activity. If the cursor control keys are not engaged 8A106 tests whether a left-button click has been performed. If so, the identification of the shape within the item box is determined by a message to the operating system and stored in the temporary variable iShape. If the click is outside the item box, the identification code is a zero. 8A00 now enters a series of decisions appearing along the left edge of FIG. 8A1 that identify which of the list manipulation actions the user has performed. Once the user action is identified, 8A00 initiates the appropriate response. After each such response is complete, 8A00 either continues the 5A12 loop or exits the Item Box Subsystem and returns to loop 5A04. To follow the meaning of the decisions 8A110 through 8A212 it is recommended that the reader review the definition of the variable iCurrHost (see 3A07 of FIG. 3B3) that lists the shape identifying codes utilized by this implementation. It is to be appreciated that since these codes are defined for the convenience of this preferred implementation, the intent of the invention is not altered by other identification strategies that will suffice equally well. Lastly, 8A106 loads the temporary variable bJump with the default value provided by bJumpCursor (in 3A01) to direct disposition of the cursor at termination of the current Item Box Subsystem activation.

The principle purpose of an item box is to permit illumination of one or more desired items present in an item list to be displayed and permit its selection. Processes of 8A108 determine whether a click has occurred in a region by testing whether the identification of the shape receiving the click is greater than zero. If so, processes of 8D00 are performed to manage the item selection. At return from 8D00, a test is performed to determine whether the current Item Box Subsystem activation is to be terminated. If so, 8L00 processes generate the list of items selected during the current activation, terminates the current activation, 8M00, and positions the cursor as directed by 8A202. When the current session requires explicit termination, as with multi-selection lists, the user either left-clicks the "Return" function-area or strokes the RETURN key. This is tested at 8A110 and when detected invokes the same processes that are performed with immediate termination as detailed by 8A108 above.

Throughout the life of an Item Box Subsystem activation, a clock operating as a background task determines whether the time lapse since the last timeout exceeds the span specified by rTimeOut of 3A00. If 8A112 finds that a timeout has occurred the processes of 8C00 are activated. After 8C00 completes, a test is performed to determine whether the cursor remains within the item box. If so, processing continues in the 5A12 loop. If, however, the cursor has exited the item box, the variable bJumpCursor is set to not return to the user-space location held at activation of the current Item Box Subsystem. The item list is then tested for editing during the current Item Box Subsystem activation and if editing is detected the item list is returned to the list that existed prior to Box Subsystem activation. 8M00 now releases all memory allocated for data structures 3A05 through 3A09, the axis system is reset to its pre-activation values and winItemBox (see 7A06) is destroyed. Processing continues from 5A04.

The user may abnormally terminate the current activation of the Item Box Subsystem and return to the state existing when said activation occurred either by left-click in the "Exit" function-area or by a "DELETE" keystroke. 8A114 provides the test for this action which, when found, results in setting the variable bJumpCursor to not jump the cursor when termination is complete. If the item list has been edited it is returned to its original state. 8M00 now releases all memory allocated for data structures 3A05 through 3A09, the axis system is reset to its pre-activation values and winItemBox (see 7A06) is destroyed. Processing continues with 5A04.

The four tests of 8A204 relate to the four explicit pages that can be requested via the "Up," "Down," "Top," and "Bottom" functions of the central area. A string identifying the particular page requested is loaded to the temporary variable sChange and passed to 8E00 which performs the page change. Employment of the binary search capability differs in that the page to be displayed depends on past activations of the binary search functions. As is seen at 8A206, activation of a binary search parallels that of the explicit page request since an "Up" or "Down" string is passed to 8F00.

The three remaining functions have self-explanatory names. "Undo" returns the sub-system to the state existing prior to the most recent user action. 8I00 comprises the processes performing the Undo function. 8G00 and 8H00 manage the two capabilities of the dual scrollbars; namely, page specification by a click on a page block, 1C82, or by dragging the thumb, 1C38.

Figure 4A:
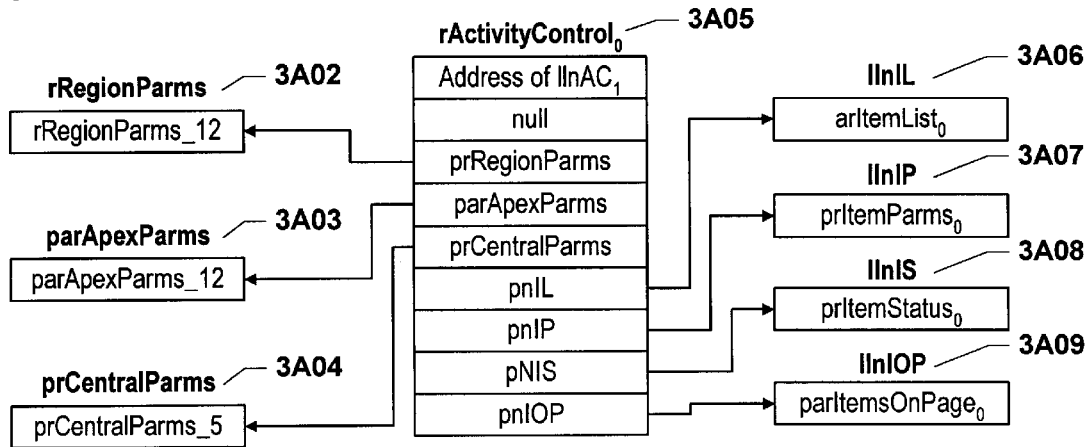
FIG. 4A are data structures generated at activation of the Item Box Subsystem.
Figure 4B:
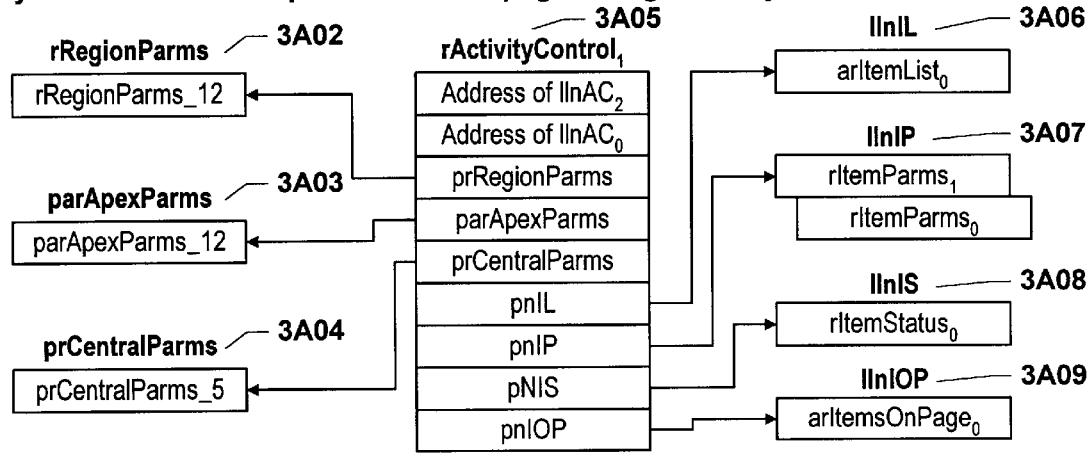
FIG. 4B are data structures generated when a different page is displayed.
Figure 4C:
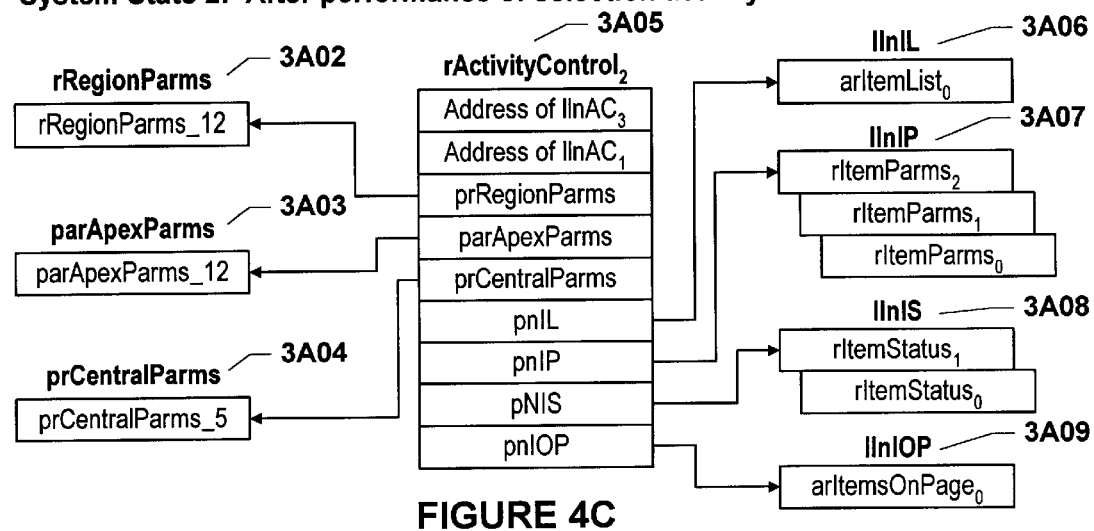
FIG. 4C are data structures generated when an item is selected from a representative sized item list.
Figure 4D:
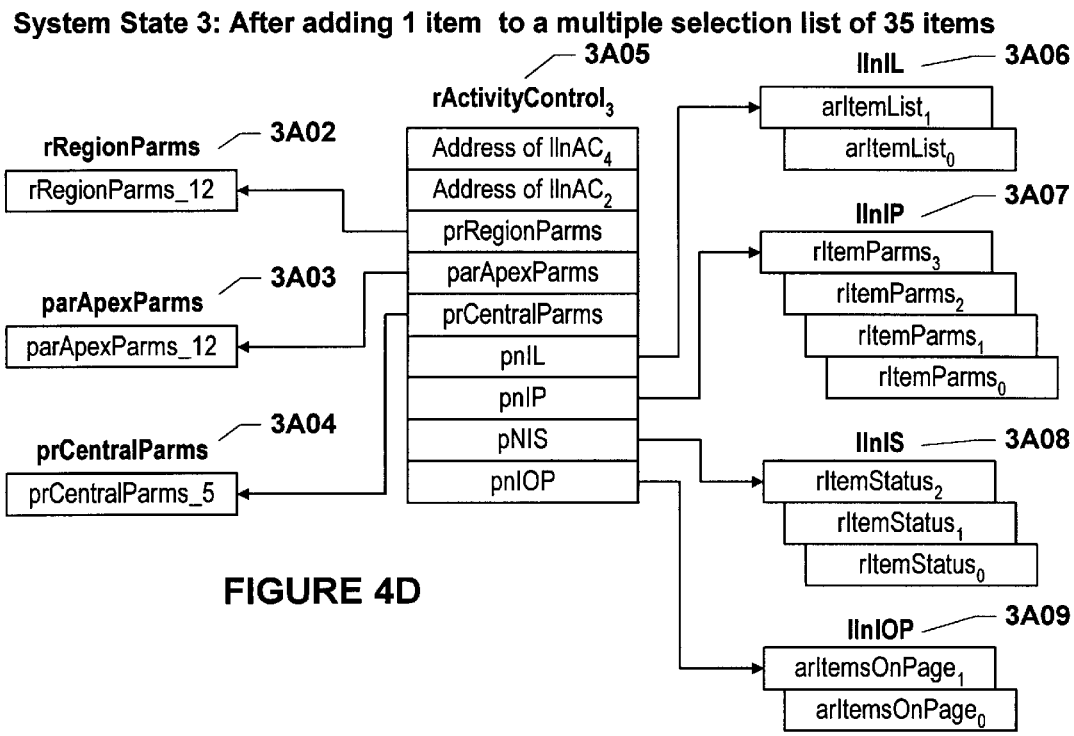
FIG. 4D are data structures generated upon adding an item to the original list that does not alter the most appropriate shell size and central area configuration.
Figure 4E:
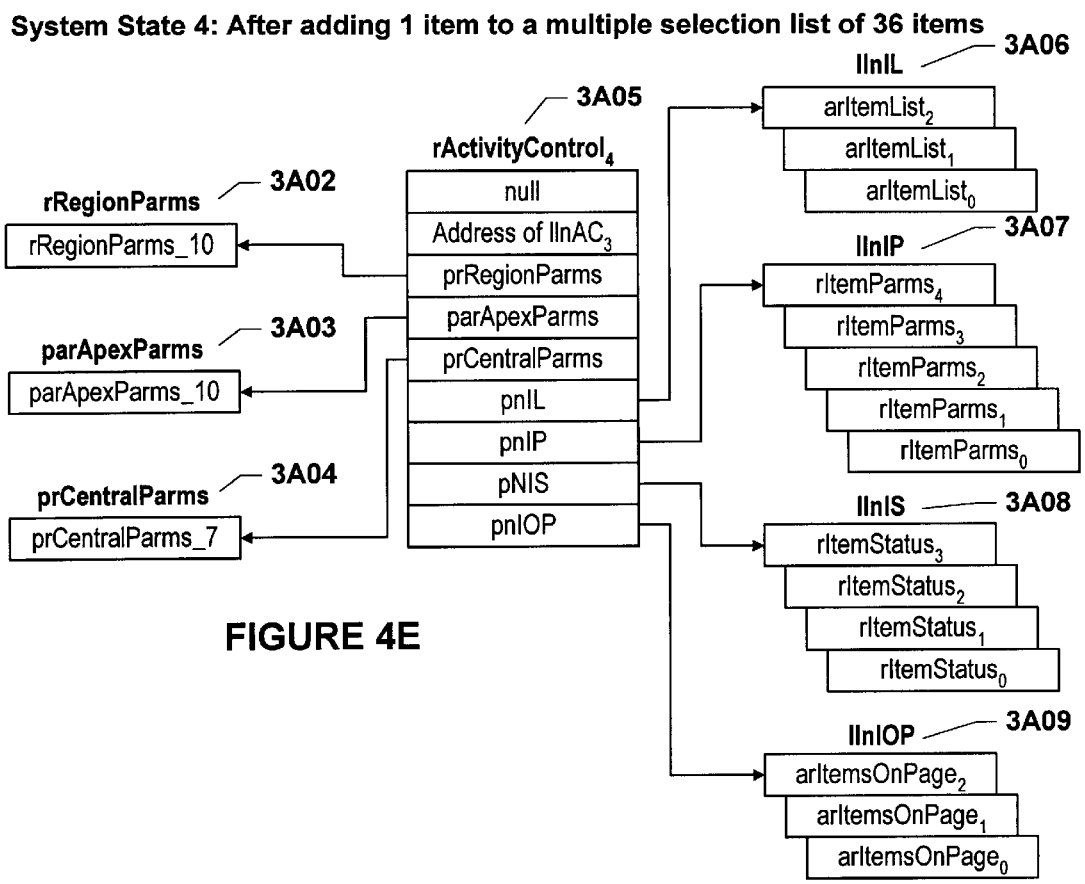
FIG. 4E are data structures generated upon adding an item to the original list that does alters the shell size and the central area configuration.

EDIT ITEM LIST (8B00):

The only task of 8B02 is to record via the variable bItemListEdit of 3A01 that editing of the list has occurred. After memory allocation by 8K00 completes, 8B00 enters 7C00 to reevaluate the appropriate shell size and central area configuration if editing has altered the list size. This possibility is illustrated by FIGS. 4D and 4E respectively and is detailed in the section "Allocate Additional Memory" below. Processes of 8B04 reference pointers appropriate to the rest of the 8B00 processes. Process 8B06 revises the display window winItemBox (see 7A06) by an operating system message that re-dimensions it as appropriate. Two tests, not here developed, permit ascertaining whether winItemBox requires redrawing; namely: (1) has the edit changed the list length and (2) has the maximum label and/or icon length has changed. 8B00, in sequence, now displays the shell (7D00), displays the central area (7E00), sets up the page (7F00), and displays the page (7G00). These modules are detailed in 7A00. 8B08 completes the response to editing by pre-positioning the cursor within the central area.

TEST FOR CURSOR MOVE (8C00):

8C02 initially employs an operating system message to determine whether the cursor has been moved to a location outside the item box. If the cursor is not in the item box, processing returns to 8A112 and termination processes are performed as detailed above. When the cursor is within the item box, another operating system message is employed to determine the identification of the shape serving as host with the returned identification assigned to temporary storage in iShape. Appropriate pointers to data structures are then accessed and identification of the shape previously hosting the cursor read from iCurrHost of 3A07 for assignment to temporary storage in iPriorHost. ishape is then assigned to iCurrHost for use at the next test for cursor move. 8C04 performs a test to determine whether the cursor has entered a new shape of the display. If not, processing returns to the loop of 5A12. Otherwise, the new host is filled with the color stored in clrHostingFill of 3A02 and defined at 3A00.

If the prior host is in the central area it is filled with clrNormalCenterFill of 3A04 and defined at 3A00. Since the enable/disable status of said central area function is not changed, the label is unaltered. If the prior host is a region, the item it represents is tested for selection status by identifying the item that region references. This determination is based on the number of the currently displayed page, iCurrPage of 3A07, and the region number previously occupied by the cursor. The item thus identified is referenced in 3A08 and its selection status determined. If this item has not been selected it is filled with the color stored in clrNotSelected, otherwise it is filled with the color stored in clrSelectedFill. Both these variables are stored in 3A02 with the proposed colors declared in 3A00. Processing returns to 8A110 and then to the loop at 5A12.

SELECT ITEM (8D00):

After allocation of memory as detailed by 8K00 and appropriate pointers are accessed, 8D02 determines the location in the item list of the item highlighted in the item box. This determination entails multiplying the number of regions in the shell, iMaxRegions of 3A02 by one less than the number of the current page, iCurrPage, of 3A07 and adding the number of the region currently highlighted. The location of the item previously highlighted is assigned from iCurritem of 3A07 to temporary variable iPrioritem. The location of the currently highlighted item is now assigned to iCurritem of 3A07 in preparation for future selection activity. If the current item list permits only single selection process, 8D04 toggles the status of the item now called iCurrItem and displays the updated page via 7G00. Three possibilities exist with lists that permit multiple selection. First, if neither the "SHIFT" nor "CTRL" keys are pressed at left button click, 8D06 loops through all elements of the altemStatus record of the current of the llnIS node, 3A08, and sets each to "FALSE." Then the iCurrItem element is set to "TRUE". Second, if the "CTRL" key is pressed when the left button is clicked, BD08 toggles the iCurrItem, while leaving the status of all other items unchanged. Third, if the "SHIFT" key is pressed when the left button is clicked, 8D10 sets all items in the altemStatus record of the current llnIS node between iPriotItem and iCurrItem to "TRUE" and leaves the status of all other items unchanged. Finally, processes of 7G00 are initiated to display the updated current page.

CHANGE THE PAGE DISPLAYED (8E00):

8E02 first accesses the appropriate pointer to llnIP, 3A07, and retrieves the currently displayed page, iCurrPage, and the number of pages in the current item list, iNumPages. The string passed from 8A204 via the argument schange is then appraised for the explicit page requested. "Up" sets iNewPage to either one minus the value of iCurrPage or to the last page if the current page is Page 1. "Down" sets iNewPage to one plus the value of iCurrPage or to Page 1 if the current page is the last page, "Top" always sets iNewPage to one, and "Bottom" always sets the iNewPage to iNumPages. After 8K00 processes allocate appropriate memory, 8E04 sets the current host, iCurrHost to zero, loads iNewPage to the iCurrPage of 3A07. 7G00 then displays iNewPage.

PERFORM BINARY SEARCH (8F00):

The binary search capability is available with ordered lists and utilizes one or more clicks on an appropriate combination of the "Binary-Up," or "Binary-Down" functions of the central area to rapidly progress through the item list. Each activation of a binary-up or binary-down function displays the page half way between an upper bound page and a lower bound page. The user views the new page and decides if the desired item is displayed. If not and it is on a page above the currently displayed page the user either clicks "Binary-Up" or perhaps "Up" if the desired page is close. Progressing downward is similar. When the Item Box Subsystem is initialized, the two bounds, iBinaryTopBound and iBottomBinaryBound, both of 3A07, are set to 1 and iNumPages respectively by process of 7C102.

When either direction of binary search is activated, 8F02 first accesses the pointer to llnIP, 3A07. 8F02 then determines the currently displayed page, iCurrPage, iTopBinaryBound and iBottomBinaryBound respectively from 3A07 and assigns them to temporary variables iOldPage, iOldTopBound and iOldBottomBound respectively. 8F04 performs a test for equivalence between the old top and bottom bounds. If they are equal, there are no new pages to display and the search terminates with display of an appropriate message. If the test continues and an "Up" search is performed, the temporary variable iNewBottomBound is assigned the value iOldPage −1, the temporary variable iNewTopBound is assigned iOldTopBound, and iNewPage assigned the truncated average of the two new bounds. If the search is "Down", the temporary variable iNewBottomBound is assigned the value iOldPage +1, the temporary variable iNewBottomBound is assigned iOldBottomBound, and iNewPage assigned the truncated average of the two new bounds. Processes of 8K00 now allocate necessary memory and iCurrHost, iCurrPage, iBinaryTopBound, and iBinaryBottomBound of 3A07 are assigned the values of 0, iNewPage, iNewTopBound, and iBottomBound respectively. Lastly, processes of 7G00 display the new page and processing returns to 5A12.

PAGE IDENTIFICATION BY A SCROLLBAR CLICK (8G00):

8K00 is employed to allocate required memory for requisite data structures. 8G02 first issues an operating system message that solicits the coordinates of the click relative to the origin of the scrollbar receiving the click. 8G02 then accesses the pointer to llnIP, 3A07, and assigns zero to iCurrHost, to denote that no host currently exists. The value for the new page, iCurrPage, is now determined by subtracting from iNumPages, of 3A07, the number of page blocks between the click and the scrollbar origin. This later calculation is required since the Y-coordinates increase upward from the origin while page block numbers decrease from the origin. Processes of 7G00 now display the new page.

PAGE IDENTIFICATION FROM A THUMB DRAG (8H00):

This embodiment considers that a Thumb Drag is performed in a modal loop: i.e., a loop on which the only activity recognized by the Item box Subsystem for the duration of the drag is the mouse move and the left-button release. Management of a thumb drag commences at 8H02 with an operating system message to solicit the coordinates of the current cursor position relative to the origin of the scrollbar of the thumb being dragged. There is then a first call to 8K00 to allocate memory for a page change. Final start-up action by 8H02 is to reference appropriate pointers that permit access to the current rCentralParms, 3A04 and llnIP, 3A07 nodes. Values for the page block height, the prior page and the number of pages are extracted.

A loop is entered at 8H04 that tests for mouse movement once per specified time interval for the duration of the left-button press. While dependent on the exigencies of a particular application, a time interval stored in rTimeOut of 3A01 with value of 0.05 second is proposed as shown in 3A00. Each repetition of this loop commences with another operating system message to solicit, as with 8H02, the cursor's current coordinates. Based on the most recent cursor position, four tests is are prepared: (1) is the lateral distance between the X-coordinate and the nearest side of the scrollbar excessive, (2) did the cursor move during the last time interval, (3) is the cursor in the central area, and (4) is the cursor within the winItemBox (see 7A06) window. If the cursor is more than iSideDrift-X (in 3A04 with value in 3A00) from the scroll bar, 8H10 assigns the value in iPriorPage to iCurrPage; i.e., the page being displayed when the thumb drag commenced. 7G00 is then employed to display this original page with the thumbs also in their original locations. The operating system message PUT_CURSOR is issued to return the cursor to the location occupied at the start of the drag; namely, to the cBaseCoords stored in 8H02.

If the cursor's horizontal distance from the scrollbar does not exceed the iSideDrift_X value, the cursor is tested for movement by 8H12. 8H12 tests whether the cursor has, during the last rTimeOut interval, been displaced in the Y-direction by more than the value specified by iMinCursorMove of 3A01 and declared by 3A00. If there has been no movement, the 8H04 loop is repeated. If movement is detected one of two sets of equal but opposite decision sequences is performed based on whether the drag is on the top or bottom thumb.

When the top thumb is being dragged, 8H16 processes first determine whether the cursor is in the central area. If so, a test is performed to determine whether the last page is currently displayed. If the last page is displayed the 8H04 loop is repeated. If other than the last page is displayed, iCurrPage is set to iNumPages, 7G00 displays the last page, and the 8H04 loop is continued. If however, the earlier test for the cursor being in the central area failed, it is determined whether the cursor is outside the item box. If the cursor is within the item box it is considered to be within the area of the top scrollbar and processes of 8H14 determine the current page. 8H20 tests whether the page determined by 8H14 currently displayed. If so, the 8H04 loop is repeated, otherwise 7G00 displays the new page before the loop is repeated. If the cursor is found to be outside the item box, a test is performed to determine whether page 1 is currently displayed. If the first page is displayed the 8H04 loop is immediately repeated, otherwise iCurrPage is set to 1 and 7G00 displays page 1 before the loop is repeated.

If the bottom thumb is the thumb undergoing drag, 8H18 first determines whether the cursor is in the central area. If so, a test is performed to determine whether the first page is currently displayed. If the first page is displayed the 8H04 loop is repeated. If other than the first page is displayed, iCurrPage is set to 1, 7G00 displays page 1, and the 8H04 loop is continued. If however, the earlier test for the cursor being in the central area failed, it is then determined whether the cursor is outside the item box. If the cursor is within the item box it is considered to be within the area of the bottom scrollbar and processes of 8H14 determine the current page. 8H20 tests whether that page is currently displayed. If so the 8H04 loop is repeated, otherwise 7G00 displays it before the loop is repeated. If the cursor is found to be outside the item box, a test is performed to determine whether the last page is currently displayed. If the last page is displayed the 8H04 loop is immediately repeated, otherwise iCurrPage is set to iNumPages and 7G00 displays page this page before the loop is repeated.

PERFORM UNDO (8I00):

When the Undo function is enabled the user is able to return the Item Box Subsystem to the state occupied prior to the most recent action. The Undo function is disabled at activation but enabled by the first user action thereafter. 8I02 ascertains the enabled/disabled state of the Undo function by testing whether the pParent variable of llnAC, 3A06, is "null." If a "null" is detected there is no prior action and a disabled state exists. If "Undo" is enabled, 8I04 assigns the address of the current rACtivityContrpI node from rSessionParms to a temporary variable, pCurrnAC. pCurrnAC.pParent is then referenced and assigned to pOldnAC. Because the value in pOldnAC points to the rActivityControl node containing pointers to nodes of the prior user action it is assigned to pnAC of rSessionParms. 3A01Tests of 8I04 compare addresses in the pointers pnIL, pnIP, pnIS, pnIOP referenced by the pCurrnAC and by the pOldnAC nodes. If the pointer values are equal, the current action and the prior action require the same node and memory for that node cannot be released. If however, the two nodes have different values, the prior node is the active node after the Undo. In this case, memory that has been allocated for the now redundant node is returned to the heap. The pCurrnAC node is now released. Processes of 7G100 are performed to display the prior page and further processing returns to the 5A12 loop.

SELECTION PERFORMED USING THE CURSOR CONTROL KEYPAD (8J00):

The preferred implementation proposes key assignments for cursor control keys that assign each key to a specific destination from each possible initial location. Since optimum cursor control assignments depend on exigencies of a given application and since such assignments in no way alters the intent of this invention, this invention subsumes any alternate cursor control key assignments that traverse the cursor within the display format covered by this invention. Cursor control assignments detailed here are designed to make it possible at Item Box Subsystem activation to illuminate any of the central area functions with at most two key strokes from the predefined cursor location within the central area. Entry into the shell from the central area is performed in such a manner that an experienced user can illuminate any region in a shell of up to 16 regions with at most one cursor control keystroke. When the cursor is within either the central area or the shell it stays in said area and responds to cursor control keystrokes in the manner detailed below. Transiting from the shell to the central area or from the central area to the shell is achieved by a multi-stroke of the CTRL key plus a cursor control key leading to optimum propositioning in anticipation of the area to be illuminated.

Processes of 8J102 access the 3A02 data structure to retrieve values of iMaxRegions, iHalfRegions, and iNumCycles are retrieved and assigns them to temporary variables of the same name. iNumSegs is similarly assigned from 3A04 with iCurrHost read from 3A07 and assigned to the variable iPriorHost. The location of the active region with the highest valued integer identifier is calculated by 8J102 and stored in the temporary variable iLastDisplayItem. If the shell is fully occupied iLastDisplayItem will contain the value iMaxRegion, otherwise it contains the region number of the last active region of the display. Assignments employed by the cursor control keys are determined by a sequence of three tests. First, the iPriorHost is tested by 8J104 to determine whether its value denotes a shell or central area location. If iPriorHost is a shell location, a test is performed to determine whether the user is requesting a move into the central area or whether a new region is to be illuminated. If however, iPriorHost is a location in the central area, a similar test at 8J201 determines whether the user is requesting a move into the shell or a move to a new function-area. 8J106 designates cursor control assignments for a move from the shell into the central area; the negative integer value identifiers of the central area's individual function-areas being defined under "iCurrHost" of 3A07 of FIG. 3B. In similar fashion 8J201 designates cursor control assignments for a move from the central area to the shell. It is worth considering the destinations for these assignments in light of the iMaxRegion, and iNumCycles definitions in 3A03 of FIG. 3B1. Visualizing these assignments for the displays of FIG. 1A conveys how they permit entry into the shell in a manner to allow access to any other region with at most one cursor control stroke.

How cursor control strokes are managed for moves within the shell depend on whether the cursor is initially hosted by the right and left column of the shell. When the cursor is hosted by the right column, a "↑" stroke generates a test at 8J108 to determine if the cursor is at the top of the column. If the column top is detected the cursor wraps to the last active region of the right column. Otherwise, the host region is moved up one region. A "↓" wraps in the opposite manner; namely, a test is performed to ascertain if the host region is iLastDisplayItem. If so, the cursor wraps to the top of the right column, otherwise the cursor moves down one region. If either "←" or "→" are stroked the cursor jumps horizontally to the left column. When the cursor is in the left column 8J202 applies similar tests to any "↑" or "↓" stroke with equivalent wrapping. Strokes of either "←" or "→" are tested to determine whether the region directly to the right is active. If it is, this region becomes the host. If that region is inactive, transfer is to the iLastDisplayItem.

FIG. 1D depicts the cursor key assignments for each function-area of each of the eight different central area configurations. Note that this figure is based on FIG. 1B but shows only the outlines of the eight different central area configurations. In FIG. 1D each small "o" denotes a possible initial location of the cursor. The assignment arrows radiate from each such small "o" always commence in either an Up, Down, Right, or Left direction to represent the four directions of the cursor control keys. In the absence of cursor wrap or other special cases, an assignment arrow is straight and terminates in the function-area assigned the said cursor control pad stroke given the cursor's initial position. When the assignment entails a cursor wrap to an opposite position in the display, the assignment arrows curve to terminate in the assigned function-area. There are two special cases in the 1B70 configuration, but in all cases, following the arrows to their termination identifies the cursor assignment.

The nine procedures 8J206 through 8J508 detail how the assignments depicted by FIG. 1D for the nine possible central area functions are performed. These nine procedures are highly repetitious and easy to follow. Consequently, only the common threads of logic are detailed here. From FIG. 1D it is apparent that the configuration influences the terminating location. As example, "←" and "→" strokes both terminate in the "Top" location for configurations 1B60 and 1B70 given a cursor initially in the "Up" location. With either the 1B80 or 1B909 configuration a "←" stroke places the cursor in "Top" while a "→" stroke moves the cursor to the "Binary Up" location. Procedures 8J204 through 8J508 provide for such configuration specific cases via appropriate "IF" statements within the "CASE" statements of the procedures. The other convention present in these nine procedures relates to the absence of horizontal assignment arrows for some locations. Note, for example, that no configuration has horizontal assignment arrows for the "Return" location. This is because such locations do not have adjoining horizontal function-areas. Any "←" or "→" stroke detected when the cursor is hosted by such a region is ignored.

Figure 5A:
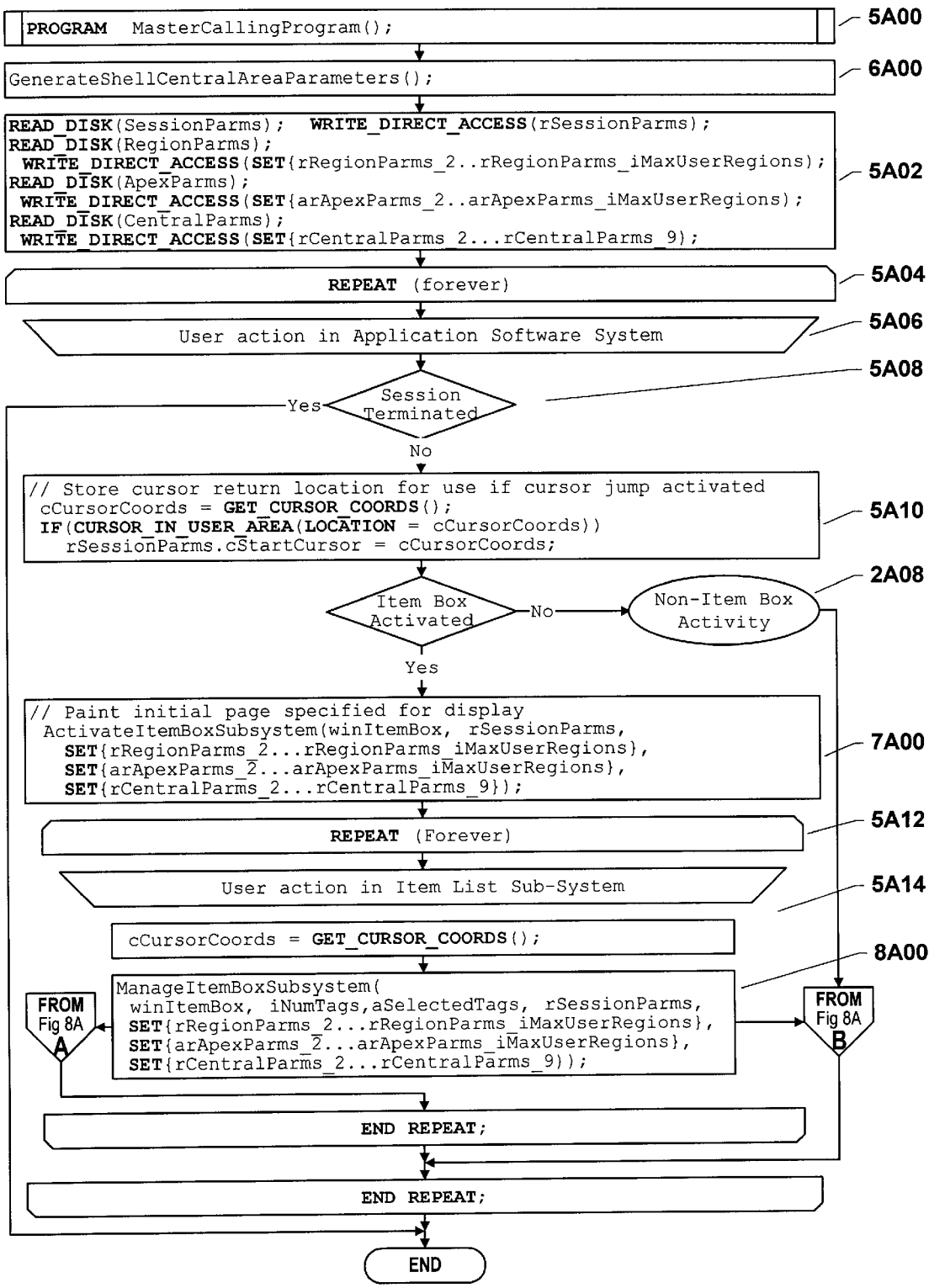
FIG. 5A is a pseudo-code flowchart disclosing the preferred implementation for the overall management of the Item Box Subsystem.
Figure 6A:
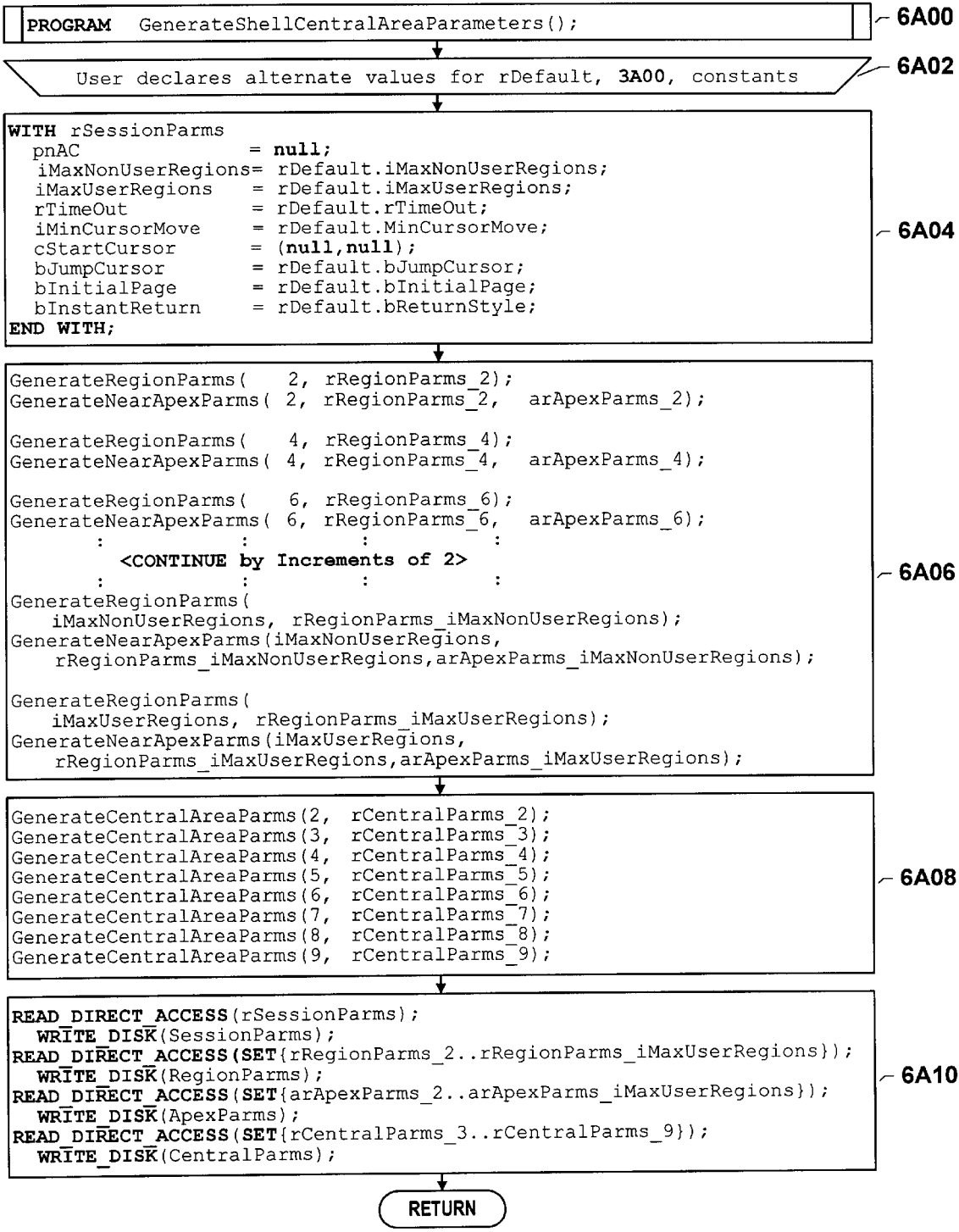
FIG. 6A is a flowchart of pseudo-code that controls generation of parameters for all shells and central area configurations.
Figure 6B:
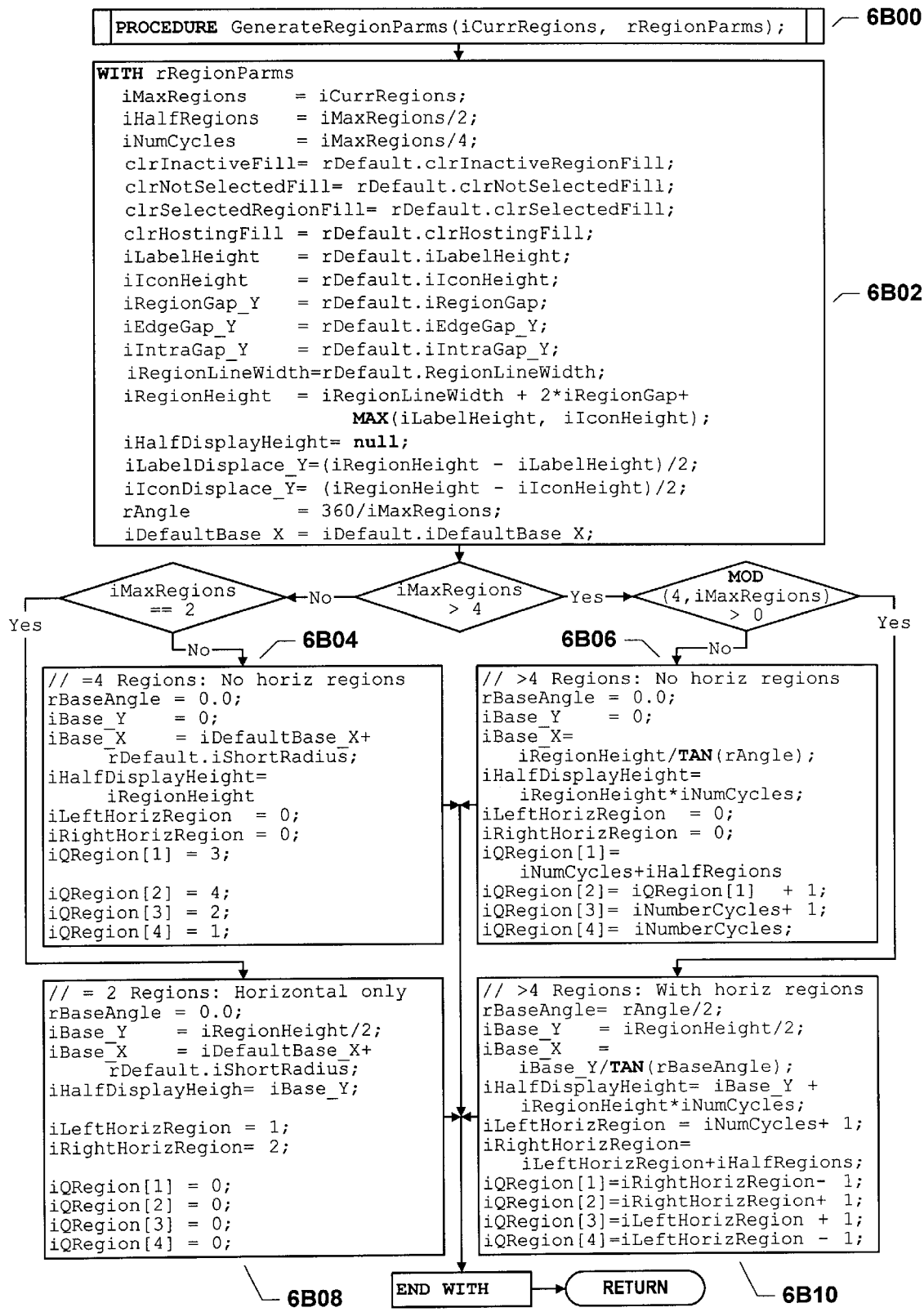
FIG. 6B is a flowchart of pseudo-code to generate data structure rRegionParms.
Figure 6C:
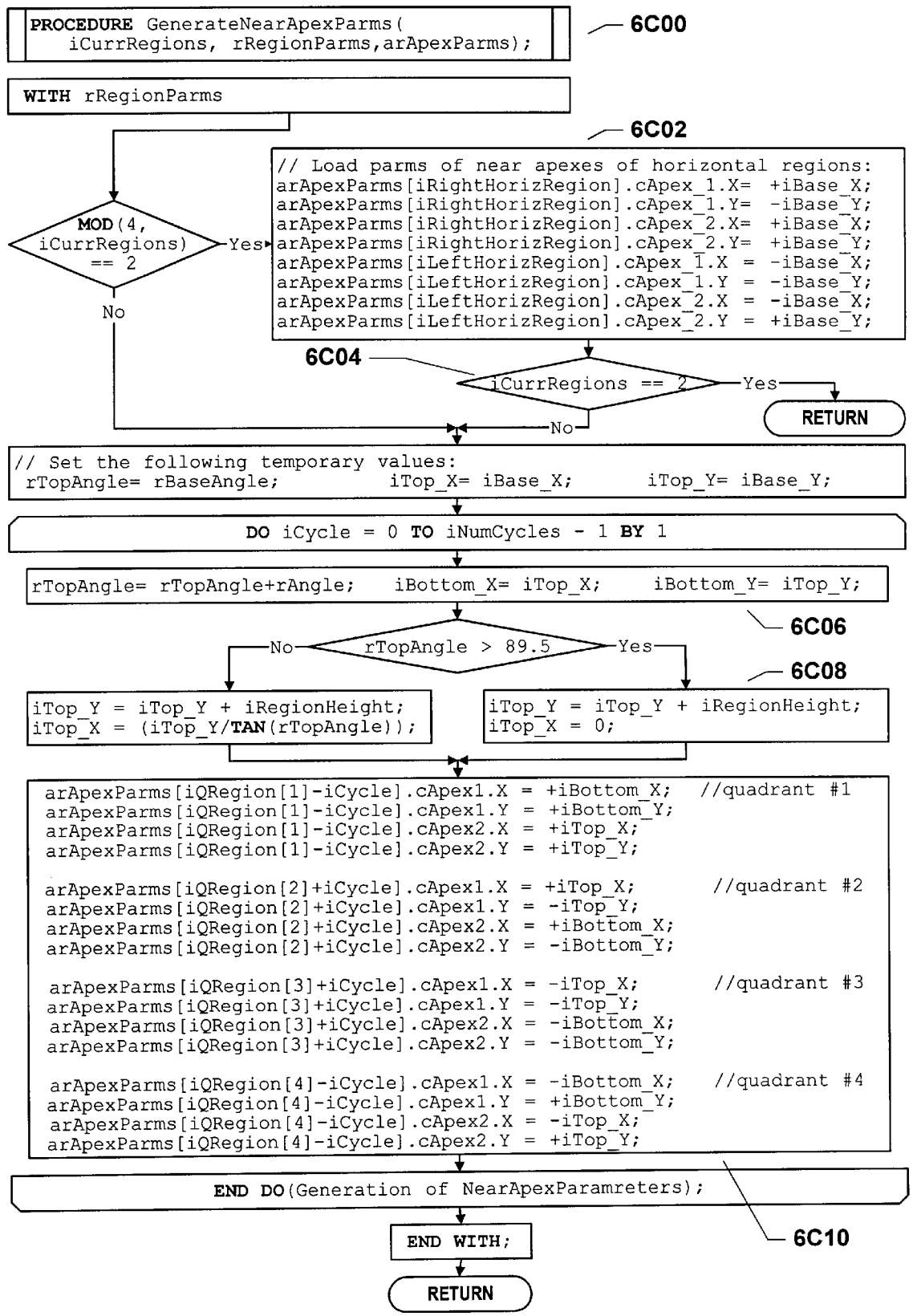
FIG. 6C is a flowchart of pseudo-code to generate data structure arApexParms.

ALLOCATE ADDITIONAL MEMORY (8K00):

The Item Box Subsystem is based on the ten major data structures defined by FIG. 3. rSessionParms, 3A01, is a static structure that maintains, among other variables, the pnAC and pInitialIL pointer variables. The pnAc variable is loaded at activation of the Item Box Subsystem with the root address of llnAC, 3A05. One 3A05 node is dynamically allocated for every user action to which the Item Box Subsystem responds. The address of each new 3A05 node is stored in the pnAC variable of 3A01. pInitialIL stores the pointer to the original item list available at activation time for use if the user abnormally terminates the activation. 3A05 exists to maintain pointers to data nodes appropriate to managing the current user's request and, depending on the requested action, will point to previously allocated or newly allocated nodes of the 3A06, 3A07, 3A08, and 3A09 data structures as detailed below. 3A05 also maintains pointers to the currently appropriate record in each of the 3A02, 3A03, and 3A04 data structures, the latter being static structures generated by FIG. 5. The design of the preferred implementation of the Item Box Subsystem isolates all memory allocated at activation time to the AllocateInitialMemory, 7B00, module. It is apparent from reference to 7B00 that a single node is allocated for each of the dynamic data structures whenever the Item Box Subsystem is activated. Additional memory allocation to manage subsequent user activity is performed by the module AllocateAdditionalMemory, 8K00. Management of these allocations is more complex and are detailed following.

8K02 assigns to temporary variables the addresses required to provide information necessary to correctly maintain linkages when new nodes are allocated. The first processes of 8K04 allocate memory for the new 3A05 node and copy addresses of the prior 3A05 node to it. The double linkage is generated using procedures very familiar to those of typical programming skill. The address of this new nAC node is now assigned to the pnAC variable of the static data structure rSessionParms, 3A01. Since all user actions entail alteration to the variables that manage the item list, 8K04 allocates memory for a new nIP node, 3A07. Variable values are copied from the previously allocated 3A07 node. Values stored in the copied variables of the new node receive appropriate updating as the requested action is processed and the address of the new node is assigned to pnIP of 3A05. A backward linkage is generated to complete management of extended llnIP data structure.

If the action requested by the user is any form of page change, no other memory allocations are required and processing returns to performing the user's request. Results of the memory allocations processes of 8K04 are illustrated by FIG. 4A, which represents the state of memory allocation immediately after activation is complete, and FIG. 4B, which represents memory allocation immediately after 8K04 processes are complete. Note that for clarity purposes all nodes depicted in the right-most column of all FIG. 4 examples excludes display of the pParent variable. FIG. 4A visually shows that for a 35 item list, processes of 7A00 generate pointers to particular records of the three static data structures of 3A02, 3A03, and 3A04 that govern the format of the shell and central area. FIG. 4A also shows the dynamic allocation of memory for the 3A06, 3A07, 3A08, and 3A09 data structures. Note that memory for data structures 3A05 through 3A09 have labels subscripted with "0" to denote that this memory is allocated during activation. FIG. 4B presupposes the user requests a page change. The "1" subscript on rActivityControl denotes the second node of the llnAC data structure which, as shown by 3A05, comprises the pParent and pChild pointers required to maintain a double linked list and the rActivityControl record of pointers to other data structures. Note that all pointers of the 3A05 node shown in FIG. 4B point to the same nodes as in FIG. 4A except for the parItemparms pointer which now points to the second node, $nIP_1$, of 3A07. This is as expected after 8K06 returns processing to the calling procedure that requested the page change.

If the user's action selects one or more different items, the llnIS data structure is extended to maintain the altered selection status of these items. 8K06 initially allocates a new 3A08 node then copies the values from the most recent nIS node to this new node. The address of the new node is assigned to pnIS of 3A05 and backward linkage is generated to complete management of the extended llnIS data structure. Processing returns to managing the user's request. FIG. 4C illustrates how memory allocation for item selection is but an extension of the page change action of FIG. 4B in that third nodes have been allocated to both the 3A05 and 3A07 data structures with a second node allocated to 3A08. For the remaining data structures pointers still point to the nodes allocated when the Item Box Subsystem was initialized.

This invention is not concerned with how item list editing is performed other than presuming that it is performed on the actual list as maintained by the application or operating system software and subsequently accessed in the manner of 7B02. The handling of the resulting updated list requires initially that memory is allocated to extend the llnAC (3A05), llnIP (3A07), and llnIS (3A08) data structures as detailed above.

Allocations must now be made to extend the llnIL (3A06) and llnIOP data structures. In performing these latter memory allocations, processes of 8K08 initially employ operating system messages to obtain the pointer to the updated item list and solicit the number of items this list contains. These values are placed in the temporary variables named pItems and iNumItems respectively with the value iNumItems assigned to the iNumItems variable of the new 3A07 node allocated by 8K04. Since the item list has been altered in an unknown manner, the new llnIS node allocated by 8K06 above is initialized to FALSE to denote that no items are selected immediately after an edit to the list.

8K08 now details the allocation of a new nIL, 3A06, node to receive the altered item list. The updated item list is fetched and reformatted by methods that will depend on how the list is formatted in the application system. The new 3A06 node address is loaded to the pnIL variable of 3A05 and the backward linkage pointer for the extended llnIL is assigned to the new nIL.pParent variable. FIGS. 4D and 4E illustrate the two data management implications of item editing. FIG. 4D is crafted to not alter the mix of shell size and central area configuration that can result from an edit. Thus, in FIG. 4D it is shown that memory for an additional node has been allocated to each of the 3A05 through 3A09 data structures but that pointers to 3A02, 3A03, and 3A04 data structures that manage the shell and central area remain unaltered. FIG. 4E shows the changes arising from addition of a $37^{th}$ item. As with FIG. 4D memory is allocated for a new node to each of the 3A05, through 3A09 data structures. While it is not handled as a memory allocation issue it is worth noting that the processes of 7C00, which determine the most appropriate shell size and central area configuration, now contain ten regions rather than twelve and the central area contains seven function-areas rather than five. 3A02 through 3A04 of FIG. 4E reflect these changed pointers.

GENERATE LIST OF SELECTED TAGS (8L00):

Once pointers to appropriate data structures are accessed by 8L02 the number of items, iNumItems of 3A07 contained in the item list is assigned to a temporary variable. A loop is entered at 8L04 and each item of the aItemStatus record of the currently referenced pnIS, 3A08, node is referenced. If an item has not been selected—indicated by a "FALSE" value—the loop is continued. However when an item that has been selected is detected, the temporary variable, iNumTags, is incremented and the iTag value of 3A06 for this item is written to the aSelectedTags, 3A10, data structure. When the loop terminates, processing goes to 8M00 to terminate the current Item Box Subsystem.

TERMINATE CURRENT ACTIVATION OF THE ITEM BOX SUBSYSTEM (8M00):

8M02 employs an operating system message to remove the winItemBox created by 7A06 from the computer screen.

The screen axis is translated back to its setting prior to activation of the Item Box Subsystem. 8M04 accesses the pointer to the current node of 3A05 and pointers to the other data structures for which memory space has been dynamically allocated are assigned to temporary variables; these data structures being 3A05, 3A06, 3A07, 3A08, and 3A09. All memory allocated to each of these data structures is returned to the heap by following the parent pointer contained in each node. The current activation of the Item Box Subsystem is now terminated and processing passes to 5A04.

What is claimed is:

1. A computer list selection system for pointing device selection of items from a list by a user, comprising:

a computer system for generating a plurality of list item target areas, each target area corresponding to one of said items;

said list item areas each in part comprising an active generally rectangular area responsive to pointing device selection which contains one of said items;

said list item areas being disposed such that each of said rectangular areas is vertically arranged in one of two parallel columns, each column defining a generally vertical axis such that said list item areas define two vertically arranged sub-lists that define a page;

said computer system including an origin establishing means for defining an origin point which is offset from each of said vertical axes;

said list item target areas each further comprising an active nonrectangular area responsive to pointing device selection and laterally adjacent said rectangular area and having a plurality of boundaries which converge at said origin point;

said computer system including dynamic page allocation system that subdivides said list into a plurality of pages and determines the number of list items displayed on a page based on the total number of items in said list.

2. The system of claim 1 wherein said dynamic page allocation system subdivides said list such that the maximum number of items is in the range of approximately 6 to 16 items.

3. The system of claim 1 wherein said plurality of pages except a last page displays a number of the items equal to the number of the rectangular areas.

4. The system of claim 1 wherein said dynamic page allocation system defines a maximum number of items per page such that the physical effort of item selection is a permitted maximum when selection occurs in the nonrectangular portion so as to determine the number of pages into which said list is divided.

5. The system of claim 1 wherein said dynamic page allocation system defines a maximum number of items per page such that the physical effort of item selection is a permitted maximum when selection occurs in the rectangular portion so as to determine the number of pages into which said list is divided.

6. The system of claim 3 wherein said dynamic page allocation system adjusts the maximum number of items per page to display said maximum number of items on said last page without changing the total number of pages.

7. A computer list selection system for pointing device selection of items from a list by a user, comprising:

a computer system for generating a plurality of list item target areas, each target area corresponding to one of said items;

said items forming a plurality of pages that are viewable on the list item target areas;

said list item areas each in part comprising an active generally rectangular area responsive to pointing device selection which contains one of said items;

said list item areas being disposed such that each of said rectangular areas is vertically arranged in one of two parallel columns, each column defining a generally vertical axis such that said list item areas define two vertically arranged sub-lists that define a page;

said computer system including an origin establishing means for defining an origin point which is offset from each of said vertical axes;

said list item target areas each further comprising an active nonrectangular area responsive to pointing device selection and laterally adjacent said rectangular area and having a plurality of boundaries which converge at said origin point;

wherein said computer system further generates an active central region disposed generally coincident with said origin point and responsive to pointing device selection to control navigation among the pages of the items.

8. The system of claim 7 wherein said central region defines central sub-regions that are so shaped that the physical effort expended when moving a cursor from an arbitrary central area sub-region into the shell area for the purpose of item selection is minimized, said items including data record items.

9. The system of claim 7 wherein said central region defines central sub-regions that are so positioned that the physical effort expended when moving a cursor from an arbitrary central area sub-region into the shell area for the purpose of item selection is minimized.

10. The system of claim 7 wherein said central region defines central sub-regions that are so shaped that the physical effort expended when moving a cursor successively through a sequence of arbitrary central area sub-regions for the purpose of page display is minimized.

11. The system of claim 7 wherein said central region defines central sub-regions that are so positioned that the physical effort expended when moving a cursor successively through a sequence of arbitrary central area sub-regions for the purpose of page display is minimized.

12. A computer list selection system for pointing device selection of items from a list by a user, comprising:

a computer system for generating a plurality of list item target areas, each target area corresponding to one of said items;

said items forming a plurality of pages that are viewable on the list item target areas;

said list item areas each in part comprising an active generally rectangular area responsive to pointing device selection which contains one of said items;

said list item areas being disposed such that said rectangular area is vertically arranged in one of two parallel columns, each column defining a generally vertical axis such that said list item areas define two vertically arranged sub-lists that define a page;

said computer system including an origin establishing means for defining an origin point which is offset from each of said vertical axes;

said list item target areas each further comprising an active nonrectangular area responsive to pointing device selection and laterally adjacent said rectangular area and having a plurality of boundaries which converge at said origin point;

said computer system further generating an active central region disposed generally coincident with said origin point and responsive to pointing device selection to control navigation among items in said list, said active central region presenting different user actuable navigation functions based on the number of items in said list.

13. The system of claim 12 wherein said active central region defines a plurality of sub-regions wherein the functionality of each sub-region is defined in that manner which permits display of a page containing a desired item using a minimum of physical effort when location of said page is within a list of pages of arbitrary number and size.

14. The system of claim 12 wherein said active central region defines a plurality of sub-regions, wherein the number of sub-regions of appropriately defined functionality which permits display of a page containing a desired item using a minimum of physical effort when location of said page is within a list of pages of arbitrary number and size.

15. A computer list selection system for pointing device selection of items from a list by a user, comprising:

a computer system for generating a plurality of list item target areas, each target area corresponding to one of said items;

said items forming a plurality of pages that are viewable on the list item target areas;

said list item areas each in part comprising an active generally rectangular area responsive to pointing device selection which contains one of said items;

said list item areas being disposed such that each of said rectangular areas is vertically arranged in at least one parallel column that defines a generally vertical axis said computer system including an origin establishing means for defining an origin point which is disposed in predefined relation to said vertical axis;

said computer system further generating an active central region disposed generally coincident with said origin point and responsive to pointing device selection to control navigation among the pages of the items;

said active central region including dual scroll bar to control navigation among the pages of the items, said dual scroll bar having a first scroll control member disposed above said origin point and having a second scroll control member disposed below said origin point, said first and second scroll members being linked such that movement of either one causes like movement of the other, said first scroll control member being physically separated from the second control member.

16. The system of claim 15 wherein said first and second scroll control members are subdivided into equally sized, ordered regions in a manner to reflect the relative position of each page within said item list.

17. The system of claim 15 wherein said scrollbars include subdivisions that explicitly display information within the body of said scrollbars to permit visual identification of a desired page.

18. The system of claim 15 wherein said scrollbars include subdivisions that contain explicit identifying numbers to further permit identification of a desired page.

19. The system of claim 15 wherein said scrollbars include thumbs positioned within said scrollbars to permit minimum physical effort of acquisition.

20. A computer list selection system for pointing device selection of items from a list by a user, comprising:

a computer system for generating a plurality of list item target areas, each target area corresponding to one of said items;

said list item areas each in part comprising an active generally rectangular area responsive to pointing device selection which contains one of said items;

said list item areas being disposed such that said rectangular area is vertically arranged in at least one parallel column that defines a generally vertical axis said computer system including an origin establishing means for defining an origin point which is disposed in predefined relation to said vertical axis;

said computer system further generating an active central region disposed generally coincident with said origin point and responsive to pointing device selection to control navigation among items in said list;

said active central region including binary search control members that are selectively actuable to traverse said list in a binary tree search pattern.

21. A computer list selection system for pointing device selection of items from a list by a user, comprising:

a computer system for generating a plurality of list item target areas, each target area corresponding to one of said items;

said items forming a plurality of pages that are viewable on the list item target areas;

said list item areas each in part comprising an active generally rectangular area responsive to pointing device selection which contains one of said items;

said list item areas being disposed such that said rectangular area is vertically arranged in at least one parallel column that defines a generally vertical axis;

said computer system including an origin establishing means for defining an origin point which is disposed in predefined relation to said vertical axis;

said computer system further generating an active central region disposed generally coincident with said origin point and responsive to pointing device selection to control navigation among items in said list;

said computer system including cursor position control system that uses a predefined set of cursor movement keys to move the pointing device to predetermined locations within said active central region and alternatively to predetermined locations within said rectangular area.

22. The system of claim 21 wherein said rectangular area defines a shell and wherein said cursor movement keys include an up-arrow key, a down-arrow key, a left-arrow key and a right-arrow key and a control key.

23. The system of claim 22 wherein said cursor position control system functions such that upon cursor transition from shell to central region each of four cursor control keys positions the cursor in a vertical line near the vertical axis such that the up-arrow key positions the cursor in a topmost sub-region and the down-arrow key positions the cursor in a bottom most sub-region, the left-arrow and right-arrow keys position the cursor along said vertical line within the central area in a manner to achieve equal numbers of subregions between cursor locations.

24. The system of claim 22 wherein said cursor position control system functions such that upon cursor transition from the central region to the shell area two cursor control keys position the cursor in the left column to in a manner to achieve equal numbers of regions between cursor locations when the column is appraised as a cycle that permits cursor wrapping, the remaining two cursor control keys assign the cursor to the right column with spacing between positions equal to spacing of the left column but with said right column cursor positions occurring opposite the midpoint between cursor positions of the left column.

25. The system of claim 22 wherein said cursor position control system functions such that when the cursor is positioned at the top or the bottom of a column, a stroke of the up arrow key or down arrow key respectively wraps the cursor to the bottom or top of the column respectively within the column that contains the cursor.

26. The system of claim 22 wherein said cursor position control system functions such that when either the left-arrow key or right arrow key is stroked the cursor jumps horizontally to the opposite column.

* * * * *